United States Patent
Seo et al.

(10) Patent No.: US 10,514,727 B2
(45) Date of Patent: Dec. 24, 2019

(54) FLEXIBLE DISPLAY APPARATUS AND OPERATING METHOD THEREOF

(71) Applicant: Samsung Electronics Co., Ltd., Suwon-si (KR)

(72) Inventors: Joon-kyu Seo, Suwon-si (KR); Hyun-jin Kim, Seoul (KR); Nipun Kumar, Suwon-si (KR); Yong-yeon Lee, Suwon-si (KR); Chang-soo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 13/646,167

(22) Filed: Oct. 5, 2012

(65) Prior Publication Data

US 2014/0015743 A1    Jan. 16, 2014

(30) Foreign Application Priority Data

Jul. 11, 2012   (KR) ........................ 10-2012-0075586

(51) Int. Cl.
*G06F 1/16*    (2006.01)

(52) U.S. Cl.
CPC ................. *G06F 1/1652* (2013.01)

(58) Field of Classification Search
None
See application file for complete search history.

(56) References Cited

U.S. PATENT DOCUMENTS

| | | | |
|---|---|---|---|
| 7,551,220 B2 | 6/2009 | Morikawa et al. | |
| 8,502,788 B2 | 8/2013 | Cho | |
| 8,581,859 B2 * | 11/2013 | Okumura et al. | ............ 345/173 |
| 8,654,087 B2 | 2/2014 | Kang et al. | |
| 9,013,432 B2 | 4/2015 | Kang et al. | |
| 9,013,433 B2 | 4/2015 | Kang et al. | |
| 9,671,870 B2 | 6/2017 | Kang et al. | |
| 9,684,342 B2 | 6/2017 | Kim et al. | |
| 9,946,358 B2 | 4/2018 | Kang et al. | |

(Continued)

FOREIGN PATENT DOCUMENTS

| | | |
|---|---|---|
| CN | 101782804 A | 7/2010 |
| CN | 101788850 A | 7/2010 |

(Continued)

OTHER PUBLICATIONS

International Search Report for PCT/KR2013/006053 dated Nov. 22, 2013 [PCT/ISA/210].

(Continued)

*Primary Examiner* — Parul H Gupta
(74) *Attorney, Agent, or Firm* — Sughrue Mion, PLLC

(57) ABSTRACT

A flexible display apparatus is provided. The flexible display apparatus includes a display, a sensor which senses shape deformation of the display, a storage which, if a shape deformation is sensed, stores operation state information of a first operation state of the flexible display apparatus prior to the first shape deformation being performed, and a controller which performs a function corresponding to the first shape deformation if a second shape deformation different from the first shape deformation is sensed, returns to the first operation state according to the operation state information stored in the storage.

19 Claims, 46 Drawing Sheets

(56) References Cited

U.S. PATENT DOCUMENTS

| | | | |
|---|---|---|---|
| 2008/0066564 A1* | 3/2008 | Hayakawa | G01L 1/20 73/862.628 |
| 2010/0011291 A1 | 1/2010 | Nurmi | |
| 2010/0045705 A1* | 2/2010 | Vertegaal et al. | 345/661 |
| 2010/0117975 A1 | 5/2010 | Cho | |
| 2010/0120470 A1 | 5/2010 | Kim et al. | |
| 2010/0141605 A1* | 6/2010 | Kang | G06F 1/1626 345/174 |
| 2010/0164888 A1 | 7/2010 | Okumura et al. | |
| 2010/0182265 A1* | 7/2010 | Kim | G06F 1/1616 345/173 |
| 2012/0112994 A1 | 5/2012 | Vertegaal et al. | |
| 2013/0215041 A1* | 8/2013 | Kim | G06F 3/0487 345/173 |
| 2013/0265221 A1* | 10/2013 | Lee | G06F 3/01 345/156 |
| 2013/0342509 A1 | 12/2013 | Kang et al. | |
| 2014/0002402 A1 | 1/2014 | Kang et al. | |
| 2014/0292717 A1 | 10/2014 | Kang et al. | |
| 2017/0255271 A1 | 9/2017 | Kang et al. | |

FOREIGN PATENT DOCUMENTS

| | | |
|---|---|---|
| EP | 2 166 443 A2 | 3/2010 |
| EP | 2 192 750 A2 | 6/2010 |
| KR | 10-2010-0052227 A | 5/2010 |
| KR | 10-2010-0065418 A | 6/2010 |

OTHER PUBLICATIONS

Written Opinion for PCT/KR2013/006053 dated Nov. 22, 2013 [PCT/ISA/237].

Mohammadreza Khalilbeigi, et al., "Fold Me: Interacting with Double-sided Foldable Displays", Proceedings of the sixth International Conference on Tangible, embedded and Embodied Interaction, TEI 2012, Kingston, Ontario, Canada, Feb. 19-22, 2012, pp. 33-40, XP 055047587.

Communication from the European Patent Office dated Feb. 2, 2016 in a counterpart European Application No. 13175956.5.

Communication dated Nov. 16, 2016 issued by the State Intellectual Property Office of P.R. China in counterpart Chinese Application No. 201380036693.3.

Communication dated Jan. 9, 2018, issued by the State Intellectual Property Office of People's Republic China in counterpart Chinese Patent Application No. 201380036693.3.

Communication dated Jun. 21, 2018, issued by the State Intellectual Property Office in counterpart Chinese Patent Application No. 201380036693.3.

Communication dated Dec. 6, 2018, issued by the State Intellectual Property Office of P.R. China in counterpart Chinese Application No. 201380036693.3.

Communication dated Jan. 9, 2019, issued by the Korean Intellectual Property Office in counterpart Korean Application No. 10-2012-0075586.

Communication dated Apr. 17, 2019, issued by the European Patent Office in counterpart European Application No. 13 175 956.5.

* cited by examiner (a)

(b)

(a) θ > 90°

(b) θ < 90°

(c) θ = 90°

(d) θ < 10°

FLEXIBLE DISPLAY APPARATUS AND OPERATING METHOD THEREOF

CROSS-REFERENCE TO RELATED APPLICATION

This application claims priority from Korean Patent Application No. 10-2012-0075586, filed on Jul. 11, 2012, in the Korean Intellectual Property Office, the disclosure of which is incorporated herein by reference in its entirety.

BACKGROUND

1. Field

Methods and apparatuses consistent with exemplary embodiments relate to a flexible display apparatus and an operating method thereof, and more particularly, to a flexible display apparatus which is used to control an operation by maintaining a shape deformation state, and an operating method thereof 2. Description of the Related Art With the development of electronic technologies, various kinds of display apparatuses have been developed. In particular, display apparatuses such as television (TVs), personal computers (PCs), laptops, tablet PCs, mobile phones, and MP3 players have come into wide use to such an extent that they are used in most households.

To meet users' needs for new functions, an effort to develop the display apparatus in a new form has been made. A so-called next generation display apparatus is a result of such an effort.

The flexible display apparatus is an example of the next-generation display apparatus. The flexible display apparatus refers to a display apparatus that is can be deformed or have its shape-changed like paper.

The flexible display apparatus can be bent by a force applied by a user and thus may be used for various purposes. For instance, the flexible display apparatus may be used for mobile apparatuses such as mobile phones, table PCs, electronic albums, personal digital assistants (PDAs), and MP3 players.

The flexible display apparatus has flexibility unlike existing display apparatuses. Accordingly, there is a demand for a method for controlling an operation using a flexible display apparatus.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a flexible display apparatus which can control an operation by maintaining a shape deformation state, and an operating method thereof.

According to an aspect of an exemplary embodiment, there is provided a flexible display apparatus including: a display, a sensor which senses a shape deformation of the display unit, a storage unit which, if a first shape deformation is sensed, stores operation state information of a first operation state of the flexible display apparatus prior to the first shape deformation being performed, and a controller which performs a function corresponding to the first shape deformation, and, if a second shape deformation different from the first shape deformation is sensed, returns to the first operation state according to the operation state information stored in the storage.

The first shape deformation may include a bending and hold state in which a shape of the display unit is deformed and the shape deformation state is maintained for a predetermined time, and the second shape deformation may be a flat state in which the first shape deformation is released and the display is spread out so that the display becomes flat.

If the first shape deformation is sensed while a multimedia content is reproduced, the controller may store reproduction information on the multimedia content in the storage, and may perform a reproduction stop function to stop reproducing the multimedia content or a mute function to stop output of an audio signal included in the multimedia content. If the second shape deformation is sensed, the controller may resume reproducing the multimedia content or resume outputting the audio signal using the reproduction information stored in the storage.

If the first shape deformation is sensed while a screen of a first layout is displayed on the display, the controller may change the first layout to a second layout corresponding to the first shape deformation, and, if the second shape deformation is sensed, the controller may changes the second layout to the first layout.

The first layout may be displayed on an entire display area of the display, and the second layout may be a layout in which execution screens of a plurality of different applications are displayed on display areas, respectively.

The second layout may be a layout in which a screen displayed on an entire area of the display is moved to one side and a new display area is opened.

If the screen is changed to the second layout and the new display area is opened, the controller may display an object corresponding to the stored operation state information on the new display area. The object may be one of a message input window, a menu bar, an information window, a notification window, a soft keyboard, an image edit tool, a content list, and a clip board.

If the first shape deformation is sensed while at least one object is displayed on the display unit, the controller may display the at least one object such that the object slides on a screen in a direction of the shape deformation.

If the first shape deformation is sensed while the flexible display apparatus is operated in a first operation mode, the controller may convert the first operation mode into a second operation mode corresponding to the first shape deformation. If the second shape deformation is sensed, the controller may return to the first operation mode. The first operation mode and the second operation mode may perform different functions.

The first operation mode may be one of a camera mode and a video recording mode, and the second operation mode may be the other one of the camera mode and the video recording mode.

According to an aspect of another exemplary embodiment, there is provided a method for operating a flexible display apparatus which comprises a display unit, the method including: sensing shape deformation of the display, if a first shape deformation is sensed, storing operation state information of a first operation state of the flexible display apparatus prior to the first shape deformation being performed, and controlling an operation by performing a function corresponding to the first shape deformation, and, if a second shape deformation different from the first shape deformation is sensed, returning to the first operation state according to the operation state information.

The first shape deformation may include a bending and hold state in which a shape of the display is deformed and the shape deformation is maintained for a predetermined time, and the second shape deformation may be a flat state in which the first shape deformation is released and the display is spread out so that the display becomes flat.

The controlling the operation may include: if the first shape deformation is sensed while multimedia content is reproduced, storing reproduction information on the multimedia content, performing a reproduction stop function to stop reproducing the multimedia content or a mute function to stop output of an audio signal included in the multimedia content, and, if the second shape deformation is sensed, resuming reproduction of the multimedia content or resuming outputting the audio signal using the reproduction information.

The controlling the operation may include: if the first shape deformation is sensed while a screen of a first layout is displayed on the display, changing the first layout to a second layout, and if the second shape deformation is sensed, changing the second layout to the first layout.

The first layout may be displayed on an entire display area of the display, and the second layout may be a layout in which execution screens of a plurality of different applications are displayed on display areas, respectively.

The second layout may be a layout in which a screen displayed on an entire area of the display is moved to one side and a new display area is opened.

The method may further include, if the screen is changed to the second layout and the new display area is opened, displaying an object corresponding to the stored operation state information on the new display area. The object may be one of a message input window, a notification window, a soft keyboard, an image edit tool, a content list, and a clip board.

The controlling the operation may include, if the first shape deformation is sensed while at least one object is displayed on the display, displaying the at least one object in a form such that the object slides on a screen in a direction of the shape deformation.

The controlling the operation may include: if the first shape deformation is sensed while the flexible display apparatus is operated in a first operation mode, converting the first operation mode into a second operation mode corresponding to the first shape deformation, and, if the second shape deformation is sensed, returning to the first operation mode. The first operation mode and the second operation mode may perform different functions.

The first operation mode may be one of a camera mode and a video recording mode, and the second operation mode may be the other one of the camera mode and the video recording mode.

According to an aspect of another exemplary embodiment, there is provided a flexible display apparatus including: a display; a sensor which senses a shape deformation of the display; and a controller which performs a first function corresponding to a first shape deformation that is sensed by the sensor, and, if a second shape deformation different from the first shape deformation is sensed by the sensor, performs a second function corresponding to the second shape deformation.

The first function may be a function to stop reproducing multimedia content or a function to stop output of an audio signal and the second function may resume reproducing the multimedia content or resume outputting the audio signal.

The first function may be a function to change a first layout of a screen displayed on the display to a second layout and the second function may be a function to change the second layout of the screen displayed on the display to the first layout.

The first function may be to animate at least one object such that the at least object slides on a screen of the display in a direction of the first shape deformation and the second function may be to animate the at least one object such that the at least object slides on the screen of the display in a direction of the second shape deformation.

The first shape deformation may be a bend and hold shape deformation in which the display is bent and held in a position for a predetermined time period and the second shape deformation may be a releasing shape deformation in which the display is spread out or released to be flat.

According to the various exemplary embodiments described above, various functions can be provided by performing shape deformation and maintaining a state of the shape deformation.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
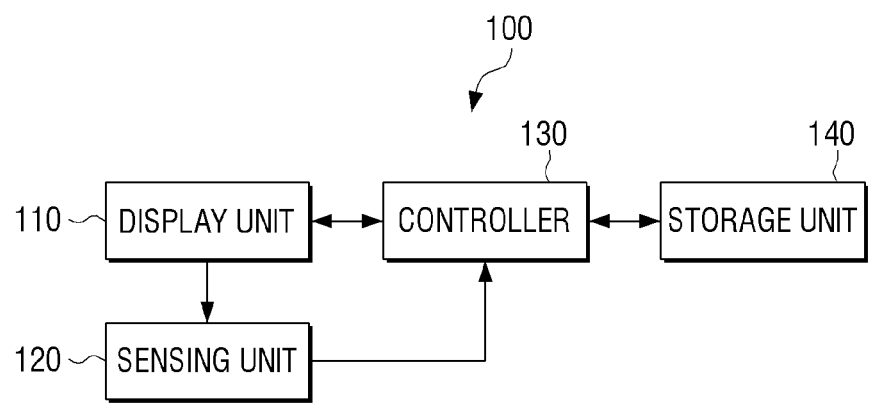
FIG. 1 is a block diagram illustrating a flexible display apparatus according to an exemplary embodiment.

Hereinafter, exemplary embodiments will be described in greater detail with reference to the accompanying drawings. In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a flexible display apparatus according to an exemplary embodiment. A flexible display apparatus 100 of FIG. 1 has flexibility. Accordingly, if an external force is applied, the shape is deformed according to a magnitude of the force and an applying direction of the force. The flexible display apparatus 100 of FIG. 1 may be embodied by various types of display apparatuses on such devices as a mobile phone, a tablet PC, a laptop, an MP3 player, and an electronic album.

Referring to FIG. 1, the flexible display apparatus 100 includes a display unit (e.g., a display panel, etc.) 110, a sensing unit 120 (e.g., a sensor, sensing circuitry, etc.), a controller 130 (e.g., a microprocessor, central processing unit, etc.), and a storage unit 140 (e.g., a storage, memory, etc.).

The display unit 110 has flexibility and displays various screens such as a content reproducing screen, a background screen including icons, an application execution screen, and a broadcast receiving screen according to the control of the controller 130.

The sensing unit 120 senses whether the shape of the display unit 110 is deformed or not. The shape deformation refers to a state when the flexible display apparatus 100 is bent by an applied force. The shape deformation may also be called 'bending'. More specifically, if a radius of curvature is greater than or equal to a predetermined value, the shape deformation is called 'general bending', and, if the radius of curvature is less than the predetermined value, the shape deformation is called 'folding'. However, for the convenience of explanation, the term 'bending' will be used, including general bending and the folding.

The shape deformation may be divided into various types of shape deformation according to various conditions such as a location, a direction, an angle, a degree, a speed, a holding time of shape deformation, and a number of shape deformations. This will be explained in detail below.

The storage unit 140 may store various programs, content, user setting information, authentication information, and other information, which are used in the flexible display apparatus 100.

The controller 130 controls an overall operation of the flexible display apparatus 100 according to a characteristic of shape deformation which is sensed by the sensing unit 120.

Specifically, if first shape deformation is sensed, the controller 130 stores information on an operation state of the flexible display apparatus 100, that is, operation state information, in the storage unit 140. The first shape deformation refers to a state in which the flexible display apparatus 100 is deformed in a predetermined shape. For example, a state in which the flexible display apparatus 100 is bent and this bent state is maintained for a predetermined time may be defined as the first shape deformation. The controller 130 may store information at a time when the shape deformation is sensed, and may also store the operation state information at a time when it is checked that the shape deformation is maintained for the predetermined time.

If the flexible display apparatus 100 is executing an application, the controller 130 may store information on the executed application and an execution screen of the application in the storage unit 140. If the flexible display apparatus 100 is reproducing multimedia content such as a video file or an audio file, the controller 130 may store information on the multimedia content and information on a degree of reproduction, that is, reproduction information, in the storage unit 140. Also, if the flexible display apparatus 100 displays a certain screen, the controller 140 stores information on the displayed screen in the storage unit 140. The controller 140 stores information on the various operation states of the flexible display apparatus 100 in the storage unit 140.

As described above, if shape deformation is sensed, the controller 130 checks whether the shape deformation state is maintained for a predetermined time or not to determine whether the first shape deformation occurs or not. Maintaining the shape deformation state means that the bent state is maintained without further bending or releasing the bent state. For the convenience of explanation, the operation of performing shape deformation and maintaining the shape deformation for more than a predetermined time is called a 'bending and hold gesture'. Also, the operation of performing the shape deformation but directly spreading or returning to an original state without maintaining the shape deformation is called a 'bending and flat gesture'. The operation of spreading to the original state may be called 'unfolding' or 'unbending' besides the flat gesture. The sensing unit 120 may determine whether the flat occurs or not by sensing an angle, a location, a direction, a magnitude, and a speed of the flat gesture.

If the shape deformation state is maintained, that is, if it is determined that the bending and hold gesture is made, the controller 130 performs an operation corresponding to the shape deformation state. At this time, the operation to be performed may perform various functions according to various aspects of exemplary embodiments. An example of this operation will be explained in detail below.

If the bending and flat gesture indicating that the shape deformation state is not maintained and the original state is directly restored is performed, the controller 130 may perform an operation corresponding to the bending and flat gesture. The operation matched with the bending and hold gesture and the operation matched with the bending and flat gesture may be set to perform different functions.

If second shape deformation is sensed while a function corresponding to the first shape deformation is performed, the controller 130 terminates the function and returns to the operation performed before the shape deformation occurs. The second shape deformation may be diversely set. For example, the second shape deformation may refer to a state in which the flexible display apparatus 100 is released from the first shape deformation and is spread to a flat state. Also, the second shape deformation may refer to a state in which the first shape deformation is performed and additionally the bending and flat gesture or bending and hold gesture is performed.

If the second shape deformation is sensed, the controller 130 may return to its original state using the information stored in the storage unit 140.

On the other hand, if the bending and flat gesture is performed, the controller 130 does not return to its original operation state even if the shape deformation does not occur. For instance, if the bending and flat gesture is performed while a content is reproduced and the bending and flat gesture is matched with a content change function, the controller 130 changes a current content to a next content or a previous content according to the bending and flat gesture, and reproduces the content.

Figure 2:
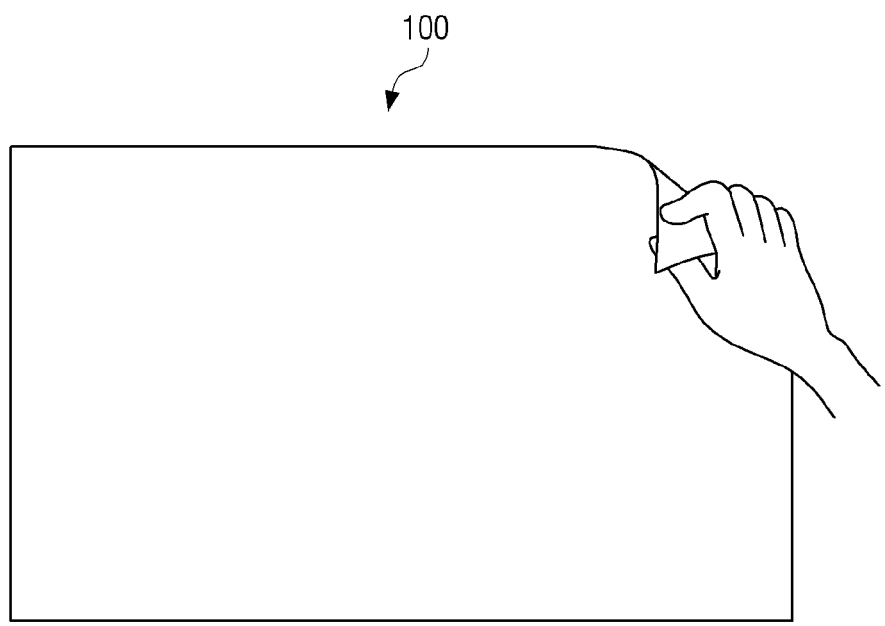
FIG. 2 is a view illustrating a corner which is shape-deformed.
Figure 3:
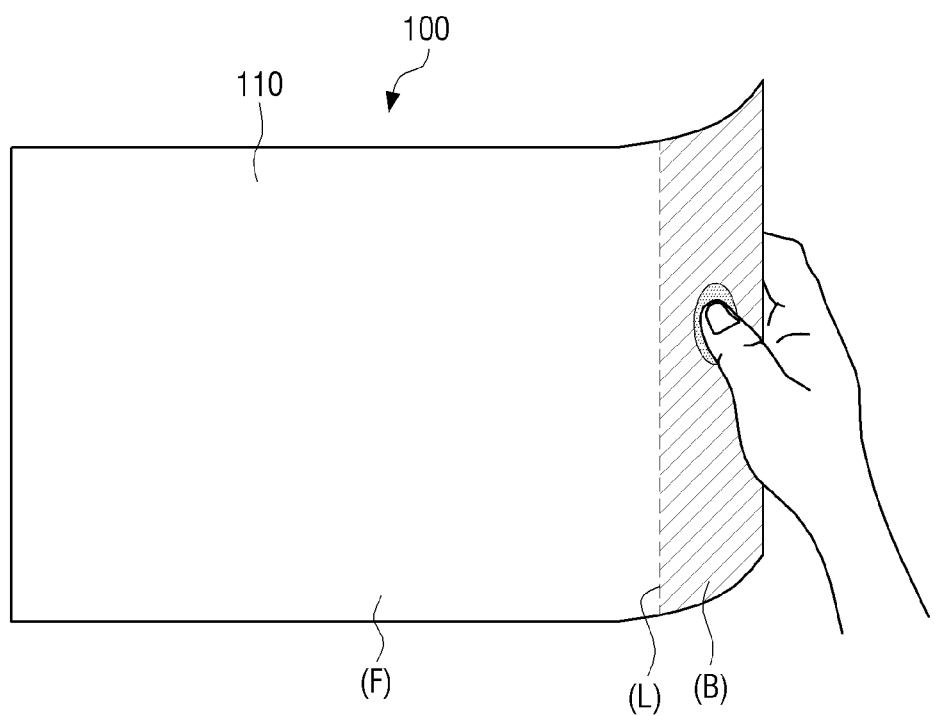
FIG. 3 is a view illustrating an edge which is shape-deformed.

FIGS. 2 and 3 are views illustrating examples of shape deformation occurring on various areas of the flexible display apparatus.

FIG. 2 is a view illustrating a state in which a corner of the flexible display apparatus 100 is grasped and bent, and then the bent state is maintained. FIG. 3 is a view illustrating a state in which an edge of the flexible display apparatus 100 is bent and the bent state is maintained. As shown in FIG. 3, if the right edge of the flexible display apparatus 100 is grasped and bent in an upward direction, a bending area B is formed. Accordingly, an entire area of the display unit 110 may be divided into the bending area B in which bending is sensed, a flat area F in which bending is not sensed, and a boundary line L. The boundary line L between the bending area B and the flat area F may be called a bending line.

If the bent state is maintained for a predetermined time (for example, 2 seconds) without changing a degree of bending in the bending area, the controller 120 determines that the bending and hold gesture is performed and performs a corresponding operation. The operation may be different according to an operation state of the flexible display apparatus 100 at a time when the bending is started.

Although the bending on the corner or the edge has been described in FIGS. 2 and 3, the bending may be performed in various locations. The location of the bending may be divided into a corner, an edge, a center, and a diagonal area so that the user can clearly identify input.

Figure 4:
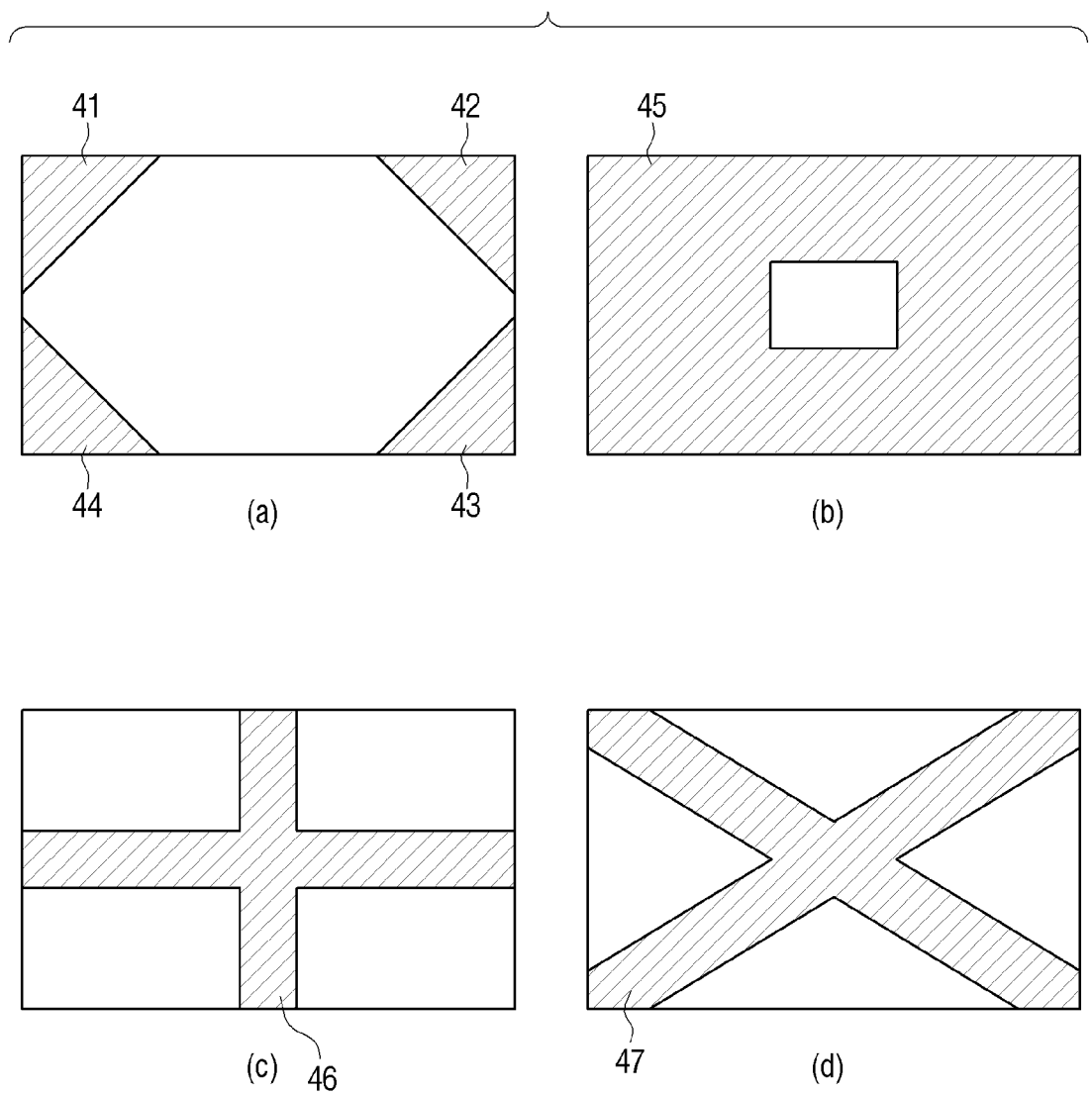
FIG. 4 is view illustrating examples of areas which are deformable.

FIG. 4 is a view to explain locations where bending is performed. Referring to FIG. 4, the location where the bending is performed may be divided into 12 locations in total, such as top, bottom, right and left corners, top, bottom, right and left edges, a vertical center area, a horizontal center area, a left area with reference to a diagonal line, and a right area with reference to a diagonal line. Accordingly, the location of the bending may be divided into 12 types according to locations of a bending line, without minutely dividing a slope or location of the bending line. That is, a corresponding operation may be performed if the bending is only performed within an appropriate area even if the bending is not performed along an exact line.

In FIG. 4, view (a) is a view illustrating four top, bottom, right and left corners 41, 42, 43, and 44 which are designated as bending sensing areas. If a bending and hold gesture or a bending and flat gesture is performed within certain one of the four corners which are designated as bending sensing areas as described above, a function corresponding to that corner and that gesture is performed. For instance, if a bending and hold gesture is performed on the corner, a function matched with each corner from among functions provided by a currently executed application is performed.

In FIG. 4, view (b) is a view illustrating an edge 45 except for a center, which is designated as a bending sensing area. In the case of FIG. 4, view (b), if bending is performed in top, bottom, right, and left edges, a function corresponding that gesture is performed. For instance, if a bending and hold gesture is performed on the edge, the controller 130 may open an option area in the bent portion. The option area may display various objects such as a message input window, a notification window, a menu bar, an information window, a soft keyboard, an image edit tool, a content list, and a clip board. The image edit tool may include various tools to edit an image such as a pen, an eraser, a painting brush, a compass, a ruler, and a paint palette. The menu bar refers to a bar interface in which various menus are arranged in at least one row to control a screen displayed in an existing area.

In FIG. 4, view (c) is a view that illustrates a bending sensing area 46 to sense bending crossing the center, and view (d) of FIG. 4 illustrates a bending sensing area 47 to sense bending of diagonal directions. Referring to FIG. 4, if bending is performed crossing the center in a vertical direction or a horizontal direction or if bending is performed crossing the center in diagonal directions, a function matched with that gesture is performed. For instance, if the bending and hold gesture is performed in the area shown in view (c) or view (d) of FIG. 4, a high rank function which affects the whole display apparatus or the whole screen is performed. The high rank function may include a function of turning on or off power of the flexible display apparatus, a function of turning on or off only the screen, and a function of terminating a currently executed application.

Figure 5:
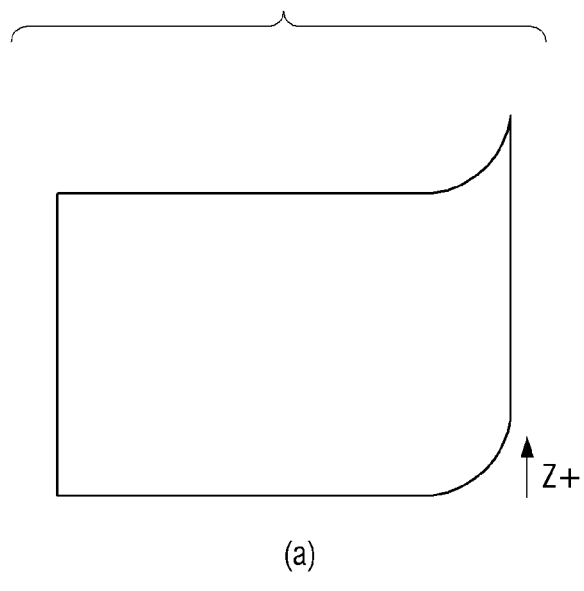
FIG. 5 is a view illustrating examples of a shape deformation direction.
Figure 5:
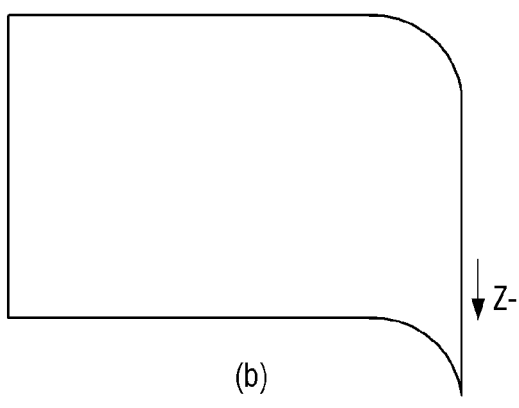

FIG. 5 illustrates examples of bending directions. In view (a) of FIG. 5, a direction of coming out from a surface of the display unit 110 of the flexible display apparatus 100 is defined as a Z+ direction, and, in view (b) of FIG. 5, a direction of going in the surface of the display unit 110 is defined as a Z− direction. That is, the Z+ direction refers to a direction in which the surface of the display unit 110 is folded inwards, and the Z− direction refers to a direction in which the surface of the display unit 110 is folded outwards. Although different settings are provided, in response to the bending of the Z+ direction, addition, increase, and positive feedback may be provided, and, in response to the bending of the Z− direction, reduction, release, and negative feedback may be provided. For example, in response to the bending of the Z+ direction, feedback such as increase in a channel number, increase in a sound volume, change to a next content, fast forward, and change to a next page may be provided, and, in response to the bending of the Z− direction, feedback such as decrease in a channel number, decrease in a sound volume, change to a previous content, rewind, and change to a previous page may be provided.

Figure 6:
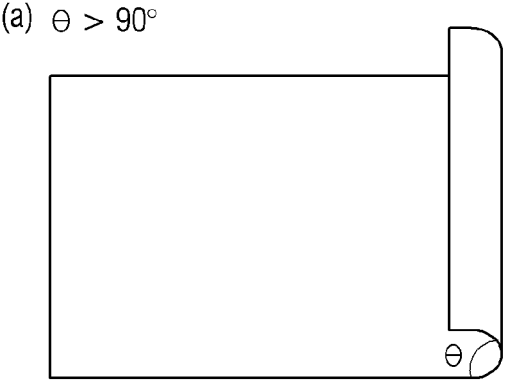
FIG. 6 is a view illustrating different degrees of shape deformation.
Figure 6:
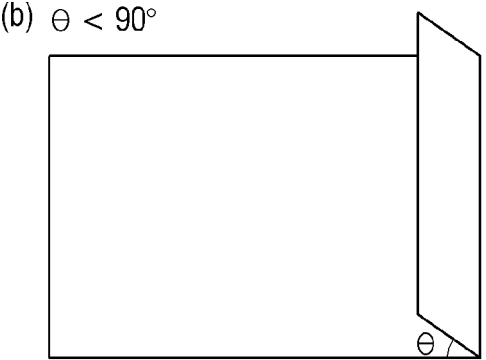
Figure 6:
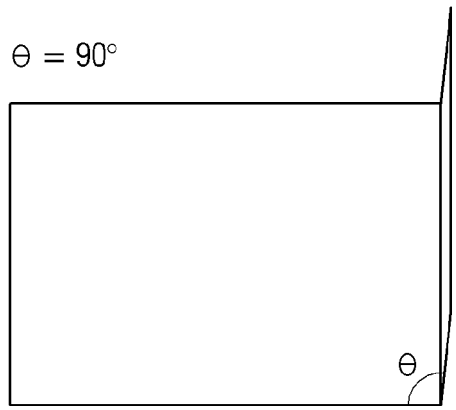
Figure 6:
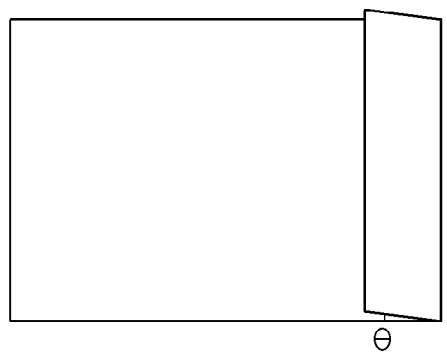

FIG. 6 illustrates examples of bending angles. View (a) of FIG. 6 illustrates a state in which bending is gently performed. For the user to distinguish inputs, the bending angle is divided into an acute angle, an obtuse angle, a 90° angle, and an angle smaller than 10°, and functions may be matched with each angle. With respect to the case in which the bending angle ($\theta$) is an obtuse angle which is greater than 90° as shown in view (a) of FIG. 6, the case in which the bending angle ($\theta$) is an acute angle which is smaller than 90° (between 10° and 90°) as shown in view (b) of FIG. 6, the case in which the bending angle ($\theta$) is a 90° angle as shown in view (c) of FIG. 6, and the case in which the display unit is completely bent and the bending angle ($\theta$) is smaller than 10° as shown in view (d) of FIG. 6, different functions may be matched to different bending angles. Although view (d) of FIG. 6 illustrates the case in which the bending angle ($\theta$) is smaller than 10°, the angle range may be variously set. If the bending is performed as shown in view (b) or view (d) of FIG. 6, the bending may be called 'folding'.

As described above, the display unit 110 may be deformed in various locations and in various forms.

Figure 7:
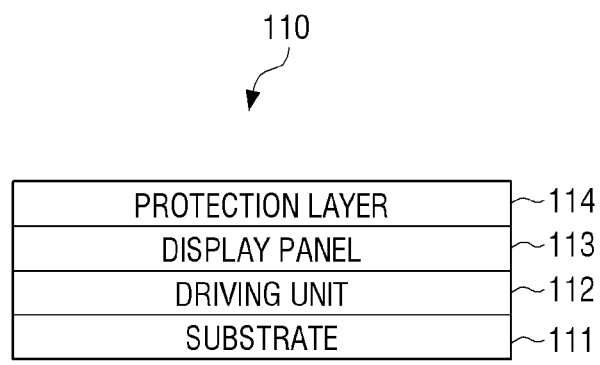
FIG. 7 is a view illustrating an example of a display unit.

FIG. 7 illustrates an example of the display unit 110 which has flexibility. Referring to FIG. 7, the display unit 110 includes a substrate 111, a driving unit 112 (e.g., a driver), a display panel 113, and a protection layer 114.

The flexible display apparatus refers to an apparatus which can be bent, crooked, folded, or rolled like paper, while having display characteristics of an existing flat panel display apparatus as they are. Accordingly, the flexible display apparatus should be manufactured on a flexible substrate.

Specifically, the substrate 111 may be implemented by a plastic substrate (for example, a high molecular film) which is deformable by an external pressure.

The plastic substrate has a structure which is formed by performing barrier coating opposite surfaces of a base film. The base film may be implemented by using various resins such as polyimide (PI), polycarbonate (PC), polyethyleneterephtalate (PET), polyethersulfone (PES), polyethylenenaphthalate (PEN), and fiber reinforced plastic (FRP). The barrier coating is performed on the opposite surfaces of the base film, and an organic membrane or an inorganic membrane may be used for the purpose of maintaining flexibility.

The substrate 111 may be formed of a flexible material such as thin glass or metal foil besides the plastic substrate.

The driving unit 112 drives the display panel 113. Specifically, the driving unit 112 applies driving voltage to a plurality of pixels constituting the display panel 113 and may be implemented by using a-si, TFT, low temperature poly silicon (LTPS) TFT, organic TFT (OTFT). The driving unit 112 may also be implemented in various forms according to the form of the display panel 113.

For instance, the display panel 113 may include an organic light emitting substance which consists of a plurality of pixel cells and an electrode layer which covers opposite surfaces of the organic light emitting substance. In this case, the driving unit 112 may include a plurality of transistors corresponding to the plurality of pixel cells of the display panel 113. The controller 130 applies an electric signal to a gate of each transistor and controls the pixel cell connected to the transistor to emit light. Accordingly, various screens are displayed.

Also, the display panel 113 may be implemented by using an electroluminescent display (ELD), an electrophoretic display (EPD), an electrochromic display (ECD), a liquid crystal display (LCD), an active matrix LCD (AMLCD), or a plasma display panel (PDP), besides the organic light emitting diode (OLED). However, the LCD cannot emit light by itself and thus requires a separate backlight unit. If the LCD does not use the backlight unit, it uses ambient light. In order to use the LCD display panel 113 without the backlight unit, an environment such as an outdoor environment which admits plenty of light may be used to operate the LCD.

The protection layer 114 protects the display panel 113. For example, the protection layer 114 may be made of ZrO, CeO2, or ThO2. The protection layer 114 may be manufactured as a transparent film and may cover the entire surface of the display panel 113.

Unlike in FIG. 2, the display unit 110 may be implemented by using electronic paper (e-paper). The e-paper is a display which applies general ink characteristics to paper and is different from a general flat panel display in that it uses reflective light.

If the display unit 110 is comprised of elements of a transparent material, the display unit 110 may be implemented as a display apparatus which is bendable and has transparency. For example, if the substrate 111 is made of a polymer material such as plastic having transparency, the driving unit 112 is implemented by a transparent transistor, and the display panel 113 is implemented by using a transparent organic light emitting substance and a transparent electrode, the display unit 110 has transparency.

The transparent transistor refers to a transistor which is manufactured by substituting opaque silicon of an existing thin film transistor with a transparent material such as transparent zinc-oxide or titanium oxide. The transparent electrode may be made of advanced materials such as indium tin oxide (ITO) or graphene. Graphene is a material which has a planar structure of a honeycomb shape in which carbon atoms are connected to one another, and has transparency. The transparent organic light emitting layer may be implemented by using various materials.

The display unit 110 may be disposed on an overall area or a part of the overall area of the flexible display apparatus 100. The sensing unit 120 is provided in the display unit 110 to sense whether the display unit 110 is deformed or not.

FIGS. 8 to 30 are views to explain types of shape deformation which can be sensed in the flexible display apparatus and a method for sensing thereof according to an exemplary embodiment.

The flexible display apparatus 100 may sense shape deformation with various configurations. For instance, the sensing unit 120 may include a bend sensor which is disposed on one surface such as a front surface or a rear surface of the display unit 110, or bend sensor which is disposed on opposite surfaces of the display unit 110. The controller 130 may sense shape deformation using a value sensed by the bend sensor of the sensing unit 120.

The bend sensor refers to a sensor which itself is bendable and has a resistance value changed according to a degree of bending. The bend sensor may be implemented by using devices such as an optical fiber bending sensor, a pressure sensor, or a strain gage.

The sensing unit 120 senses a resistance value of the bend sensor using a level of a voltage applied to the bend sensor or an intensity of a current flowing in the bend sensor, and senses a shape deformation state at a location of the bend sensor according to the resistance value.

Figure 8:
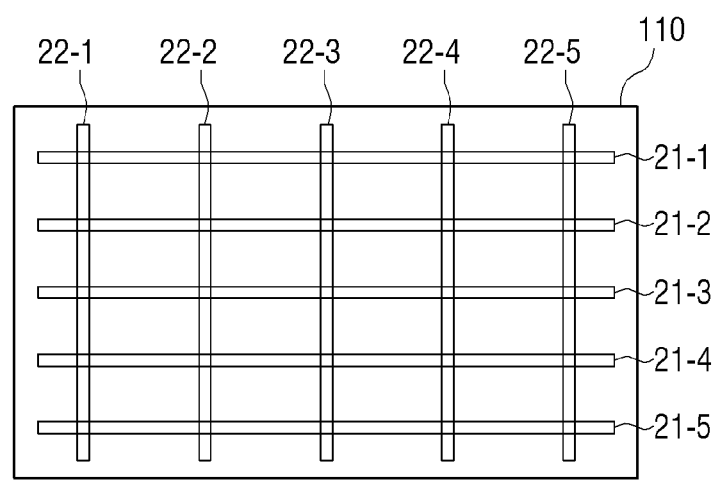
FIGS. 8 to 30 are views to explain a shape-deformable display unit and a method for detecting shape deformation.

In FIG. 8, bend sensors are embedded in a front surface of the display unit 110. However, this is merely an example and the bend sensors may be embedded in a rear surface of the display unit 110 or may be embedded in opposite surfaces of the display unit 110. Also, the shape, number, and location of bend sensors may be changed variously. For example, one bend sensor or a plurality of bend sensors may be connected with the display unit 110. The one bend sensor may sense one bending data, but may have a plurality of sensing channels to sense a plurality of shape deformation states.

FIG. 8 illustrates a plurality of bar-shaped bend sensors which are arranged in a vertical direction and a horizontal direction in a lattice pattern.

Referring to FIG. 8, the bend sensor includes bend sensors 21-1 to 21-5 which are arranged in a first direction, and bend sensors 22-1 to 22-5 which are arranged in a second direction perpendicular to the first direction.

In FIG. 8, the five bend sensors 21-1 to 21-5 or 22-1 to 22-5 are arranged in each of the horizontal direction and the vertical direction in a grid formation. However, this is merely an example. The number of bend sensors may be changed according to a size of the flexible display apparatus 100. The bend sensors are arranged in the horizontal direction and the vertical direction for the purpose of sensing shape deformation occurring in an overall area of the flexible display apparatus. Therefore, if only a part of the apparatus is flexible or if shape deformation needs to be detected on only a part of the apparatus, the bend sensor may be arranged in only a corresponding portion of the apparatus.

Each of the bend sensors 21-1 to 21-5 and 22-1 to 22-5 may be implemented by using an electric resistor sensor which uses an electric resistance or a micro optical fiber sensor which uses a strain of an optical fiber. Hereinafter, an explanation is provided on the assumption that the bend sensor is the electric resistor sensor for the convenience of explanation.

Figure 9:
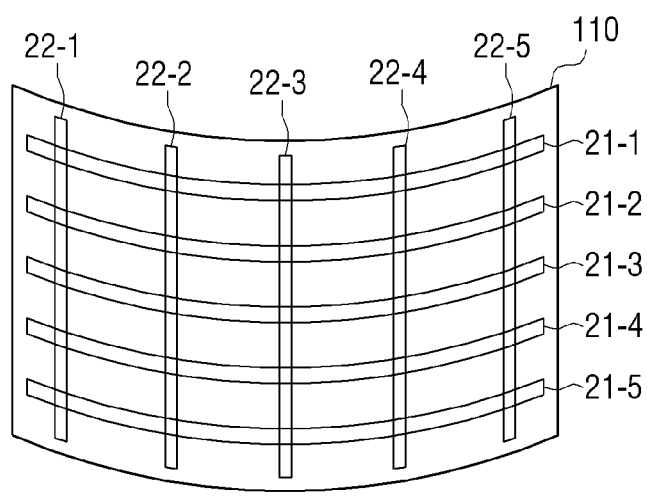

Specifically, if the flexible display apparatus 100 is deformed so that a center area with reference to left and right edges is oriented downwardly as shown in FIG. 9, tension is exerted to the bend sensors 21-1 to 21-5 which are arranged in the horizontal direction due to the shape deformation. Accordingly, the resistance value of each of the bend sensors 21-1 to 21-5 arranged in the horizontal direction is changed. The sensing unit 120 senses the change in the output value output from each of the bend sensors 21-1 to 21-5 and thus senses that the display unit 110 is bent in the horizontal direction with reference to a center of a display surface.

Figure 10:
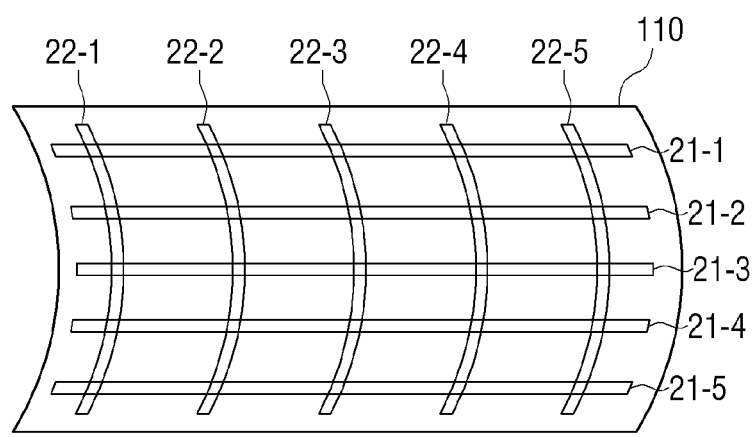

In FIG. 9, the center area is bent in a downward direction (hereinafter, a Z− direction) which is perpendicular to the display surface. However, if the center area is bent in an upward direction (hereinafter, a Z+ direction) which is perpendicular to the display surface, the sensing unit 120 senses the shape deformation based on the change in the output values of the bend sensors 21-1 to 21-5 of the horizontal direction. FIG. 10 illustrates the shape deformation of the Z+ direction.

If the flexible display apparatus 100 is bent so that the center area with reference to upper and lower edges is oriented upwardly as shown in FIG. 10, tension is exerted to the bend sensors 22-1 to 22-5 which are arranged in the vertical direction. The sensing unit 120 may sense the shape deformation of the vertical direction based on the output values of the bend sensors 22-1 to 22-5 arranged in the vertical direction. Although the bending in the Z+ direction is illustrated in FIG. 10, bending in the Z− direction may be sensed using the bending sensors 22-1 to 22-5 which are arranged in the vertical direction.

If shape deformation occurs in an oblique direction, tension is exerted to all of the bend sensors which are arranged in the horizontal direction and the vertical direction. Therefore, the shape deformation of the oblique direction may be sensed based on the output values of the bend sensors which are arranged in the horizontal and vertical directions.

Hereinafter, a method for sensing each shape deformation such as general bending, folding, and rolling using a bend sensor will be explained in detail.

Figure 11:
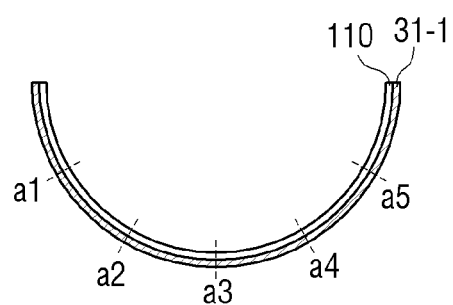
Figure 12:
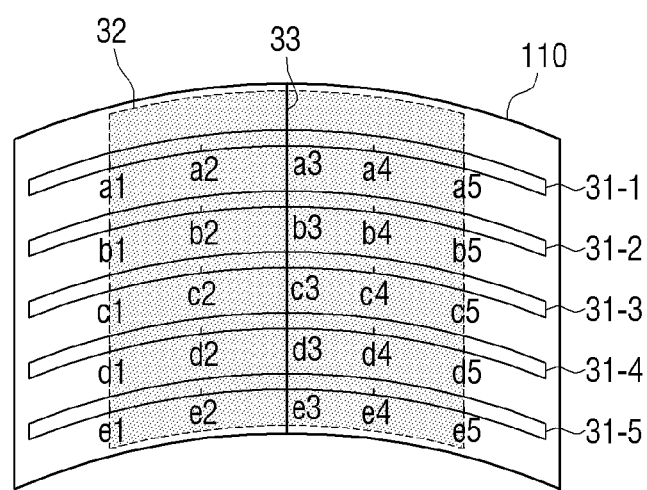
Figure 13:
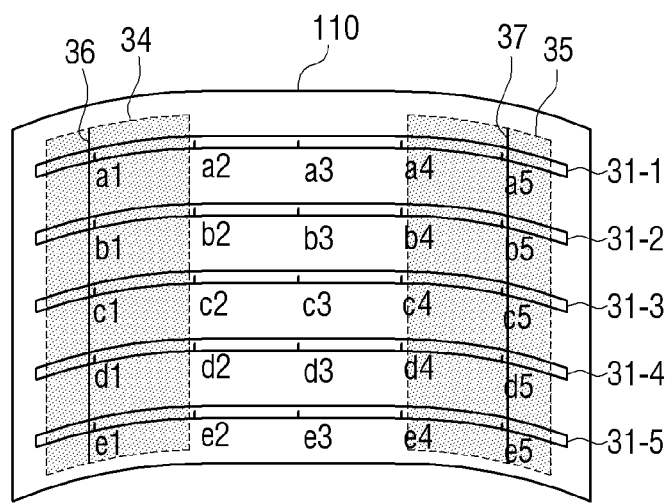

FIGS. 11 to 13 are views to explain a method for sensing shape deformation using a bend sensor in the flexible display apparatus according to an exemplary embodiment.

FIG. 11 is a cross section view of the flexible display apparatus 100 when the flexible display apparatus 100 is deformed.

If the flexible display apparatus 100 is deformed, a bend sensor, which is arranged on one surface or opposite surfaces of the flexible display apparatus 100, is also bent and has a resistance value corresponding to a magnitude of exerted tension, and outputs an output value corresponding to the resistance value.

For instance, if the flexible display apparatus 100 is deformed as shown in FIG. 1, a bend sensor 31-1 which is disposed on a rear surface of the flexible display apparatus 100 is also bent and outputs a resistance value according to a magnitude of exerted tension.

In this case, the magnitude of the tension increases in proportion to a degree of deformation. For example, if the bending occurs as shown in FIG. 11, greatest shape deformation occurs in the center area. Accordingly, greatest tension is exerted to the bend sensor 31-1 which is disposed at a point a3 which is the center area, and accordingly, the bend sensor 31-1 has a greatest resistance value. On the other hand, the degree of deformation decreases toward the outside. Accordingly, the bend sensor 31-1 has smaller resistance values as it goes away from the point a3 to points a2 and a1 or a4 and a5.

If the resistance value output from the bend sensor has the greatest value at a specific point and gradually decreases in opposite directions, the sensing unit 120 determines that the area from which the greatest resistance value is sensed is most significantly deformed. Also, if an area has no change in the resistance value, the sensing unit 120 determines that the area is a flat area without shape deformation, and, if an area has the resistance value changed greater than a predetermined value, determines that the area is a shape deformation area in which any degree of bending occurs.

FIGS. 12 and 13 are views to explain a method for defining a bending area according to an exemplary embodiment. FIGS. 12 and 13 are provided to explain the case in which the flexible display apparatus is bent in the horizontal direction with reference to a front surface, and thus do not illustrate bend sensors which are arranged in the vertical direction for the convenience of explanation. Although different reference numerals are used for the bend sensors in each drawing for the convenience of explanation, the bend sensors illustrated in FIG. 8 may be used as they are in practice.

A shape deformation area refers to an area in which the flexible display apparatus is bent and crooked. Since the bend sensor is also crooked due to the shape deformation, all areas in which bend sensors outputting different resistance values from those in the original state are located may be defined as the shape deformation area.

The sensing unit 120 may sense a size of a bending line, a direction of the bending line, a location of the bending line, a number of bending lines, a number of times that bending occurs, a bending speed of shape deformation, a size of the bending area, a location of the bending area, and a number of bending areas, based on a relationship between points at which a change in the resistance value is sensed.

Specifically, if a distance between the points at which the change in the resistance value is sensed is within a predetermined distance, the sensing unit 120 senses the points which output the resistance values as a single shape deformation area. On the other hand, if the distance between the points at which the change in the resistance value is sensed is beyond the predetermined distance, different bending areas are divided and defined with reference to these points. A more detailed explanation will be provided with reference to FIGS. 12 and 13.

FIG. 12 is a view to explain a method for sensing a single shape deformation area. If the flexible display apparatus 100 is bent as shown in FIG. 12, the flexible display apparatus 100 has different resistance values from those in the original state, from points a1 to a5 of a bend sensor 31-1, from points b1 to b5 of a bend sensor 31-2, from points c1 to c5 of a bend sensor 31-3, from points d1 to d5 of a bend sensor 31-4, and from points e1 to e5 of a bend sensor 31-5.

In this case, the points at which the change in the resistance value is sensed in each bend sensor 31-1 to 31-5 are located away from one another within a predetermined distance and continuously arranged.

Accordingly, the sensing unit 120 senses an area 32 including all of the points from a1 to a5 of the bend sensor 31-1, from b1 to b5 of the bend sensor 31-2, from c1 to c5 of the bend sensor 31-3, from d1 to d5 of the bend sensor 31-4, and from e1 to e5 of the bend sensor 31-5 as a single bending area.

FIG. 13 is a view to explain a method for sensing a plurality of bending areas.

If the flexible display apparatus 100 is bent as shown in FIG. 13, the flexible display apparatus 100 has different resistance values from those in the original state, from points a1 to a2 and from points a4 to a5 of the bend sensor 31-1, from points b1 to b2 and from points b4 to b5 of the bend sensor 31-2, from points c1 to c2 and from points c4 to c5 of the bend sensor 31-3, from points d1 to d2 and from points d4 to d5 of the bend sensor 31-4, and from points e1 to e2 and from points e4 to e5 of the bend sensor 31-5.

The points from a1 to a2 and the points from a4 to a5 in the bend sensor 31-1 are continuous with reference to each point. However, since a point a3 exists between the points a2 and a4, the points from a2 to a4 are not continuous. Accordingly, if the points a2 and a4 are regarded as being distanced away from each other as much as a predetermined distance, the bending area is divided into a bending area from the points a1 to a2 and a bending area from the points a4 to a5. Also, the points in the other bend sensors 31-2 to 31-5 may be divided in this way.

Accordingly, the flexible display apparatus 100 defines an area 34 including all of the points from a1 to a2 of the bend sensor 31-1, from b1 to b2 of the bend sensor 31-2, from c1 to c2 of the bend sensor 31-3, from d1 to d2 of the bend sensor 31-4, and from e1 to e2 of the bend sensor 31-5 as one shape deformation area, and defines an area 35 including all of the points from a4 to a5 of the bend sensor 31-1, from b4 to b5 of the bend sensor 31-2, from c4 to c5 of the bend sensor 31-3, from d4 to d5 of the bend sensor 31-4, and from e4 to e5 of the bend sensor 31-5 as another shape deformation area.

The shape deformation area may include a bending line. The bending line refers a line which connects the points at which the greatest resistance value is sensed in each shape deformation area.

For instance, in the case of FIG. 12, a line 33 in the shape deformation area 32, which connects the point a3 at which the greatest resistance value is output in the bend sensor 31-1, the point b3 at which the greatest resistance value is output in the bend sensor 31-2, the point c3 at which the greatest resistance value is output in the bend sensor 31-3, the point d3 at which the greatest resistance value is output in the bend sensor 31-4, and the point e3 at which the greatest resistance value is output in the bend sensor 31-5, is defined as a bending line. FIG. 12 illustrates the bending line which is formed in the center area of the display surface in the vertical direction.

In the case of FIG. 13, a line 36 in the shape deformation area 34, which connects the point a1 at which the greatest resistance value is output in the bend sensor 31-1, the point b1 at which the greatest resistance value is output in the bend sensor 31-2, the point c1 at which the greatest resistance value is output in the bend sensor 31-3, the point d1 at which the greatest resistance value is output in the bend sensor 31-4, and the point e1 at which the greatest resistance value is output in the bend sensor 31-5, is defined as one bending line. Also, a line 37 in the shape deformation area 35, which connects the point a5 at which the greatest resistance value is output in the bend sensor 31-1, the point b5 at which the greatest resistance value is output in the bend sensor 31-2, the point c5 at which the greatest resistance value is output in the bend sensor 31-3, the point d5 at which the greatest resistance value is output in the bend sensor 31-4, and the point e5 at which the greatest resistance value is output in the bend sensor 31-5, is defined as another bending line.

Figure 14:
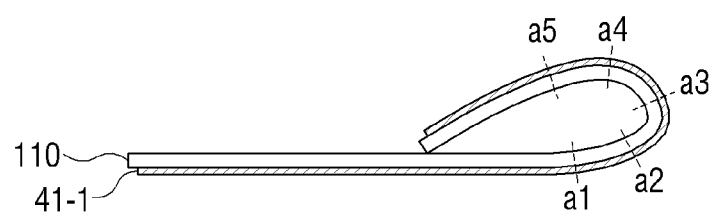
Figure 15:
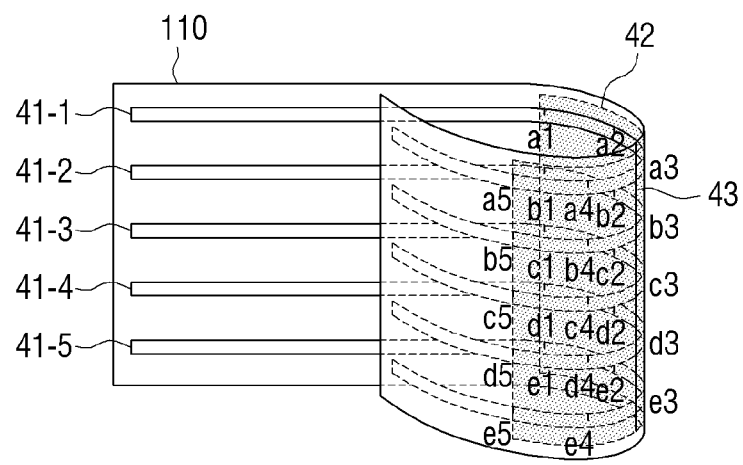

FIGS. 14 and 15 are views to explain an example of a method for sensing a folding state of the flexible display apparatus 100.

First, FIG. 14 is a cross section view of the flexible display apparatus 100 when the flexible display apparatus 100 is folded.

If the flexible display apparatus 100 is folded, a bend sensor which is disposed on one surface or opposite surfaces of the flexible display apparatus 100 is also bent and has a resistance value corresponding to a magnitude of exerted tension.

For example, if a right edge of the flexible display apparatus 100 is folded in a direction toward a center as shown in FIG. 14, a bend sensor 41-1 which is disposed on the rear surface of the flexible display apparatus 100 is also bent and outputs a resistance value according to a magnitude of exerted tension.

That is, like in the case of the general bending, the bend sensor 41-1 has the greatest resistance value at a point a3 at which the magnitude of the exerted tension is greatest, and has smaller resistance values as it goes away from the point a3. That is, the bend sensor 41-1 has smaller resistance values as it goes away from the point a3 to points a2 and a1 or points a4 and a5.

If the flexible display apparatus 100 is folded greater than a predetermined bending angle, a resistance value greater than a predetermined value is sensed at a point corresponding to a bending line. Accordingly, the controller 130 may determine whether shape deformation is folding or general bending according to the resistance value.

If the flexible display apparatus 100 is bendable to the extent that their surfaces meet, the controller 130 may determine whether the shape deformation is folding or not, considering touch as well. That is, if the right edge of the flexible display apparatus 100 is bent in the Z+ direction and is folded toward a front surface, areas distanced away from each other on the front surface of the flexible display apparatus are brought into contact with each other. In this case, touch is sensed on one area of the display surface and a change in the resistance value is greater than that in general bending. Accordingly, the controller 130 calculates a distance from the edge where bending is performed to the bending line, and, if touch is sensed at a point which is distanced away from the bending line in the opposite direction as much as the calculated distance, determines that folding is performed.

FIG. 15 is a view to explain a method for determining a folding area according to an exemplary embodiment. Since FIG. 15 is to explain a case in which the flexible display apparatus is folded in a horizontal direction with reference to a front surface, bend sensors which are arranged in a vertical direction are not illustrated for the convenience of explanation.

A folding area is a bent area which is formed when the flexible display apparatus is folded, and may be defined as one or two or more areas including all points of the bend sensors which output different resistance values from those of the original state when the bend sensors are bent like in general bending. The method for defining and dividing the folding area is the same as for the bending area and thus an overlapped explanation is omitted.

Referring to FIG. 15, an area 42, which includes points at which output resistance values are different from those of the original state, that is, from points a1 to a5 of a bend sensor

41-1, from points b1 to b5 of a bend sensor 41-2, from points c1 to c5 of a bend sensor 41-3, from points d1 to d5 of a bend sensor 41-4, and from points e1 to e5 of a bend sensor 41-5, is defined as one folding area.

The folding area is divided into two areas with reference to a folding line. The folding line refers to a line which connects points at which the greatest resistance value is output in each folding area. The meaning of the folding line is the same as that of the bending line.

In FIG. 15, a line 43 in the folding area 42, which connects the point a3 at which the bend sensor 41-2 outputs the greatest resistance value, the point b3 at which the bend sensor 41-2 outputs the greatest resistance value, the point c3 at which the bend sensor 41-3 outputs the greatest resistance value, the point d3 at which the bend sensor 41-4 outputs the greatest resistance value, and the point e3 at which the bend sensor 41-5 outputs the greatest resistance value, is defined as the folding line.

If the folding is sensed, the controller 130 may perform a different operation from that of the general bending. For example, the controller 130 may display a different content screen on each folding area.

As described above, the flexible display apparatus 100 may be rolled like paper. The controller 130 may determine whether rolling is performed or not using a result sensed by the sensing unit 120.

Figure 16:
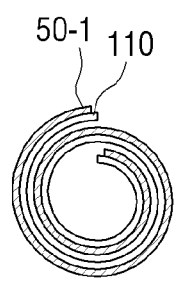
Figure 17:
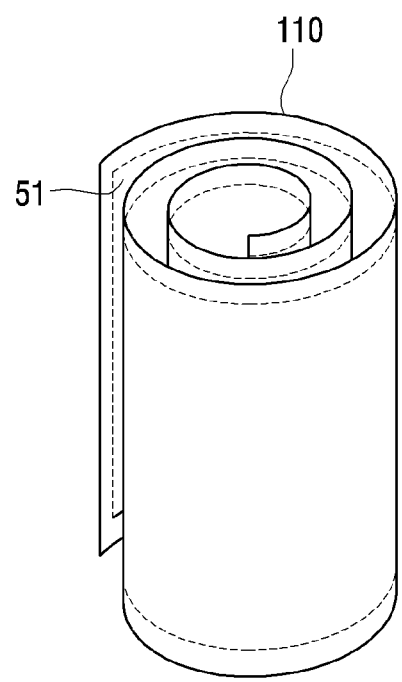
Figure 18:
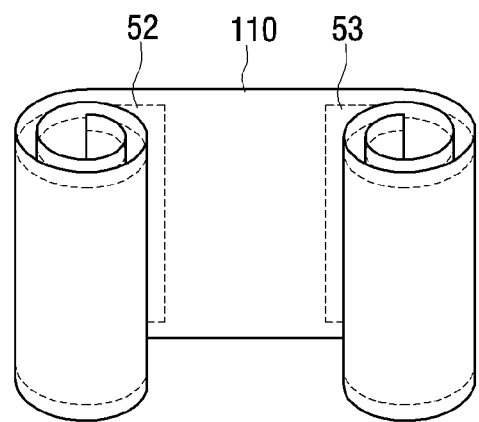

FIGS. 16 to 18 are views to explain a method for sensing rolling of the flexible display apparatus.

The rolling refers to a state in which the flexible display apparatus is rolled. The rolling is also determined based on a bending angle. For instance, if bending of an angle greater than a predetermined bending angle is sensed over a predetermined area, the rolling is determined. On the other hand, if bending of an angle smaller than a predetermined bending angle is sensed on an area relatively smaller than an area on which the rolling is sensed, the folding is determined. The above-described general bending, folding, and rolling may be determined based on a radius of curvature besides the bending angle.

Also, if a cross section of the flexible display apparatus 100 when it is rolled has a substantially circular or oval shape regardless of the radius of curvature, the rolling is determined.

FIG. 16 is a cross section view when the flexible display apparatus 100 is rolled. As described above, if the flexible display apparatus 100 is rolled, tension is exerted to bend sensors which are arranged on one surface or opposite surfaces of the flexible display apparatus.

In this case, since magnitudes of tension exerted to the bend sensors are deemed to be similar within a predetermined range, resistance values output from the bend sensors are also similar within a predetermined range.

In order to perform the rolling, the bending should be performed to have a curvature greater than a predetermined curvature. If the rolling is performed, a bending area greater than that of the general bending or folding is formed. Accordingly, if bending of an angle greater than a predetermined bending angle is performed continuously on an area greater than a predetermined size, the controller 130 determines that shape deformation is rolling. Also, in the rolling state, the front surface and the rear surface of the flexible display apparatus are brought into contact with each other. For example, as shown in FIG. 16, if one edge of the flexible display apparatus 100 is bent in the Z+ direction and is rolled inward the display surface, the display surfaces, that is, the front surface and the rear surface on which a bend sensor 50-1 is disposed are brought into contact with each other.

Accordingly, in another example, the controller 130 may determine whether the flexible display apparatus 100 is rolled or not according to whether the front surface and the rear surface of the flexible display apparatus 100 are brought into contact with each other or not. In this case, the sensing unit 120 may use a touch sensor. If the resistance values output from the bend sensors are similar within a predetermined range and touch is sensed by the touch sensors disposed on the front surface and the rear surface of the flexible display apparatus, the controller 140 determines that the flexible display apparatus is rolled. Also, the controller 130 may determine whether the flexible display apparatus 100 is bent and some areas of the flexible display apparatus 100 are brought into contact with each other or close to each other using a magnetic sensor, an optical sensor, or a proximity sensor instead of the touch sensor.

FIGS. 17 and 18 are views to explain a method for defining a rolling area according to an exemplary embodiment. The rolling area refers to an entire area of the flexible display apparatus which is bent and rolled. Like in the general bending or the folding state, the rolling area refers to one or two or more areas which include all points of bend sensors at which different resistance values from those of the original state are output. The method for defining and dividing the rolling area is the same as that of the bending or folding area, and thus an overlapped explanation is omitted.

If the flexible display apparatus 100 is wholly rolled as shown in FIG. 17, an entire area 51 of the flexible display apparatus 100 is defined as the rolling area. If the flexible display apparatus 100 is rolled in part and points at which different resistance values from those of the original state are output are distanced from each other by a predetermined distance as shown in FIG. 18, partial areas 52 and 53 of the flexible display apparatus 100 are defined as different rolling areas.

As described above, the flexible display apparatus 100 is bent in various forms and the controller 130 senses each shape deformation state based on a result of sensing by the sensing unit 120. Also, the controller 130 may sense the type, location, direction, and degree of the shape deformation based on the result of sensing by the sensing unit 120.

Figure 19:
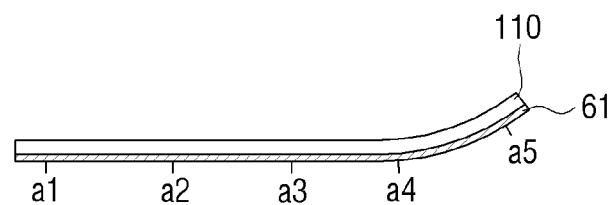
Figure 20:
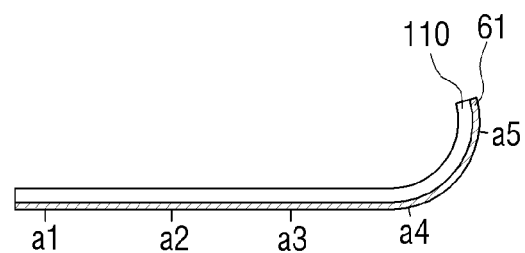

FIGS. 19 and 20 are views to explain a method for determining a degree of shape deformation. Referring to FIGS. 19 and 20, the flexible display apparatus 100 determines a degree of bending of the flexible display apparatus 100 using a change in the resistance value output from the bend sensor at a predetermined interval.

Specifically, the controller 130 calculates a difference between a resistance value of a point where the greatest resistance value of a bend sensor is output and a resistance value output at a point which is distanced from the point of the greatest resistance value.

The controller 130 determines the degree of bending using the calculated resistance value difference. Specifically, the flexible display apparatus 100 divides the degree of bending into a plurality of levels, matches each level with a resistance value of a predetermined range, and stores the level and resistance value.

Accordingly, the flexible display apparatus 100 determines the degree of bending according to which level of the plurality of levels corresponds to the calculated resistance value difference.

For instance, as shown in FIGS. 19 and 20, the degree of bending is determined based on a difference between a resistance value output at a point a5 where a bend sensor 61 disposed on the rear surface of the flexible display apparatus 100 outputs a greatest resistance value, and a resistance value output at a point a4 which is distanced from the point a5.

Specifically, in the exemplary embodiment of FIGS. 19 and 20, a level corresponding to the calculated resistance value difference is identified from among the plurality of pre-stored levels, and a degree of shape deformation is determined based on the identified level. The degree of shape deformation may be represented by a bending angle or a degree of bending.

Since the degree of shape deformation illustrated in FIG. 20 is greater than that of FIG. 19, the difference between the resistance value output at the point a5 and the resistance value output at the point a4 in the exemplary embodiment of FIG. 20 is greater than the difference between the resistance value output at the point a5 and the resistance value output the point a4 in the exemplary embodiment of FIG. 19. Accordingly, if the flexible display apparatus 100 is bent as shown in FIG. 20, the degree of shape deformation is determined to be great.

The controller 130 may perform an appropriate operation according to a degree of shape deformation. For example, if the degree of shape deformation is great while a channel zapping operation is performed, the controller 130 may increase a channel zapping (i.e., channel changing, channel scanning, etc.) speed or may extend a channel zapping range. On the other hand, if the degree of shape deformation is low, the channel zapping is performed more slowly or within a smaller number of channels. Volume control or content conversion may be performed differently according to the degree of shape deformation.

As described above, the shape deformation of the flexible display apparatus 100 is performed in different directions, a Z+ direction or a Z− direction.

The direction of the shape deformation may be sensed in various ways. For instance, two bend sensors may be disposed one on the other and a bending direction is determined based on a difference in change in the resistance value of each bend sensor. A method for sensing a bending direction using overlapping bend sensors will be explained with reference to FIGS. 21 to 23.

Figure 21:
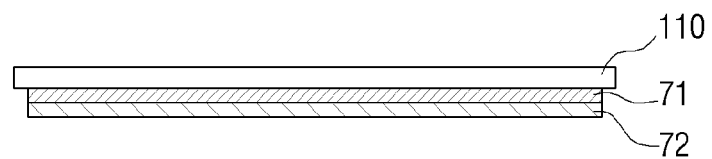
Figure 22:
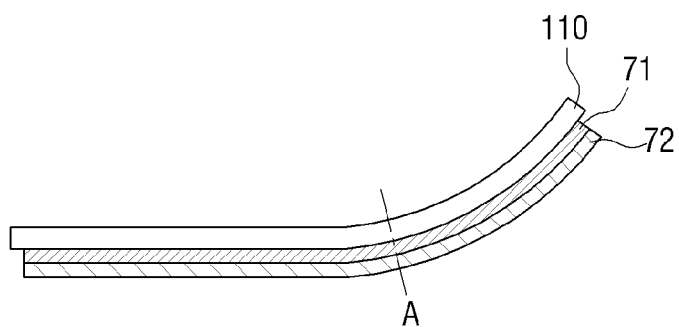
Figure 23:
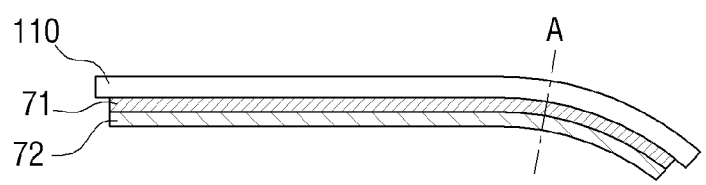

For the convenience of explanation, in FIGS. 21 to 23, the method is explained on the assumption that general bending is performed. However, the same method may be applied to folding or rolling.

Referring to FIG. 21, two bend sensors 71 and 72 may disposed overlapping each other on one side of the display unit 110. In this case, if bending is performed in one direction, different resistance values are output from the upper bend sensor 71 and the lower bend sensor 72 at a point where the bending is performed. Accordingly, a bending direction may be determined by comparing the resistance values of the two bend sensors 71 and 72 at the same point.

Specifically, if the flexible display apparatus 100 is bent in the Z+ direction as shown in FIG. 22, tension exerted to the lower bend sensor 72 is greater than that of the upper bend sensor 71 at a point A corresponding to a bending line.

On the other hand, if the flexible display apparatus 100 is bent toward the rear surface as shown in FIG. 23, tension exerted to the upper bend sensor 71 is greater than that of the lower bend sensor 72.

Accordingly, the controller 130 compares the resistance values of the two bend sensors 71 and 72 at the point A, thereby sensing the bending direction.

Although the two bend sensors are disposed overlapping each other on one side of the display unit 110 in FIGS. 21 to 23, the bend sensors may be disposed on opposite surfaces of the display unit 110.

Figure 24:
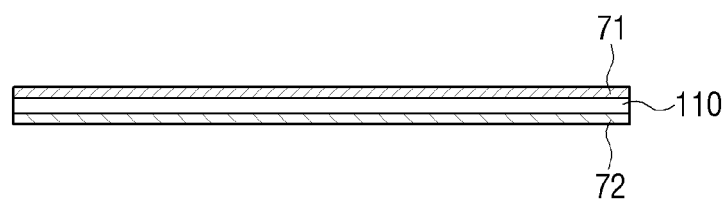

FIG. 24 illustrates the two bend sensors 71 and 72 which are disposed on the opposite surfaces of the display unit 110. Accordingly, if the flexible display apparatus 100 is bent in a first direction perpendicular to the screen, that is, the Z+ direction, the bend sensor which is disposed on a first surface of the opposite surfaces of the display unit 110 is subject to a compressive force, whereas the bend sensor which is disposed on a second surface is subject to tension. On the other hand, if the flexible display apparatus 100 is bent in a second direction opposite to the first direction, that is, the Z−direction, the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is sensed using the two bend sensors in FIGS. 21 to 24, the bending direction may be sensed by means of only a strain gage disposed on one surface of the display unit. That is, the strain gage disposed on one surface applies a compressive force or tension according to its bending direction, and a bending direction can be determined by identifying a characteristic of the output value.

Figure 25:
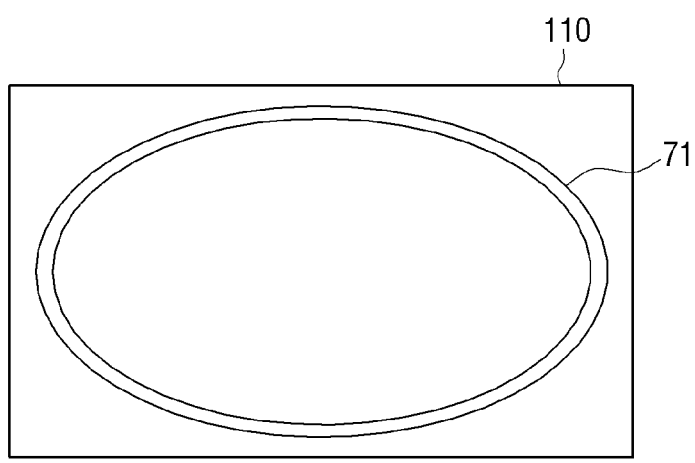

FIG. 25 is a view illustrating an example of a single bend sensor which is disposed on one surface of the display unit 110 to sense bending. Referring to FIG. 25, a bend sensor 71 may be implemented in a form of a looped curve forming a circle, a quadrangle, or other polygons, and may be disposed along an edge of the display unit 110. The controller 130 may determine a point at which a change in an output value of the looped curve is sensed to be a bending area. The bend sensor may be connected to the display unit 110 in a form of an open curve such as an S shape, a Z shape, or a zigzag shape.

Figure 26:
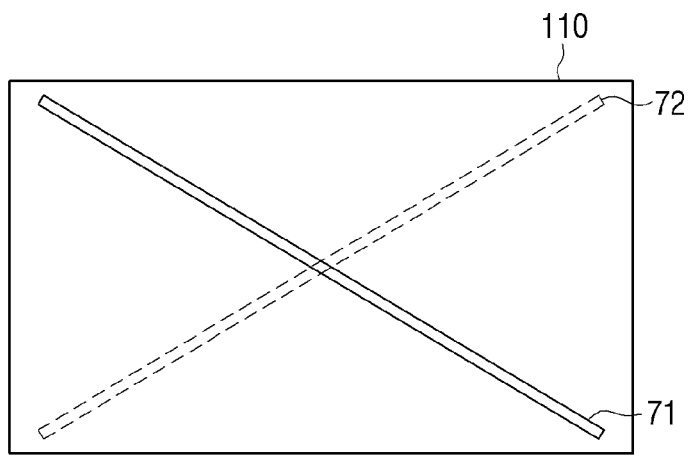

FIG. 26 is a view illustrating two bend sensors which intersect. Referring to FIG. 26, a first bend sensor 71 is disposed on a first surface of the display unit 110 and a second bend sensor 72 is disposed on a second surface of the display unit 110. The first bend sensor 71 is disposed on the first surface of the display unit 110 in a first diagonal direction, and the second bend sensor 72 is disposed on the second surface in a second diagonal direction. Accordingly, output values and output points of the first and the second bend sensors 71 and 72 are changed according to various bending conditions such as a case in which each corner is bent, a case in which each edge is bent, a case in which a center is bent, and a case in which folding or rolling is performed. Accordingly, the controller 130 may determine which type of bending is performed according to a characteristic of the output value.

Although line type bend sensors are used in the above-described various exemplary embodiments, bending may be sensed using a plurality of separate strain gages.

Figure 27:
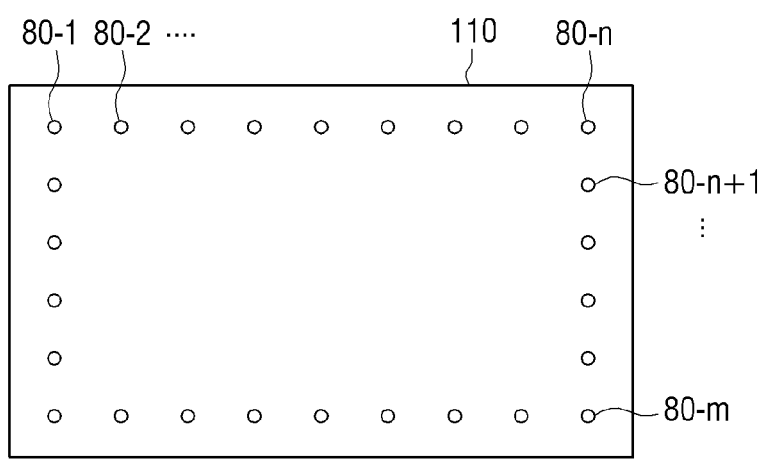
Figure 28:
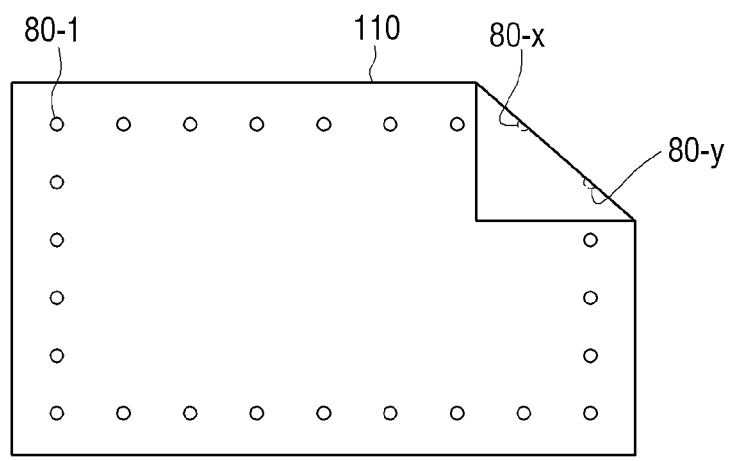

FIGS. 27 and 28 are views to explain a method for sensing bending using a plurality of strain gages. The strain gage uses metal or a semiconductor in which a resistance is greatly changed according to an applied force. The strain gage senses deformation of a surface of an object to be measured according to a change in the resistance value. It is common that a material such as metal increases a resistance value if its length is stretched due to an external force, and decreases the resistance value if the length is contracted. Accordingly, it is determined whether bending is performed or not by sensing a change in the resistance value.

Referring to FIG. 27, a plurality of strain gages are arranged along an edge of the display unit 110. The number of strain gages may be changed according to a size and a shape of the display unit 110, or a predetermined bending sensing resolution.

In the state in which the strain gages are arranged as shown in FIG. 27, a user may bend a certain point in a certain direction. Specifically, if a certain corner is bent as shown in FIG. 28, a force is exerted to a strain gage 80-$x$ overlapped with a bending line from among strain gages 80-1 to 80-$n$ which are arranged in a horizontal direction. Accordingly, an output value of the corresponding strain gage 80-$x$ increases in comparison with output values of the other strain gages. Also, a force is exerted to a strain gage 80-$y$ overlapped with the bending line from among strain gages 80-$n$, 80-$n$+1 to 80-$m$ which are arranged in a vertical direction, and thus an output value is changed. The controller 130 determines a line connecting the two strain gages 80-$x$ and 80-$y$ in which the output values are changed as the bending line.

Also, in addition to the exemplary embodiments of FIGS. 22 to 28, the flexible display apparatus 100 may sense a bending direction using various sensors such as a gyro sensor, a geomagnetic sensor, and an acceleration sensor.

Figure 29:
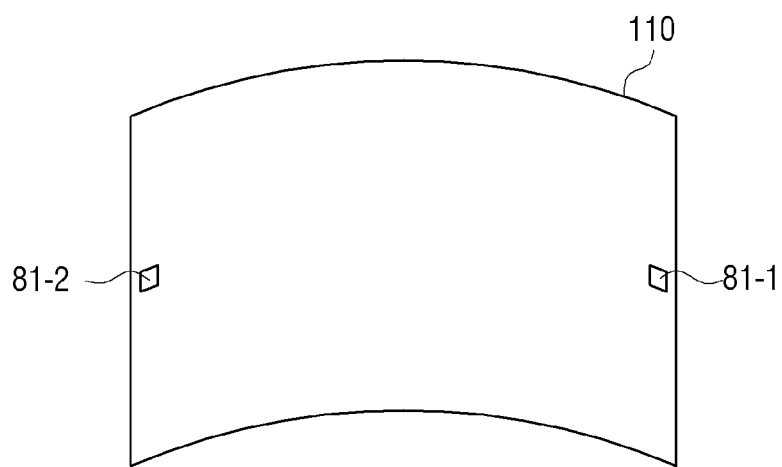
Figure 30:
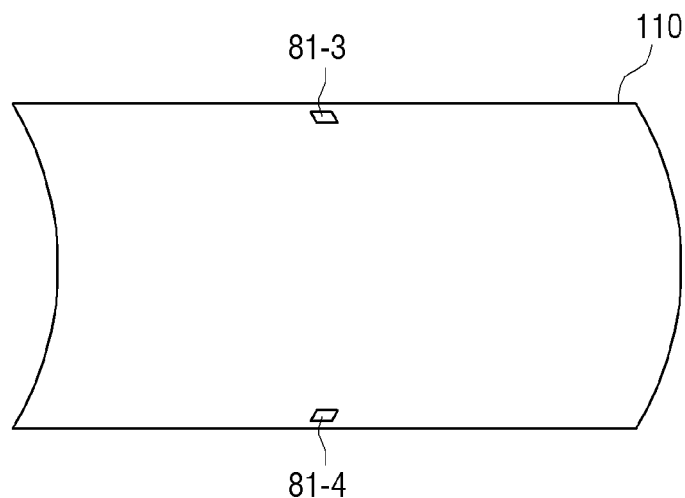

FIGS. 29 and 30 are views to explain a method for sensing a bending direction using an acceleration sensor for example. Referring to FIGS. 29 and 30, the flexible display apparatus 100 includes a plurality of acceleration sensors 81-1 and 81-2.

The acceleration sensors 81-1 and 81-2 can measure acceleration of a motion and a direction of the acceleration. Specifically, the acceleration sensors 81-1 and 81-2 output a sensing value corresponding to acceleration of gravity which changes according to a slope of an apparatus where those sensors are attached. Accordingly, if the acceleration sensors 81-1 and 81-2 are disposed on opposite edges of the flexible display apparatus, output values sensed by the acceleration sensors 81-1 and 81-2 are changed when the flexible display apparatus 100 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In FIG. 29, the acceleration sensors 81-1 and 81-2 are disposed on opposite edges in the horizontal direction with reference to the front surface of the flexible display apparatus 100. However, the acceleration sensors may be disposed in the vertical direction as shown in FIG. 30. In this case, if the flexible display apparatus 100 is bent in the vertical direction, a bending direction is sensed according to measurement values sensed by the acceleration sensors 81-3 and 81-4 of the vertical direction.

In FIGS. 29 and 30, the acceleration sensors are disposed on the left and the right edges or the upper and the lower edges of the flexible display apparatus 100. However, the acceleration sensors may be disposed all of the left, right, upper and right edges or may be disposed on corners.

As described above, a bending direction may be sensed using a gyro sensor or a geomagnetic sensor besides the acceleration sensor. The gyro sensor refers to a sensor which, if a rotational motion occurs, senses an angular velocity by measuring Coriolis' force exerted in a velocity direction of the motion. Based on the measurement value of the gyro sensor, a direction of the rotational motion can be detected and thus a bending direction can be also detected. The geomagnetic sensor refers to a sensor which senses azimuth using a t-axis or 3-axis fluxgate. If such a geomagnetic sensor is applied, the geomagnetic sensor disposed on each edge of the flexible display apparatus 100 suffers from location movement when the edge is bent, and outputs an electric signal corresponding to a change in geomagnetism caused by that. The controller 130 may calculate a yaw angle using the value output from the geomagnetic sensor. According to a change in the calculated yaw angle, various bending characteristics such as a bending area and a bending direction can be determined.

Also, if the motion sensor such as the acceleration sensor, the geomagnetic sensor, or the gyro sensor is used as shown in FIGS. 29 and 30, a bending position may be exactly grasped.

For instance, the user may bend the right edge by 30° in the Z+ direction so that a bending line is formed on the center of the flexible display apparatus 100, and also may bend the left edge by 30° in the Z− direction. In this case, although there is a difference in the user's positions to bend or the bending motion, finally bent and held shapes are the same. That is, in both cases, the final shape is a shape which slopes as much as 150° with reference to the bending line of the center. At this time, if the motion sensors are disposed on opposite edges as shown in FIGS. 29 and 30, a bending position can also be sensed using sensing values of the motion sensors. For instance, if a slope is sensed by the right acceleration sensor 81-1, it is determined that the right edge is moved in the Z+ direction and is folded with reference to the center line, and, if a slope is sensed by the left acceleration sensor 81-2, it is determined that the left edge is moved in the Z+ direction and is folded with reference to the center line. Accordingly, different functions may be performed according to the determined bending position. For example, if a bending and hold gesture is tried from the right, the screen is converted in a leftward direction, and, if a bending and hold gesture is tried from the left, the screen may be converted into a rightward direction.

Such a bending position may be determined using a touch sensor, a grip sensor or a pressure sensor besides the motion sensor. For instance, if bending is performed, it is determined that a bending and hold gesture starts from a point where touch, grip, or pressure is sensed.

As described above, the flexible display apparatus 100 may sense bending using various kinds of sensors. The above-described methods for arranging the sensors and methods for sensing may be applied to the flexible display apparatus 100 individually or may be applied in combination.

The sensing unit may sense user's touch manipulation on a screen of the display unit 110 besides the bending.

For instance, the sensing unit 120 may include a transparent conductive oxide film such as an indium-tin oxide (ITO) deposited on the substrate 11 of the display unit 110, and a film formed on an upper portion of the transparent conductive oxide film. Accordingly, if the user touches the screen, upper and lower plates at the touched point are brought into contact with each other and an electric signal is transmitted to the controller 130. The controller 130 recognizes the touched point using coordinates of an electrode to which the electric signal is transmitted.

If bending is performed, touch manipulation may not be precisely performed since the bending area is not flat and is flexible. Considering this, the controller 130 newly performs setting to recognize the touch manipulation. That is, in order to prevent malfunction, the controller 130 senses touch on a bent portion in a unit of a pixel area which includes a plurality of pixels, rather than in a unit of a pixel.

Also, while a bending and hold gesture is performed and a hold state is maintained, the controller 130 optimizes a sensing value of a touch sensor according to a deformed shape. For instance, if a screen is divided into two areas by bending, and one area is used in an upright position and the other area is used in a lying position on a bottom, the controller 130 newly sets touch coordinates values so that touch sensing on the upright area is performed on a position higher than an actually touched position, considering a user's view direction. That is, in order to select an object located at coordinates (x, y), the user should exactly touch the coordinates (x, y) in general. However, if the flexible display apparatus 100 is in the hold state and the screen is placed in a direction perpendicular to the bottom, it is recognized that the object at the point (x, y) is selected when the user touches coordinates (x-a, y-b), and an operation corresponding to that object is performed.

If touch or bending is sensed, the controller 130 determines whether user manipulation such as touch or bending is intended or not. Hereinafter, a method for determining user manipulation intention according to various exemplary embodiments will be explained in detail.

Figure 31:
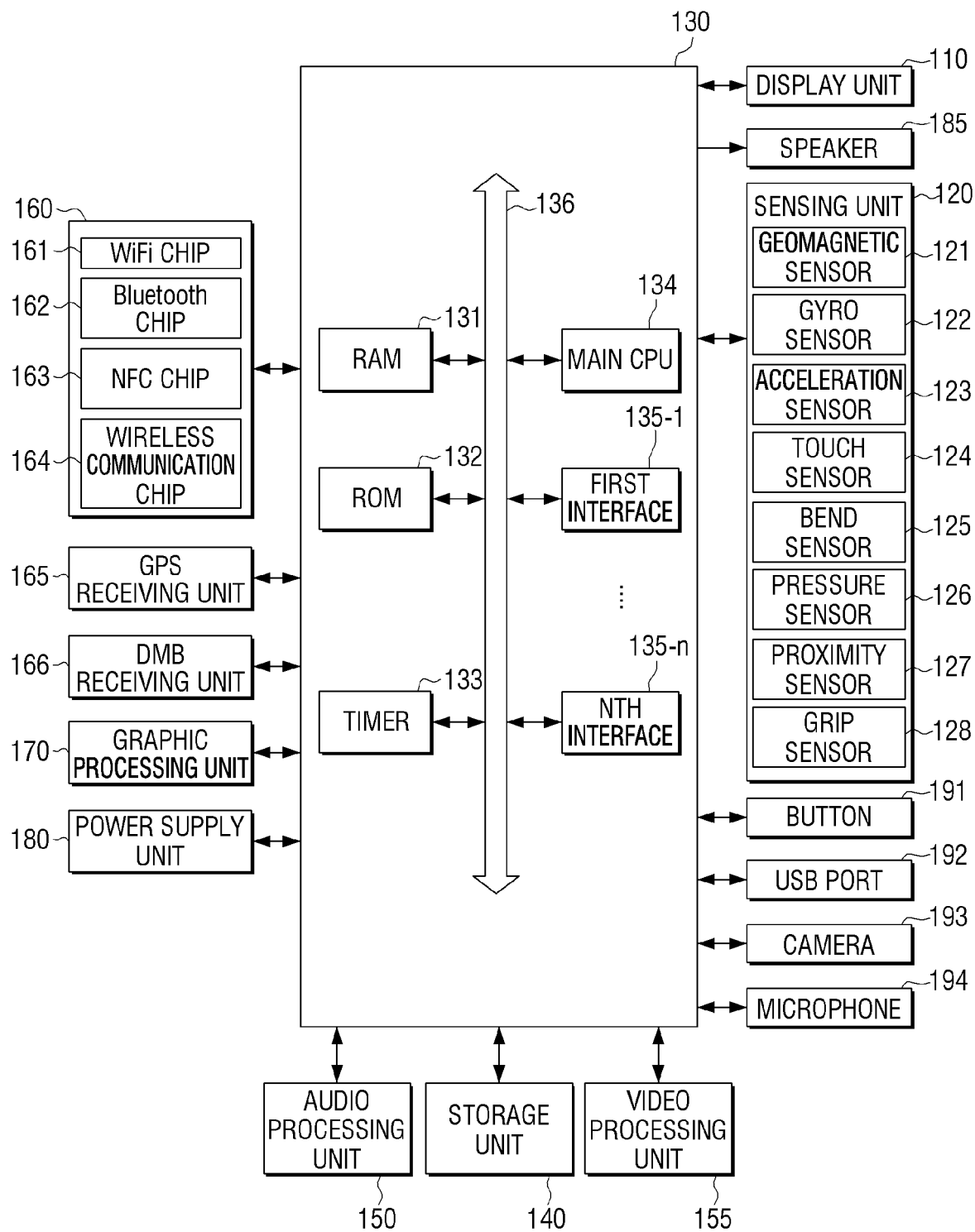
FIG. 31 is a block diagram illustrating a flexible display apparatus according to an exemplary embodiment.

FIG. 31 is a block diagram illustrating a flexible display apparatus according to various exemplary embodiments. Referring to FIG. 31, a flexible display apparatus 100 includes a display unit 110, a sensing unit 120, a controller 130, a storage unit 140, an audio processing unit 150, a video processing unit 155, a communication unit 160, a global position system (GPS) receiving unit 165, a digital multimedia broadcasting (DMB) receiving unit 166, a graphic processing unit 170, a power supply unit 180, a speaker 185, a button 191, an USB port 192, a camera 193, and a microphone 194.

The configuration and operation of the display unit 110 has been described above and thus a redundant explanation is omitted.

The sensing unit 120 may sense diverse user manipulations such as touch, rotation, motion, tilt, and pressure, as well as shape deformation of the flexible display apparatus 100. The controller 130 may control operations of the flexible display apparatus 100 using diverse user manipulation sensed by the sensing unit 120.

Referring to FIG. 31, the sensing unit 120 includes a geomagnetic sensor 121, a gyro sensor 122, an acceleration sensor 123, a touch sensor 124, a bend sensor 125, a pressure sensor 126, a proximity sensor 127, or a grip sensor 128.

The geomagnetic sensor 121 is to sense a rotation state and a moving direction of the flexible display apparatus 100. The gyro sensor 122 is to sense a rotation angle of the flexible display apparatus 100. Both the geomagnetic sensor 121 and the gyro sensor 122 may be provided, but, even if one of them is provided, the rotation state of the flexible display apparatus can be sensed. The acceleration sensor 123 is to sense a degree of tilt of the flexible display apparatus 100. The geomagnetic sensor 121, the gyro sensor 122, and the acceleration sensor 123 may be used to sense bending characteristics such as a bending direction or a bending area of the flexible display apparatus 100 as described above.

The touch sensor 124 may be implemented by using a capacitive type or a resistive type of sensor. The capacitive type calculates touch coordinates by sensing minute electricity excited in a user's body when a part of the user's body touches the surface of the display unit 110, using a dielectric substance coated on the surface of the display unit 110. The resistive type includes two electrode plates, and, if a user touches a screen, calculates touch coordinates by sensing an electric current flowing due to contact between upper and lower plates at a touched point. As described above, the touch sensor 124 may be embodied in various forms.

The bend sensor 125 may be embodied in various shapes and numbers as described above, and may sense a bent state of the flexible display apparatus 100. The configuration and operation of the bend sensor 125 has been described above and thus a redundant explanation is omitted.

The pressure sensor 126 senses a magnitude of pressure exerted to the flexible display apparatus 100 when the user performs touch or bending manipulation, and provides the magnitude of pressure to the controller 130. The pressure sensor 126 may include a piezo film which is embedded in the display unit 110 and outputs an electric signal corresponding to the magnitude of pressure. Although the touch sensor 124 and the pressure sensor 126 are separate elements in FIG. 31, if the touch sensor 124 is implemented by using a resistive touch sensor, the resistive touch sensor may also perform the function of the pressure sensor 126.

The proximity sensor 127 is to sense a motion which approaches without directly contacting the display surface. The proximity sensor 127 may be implemented by using various types of sensors such as a high-frequency oscillation type proximity sensor which forms a high frequency magnetic field and senses an electric current induced by a magnetic characteristic which is changed when an object approaches, a magnetic type proximity sensor which uses a magnet, and a capacitive type proximity sensor which senses capacitance changes when an object approaches.

The grip sensor 128 is disposed on a border or a handle of the flexible display apparatus 100 separately from the pressure sensor 126, and senses a user's grip. The grip sensor 128 may be implemented by using a pressure sensor or a touch sensor.

The controller 130 analyzes various sensing signals sensed by the sensing unit 120, determines a user's intention or gesture, and performs an operation corresponding to the intention or gesture. In particular, the controller 130 discriminates between a bending and flat gesture and a bending and hold gesture, so that the controller 130 can selectively perform a function allocated to each gesture.

In addition, the controller 130 may control operations according to various input methods such as touch manipulation, motion input, voice input, and button input besides the bending gesture. The touch manipulation may include simple touch, tap, touch and hold, move, flick, drag and drop, pinch in, and pinch out.

The controller 130 may execute an application stored in the storage unit 140, may configure an execution screen of the application, and may display the execution screen. Also, the controller 130 may reproduce various content stored in the storage unit 140. The controller 130 may communicate with external apparatus through the communication unit 160.

The communication unit 160 may communicate with various types of external apparatuses according to various communication methods. The communication unit 160 may include various communication chips such as a Wi-Fi chip 161, a Bluetooth chip 162, a near field communication (NFC) chip 163, and a wireless communication chip 164.

The Wi-Fi chip 161, the Bluetooth chip 162, and the NFC chip 163 communicate with external apparatuses in a Wi-Fi method, a Bluetooth method, and an NFC method, respectively. Among these, the NFC chip 163 is operated in the NFC method, which uses 13.56 MHz from among various RF-ID frequency bands such as 135 kHz, 13.56 MHz, 433 MHz, 860~960 MHz, and 2.45 GHz. If the Wi-Fi chip 161 or the Bluetooth chip 162 is used, a variety of connection information such as an SSID and a session key is exchanged first and connection is established using the connection information, and then, a variety of information is exchanged. The wireless communication chip 164 communicates with external apparatuses according various communication standards such as IEEE, Zigbee, $3^{rd}$ generation (3G), $3^{rd}$ generation partnership project (3GPP), and long term evolution (LTE).

The GPS receiving unit 165 receives a GPS signal from a GPS satellite and calculates a current position of the flexible display apparatus 100.

The DMB receiving unit 166 receives a DMB signal and processes the same.

The graphic processing unit 170 generates a screen including various objects such as an icon, an image, and text using a calculation unit (not shown) and a rendering unit (not shown). The calculation unit calculates attribute values of each object to be displayed according to a layout of the screen, such as coordinates values, a shape, a size, and a color. The rendering unit generates a screen of various layouts including objects based on the attribute values calculated by the calculation unit. The screen generated by the rendering unit is displayed on a display area of the display unit 110.

The power supply unit 180 supplies power to each element of the flexible display apparatus 100. The power supply unit 180 may include an anode collector, an anode electrode, an electrolyte unit, a cathode electrode, a cathode collector, and a coating unit enclosing the aforementioned elements. The power supply unit 180 may be implemented by using a secondary cell which can be charged or discharge electricity. The power supply unit 180 may be implemented in a flexible form so that the power supply unit 180 can be bent along with the flexible display apparatus 100. In this case, the collectors, the electrodes, the electrolyte, and the coating unit may be made of flexible materials. A detailed configuration and materials of the power supply unit 180 will be explained in detail below.

The audio processing unit 150 processes audio data. The audio processing unit 150 may perform various processing operations such as decoding, amplification, and noise filtering with respect to the audio data.

The video processing unit 155 processes video data. The video processing unit 155 may perform various image processing operations such as decoding, scaling, noise filtering, frame rate conversion, and resolution conversion with respect to the video data.

The audio processing unit 150 and the video processing unit 155 may be used to process multimedia content or DMB signals and reproduce them.

The display unit 110 display a video frame processed by the video processor 155 and the screen generated by the graphic processing unit 170.

The speaker 185 outputs various notification sounds or voice messages as well as various audio data processed by the audio processing unit 150.

The button 191 may be implemented by using various kinds of buttons such as a mechanical button, a touch button, and a wheel, which are formed on a certain area of the flexible display apparatus 100, such as a front surface, a side surface, and a bottom surface of a body exterior of the flexible display apparatus 100.

The USB port 192 may communicate with various external apparatuses through a USB cable.

The camera 193 captures a still image or a moving picture according to control of the user. The camera 193 may be a plurality of cameras including a front camera and a rear camera.

The microphone 194 receives a user's voice or other sounds and converts them into audio data. The controller 130 may use the user's voice input or voice command through the microphone 194 for a call process or to perform a function, or may convert it into audio data and store the audio data in the storage unit 140.

If the camera 193 and the microphone 194 are provided, the controller 130 may control operations according to a user voice input or voice command that input through the microphone 194 and a user motion recognized by the camera 193. That is, the flexible display apparatus 100 may be controlled by shape deformation or touch and also may be operated in a motion control mode or a voice control mode. In the motion control mode, the controller 130 activates the camera 193 and captures a user, traces a change in the user motion, and performs a corresponding control operation. In the voice control mode, the controller 130 may perform voice recognition by analyzing a user voice input through the microphone 194 and performing control operation according to the analyzed user voice.

In addition, the flexible display apparatus 100 may further include various external input ports to be connected to various external terminals such as a headset, a mouse, and a local area network (LAN).

The above-described operation of the controller 130 may be performed by a program which is stored in the storage unit 140. The storage unit 140 may store operating system (O/S) software to drive the flexible display apparatus 100, various applications, various data which is input or set when an application is executed, and various data such as content, bending gestures, and bending interaction guide information.

The controller 130 controls the overall operation of the flexible display apparatus 100 using various programs stored in the storage unit 140.

The controller 130 includes one or more of a random access memory (RAM) 131, a read only memory (ROM) 132, a timer 133, a main central processing unit (CPU) 134, first to nth interfaces 135-1~135-n, and a bus 136.

The RAM 131, the ROM 132, the timer 133, the main CPU 134, and the first to the nth interfaces 135-1~135-n may be connected to one another through the bus 136.

The first to the nth interfaces 135-1~135-n are connected to the above-described various elements. One of these interfaces may be a network interface which is connected to an external apparatus through a network.

The main CPU 134 accesses the storage unit 140 and performs booting using the O/S stored in the storage unit 140. The main CPU 134 performs various operations using the various programs, content, and data stored in the storage unit 140.

The ROM 132 stores a set of commands to boot the system. If a turn on command is input and power is supplied, the main CPU 134 copies the O/S stored in the storage unit 140 to the RAM 131 according to a command stored in the ROM 132, executes the O/S and boots the system. If the booting is completed, the main CPU 134 copies the various applications stored in the storage unit 140 into the RAM 131, executes the applications copied into the RAM 131, and performs various operations.

If a sensing signal corresponding to a shape deformation state sensed by the sensing unit 120 is received, the main CPU 134 stores diverse information on the operations at that point of time, such as an application or a function that has been performed before, or a screen layout which is being displayed at that point of time. The main CPU 134 monitors whether the sensing signal is changed or not. If the sensing signal is stops changing or remains constant, the main CPU 134 controls the timer 133 to count a period of time. Accordingly, if a predetermined time elapses while the sensing signal is not changed or remains constant, the main CPU 134 determines that a current gesture is a bending and hold gesture. On the other hand, if the sensing signal is maintained for period of time shorter than a predetermined time or continues to be changed, the main CPU 134 checks whether a characteristic of the shape deformation state matches pre-set information about shape deformation states. Accordingly, based on the shape deformation set and the preset information about shape deformation states, the main CPU 134 determines whether a bending and flat gesture, or other gestures such as bending, folding, and rolling occurs.

If the determination is completed, the main CPU 134 identifies information on a function matched with the determined gesture from the storage unit 140, loads an application for performing the function into the RAM 131, and executes the application.

In FIG. 31, the flexible display apparatus 100 is illustrated as an apparatus which is equipped with various functions such as a function of communicating, a function of receiving a broadcast, and a function of reproducing a video, for example, and various elements of the flexible display apparatus 100 are schematically illustrated. Accordingly, according to an exemplary embodiment, some of the elements illustrated in FIG. 31 may be omitted or modified, or another element may be added.

As described above, the controller 130 may perform various operations by executing a program stored in the storage unit 140.

Figure 32:
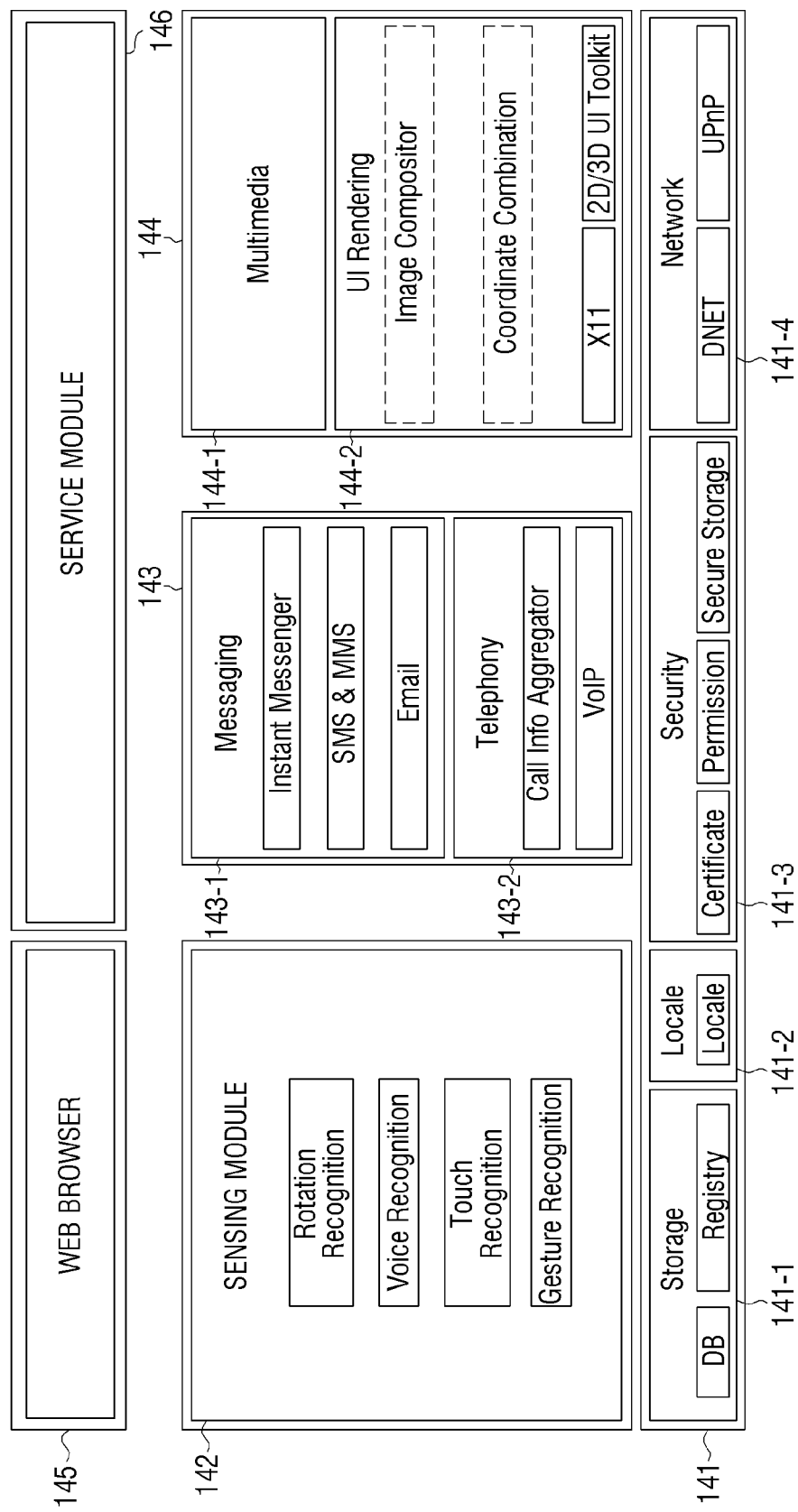
FIG. 32 is a view illustrating an example of a program which is stored in a storage unit of FIG. 31.

FIG. 32 is a view to explain software stored in the storage unit 140. Referring to FIG. 32, software including a base module 141, a sensing module 142, a communication module 143, a presentation module 144, a web browser module 145, and a service module 146 may be stored in the storage unit 140.

The base module 141 refers to a module which processes signals transmitted from each hardware included in the flexible display apparatus 100 and transmits the signals to an upper layer module.

The base module 141 includes a storage module 141-1, a location-based module 141-2, a security module 141-3, and a network module 141-4.

The storage module 141-1 is a program module which manages a database (DB) or a registry. The main CPU 134 may access the database in the storage unit 140 using the storage module 141-1, and may read out various data. The location-based module 141-2 is a program module which is interlocked and/or interacts with various hardware such as a GPS chip and supports a location-based service. The security module 141-3 is a program module which supports certification for hardware, permission of a request, and a secure storage. The network module 141-4 is a module to support network connection, and includes a Distributed.net (DNET) module and a Universal Plug and Play (UPnP) module.

The sensing module 142 is a module which collects information from various sensors included in the sensing unit 120, and analyzes and manages the collected information. Specifically, the sensing module 142 is a program module which detects manipulation attributes such as coordinates values of a point where touch is performed, a touch moving direction, a moving speed, and a moving distance. In addition, according to circumstances, the sensing module 142 may include a face recognition module, a voice recognition module, a motion recognition module (e.g., a rotation recognition module, a gesture recognition module, etc.), and a touch recognition module.

The communication module 143 is a module to communicate with an external apparatus. The communication module 143 includes a messaging module 143-1 such as a messenger program (e.g., an instant messenger program, etc.), a short message service (SMS) and multimedia message service (MMS) program, and an email program, and a telephony module 143-2 which includes a call information aggregator program module and a voice over internet protocol (VoIP) module.

The presentation module 144 is a module which generates a display screen. The presentation module 144 includes a multimedia module 144-1 to reproduce multimedia content and output the multimedia content, and a user interface (UI) rendering module 144-2 to process a UI and graphics. The multimedia module 144-1 may include a player module, a camcorder module, and a sound processing module. Accordingly, the multimedia module 144-1 generates a screen and a sound by reproducing various multimedia content, and reproduces the same. The UI rendering module 144-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 145 is a module which performs web-browsing and accesses a web server. The web browser module 145 may include a web view module to render and view a web page, a download agent module to download, a bookmark module, and a web-kit module.

The service module 146 is a module which includes various applications to provide services matched with manipulation if shape deformation or other various user manipulations are performed. Specifically, the service module 146 may include various program modules such as a navigation program, a content reproducing program, a game program, an e-book program, a calendar program, a notification management program, and other widgets. Each program module may be matched with various shape deformation states such as a bending and flat gesture or a bending and hold gesture.

Although various program modules are illustrated in FIG. 32, some of the program modules may be omitted, modified, or added according to type and characteristic of the flexible display apparatus 100. For instance, if the flexible display apparatus 100 is implemented by using a remote controller which excludes the display function and controls an external apparatus with only the flexibility, the presentation module 144, the web browser module 145, or the service module 146 may be excluded. In this case, only a module to detect a characteristic of a shape deformation state and a registry to indicate information on a control signal matched with a result of sensing may be stored in the storage unit 140.

The configuration and characteristics of the flexible display apparatus 100 according to various exemplary embodiments have been described above. Hereinafter, various functions performed by shape deformation of the flexible display apparatus 100 according to exemplary embodiments will be explained.

Figure 33:
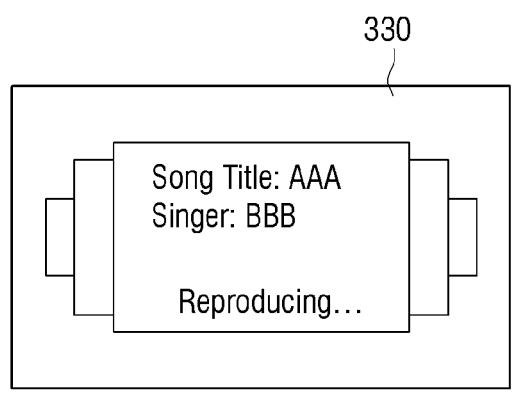
FIGS. 33 and 34 are views to explain an example of an operation performed by maintaining shape deformation while a content is reproduced.
Figure 33:
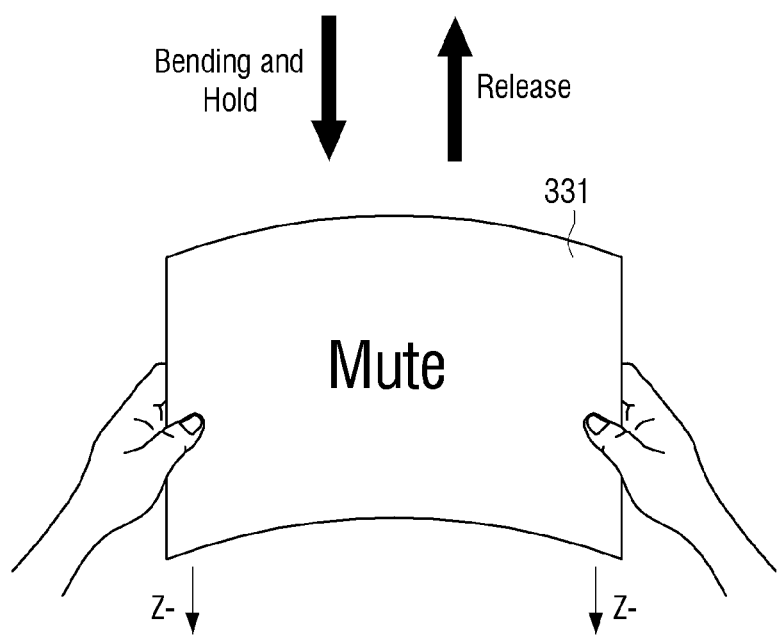
Figure 34:
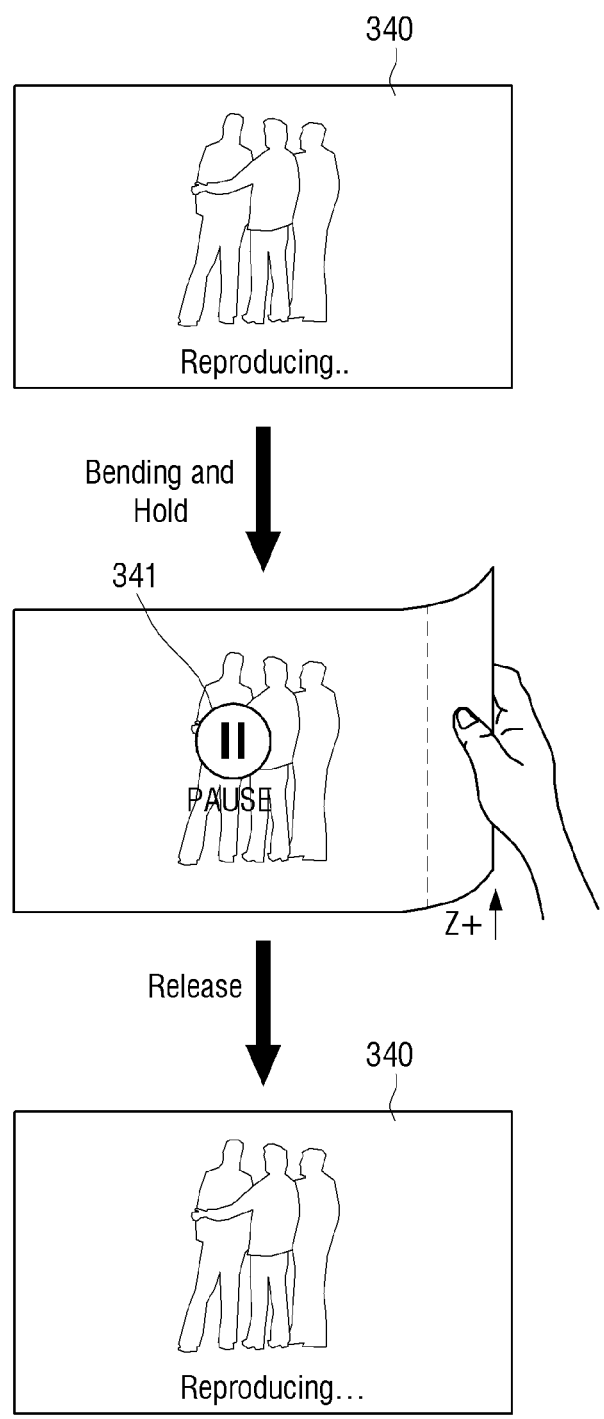

FIGS. 33 and 34 illustrate a case in which shape deformation is sensed while a multimedia content is reproduced.

The controller 130 of the flexible display apparatus 100 may reproduce a multimedia content stored in the storage unit 140 or a multimedia content received from an external source according to a user command. The multimedia content may be various content such as music content, photo content, video content, and 3D content. The user command to reproduce the multimedia content may be input using various means such as a bending gesture, a touch gesture, a motion gesture, and a voice command, and an explanation thereof is omitted.

If shape deformation is sensed by the sensing unit 120 while a multimedia content is reproduced, the controller 130 determines whether the shape deformation is maintained or not. It is determined whether the shape deformation is maintained or not by monitoring whether a magnitude of a sensing signal output from the bend sensor in the sensing unit 120 is maintained with a predetermined range or not. If the shape deformation is maintained, the controller 130 counts the maintaining time using the timer 133. Accordingly, it is determined whether the shape deformation state is maintained for a predetermined time or not.

If the shape deformation state is maintained, that is, if a bending and hold gesture is performed, the controller 130 performs a function matched with the bending and hold gesture. That is, if a bending and hold gesture is performed while a multimedia content is produced as described above, the controller 130 may perform a reproduction stop function to stop reproducing the multimedia content or a mute function to remove output of an audio signal included in the multimedia content.

FIG. 33 is a view to explain an operation performed if a bending and hold gesture is performed while a music file is reproduced.

Referring to FIG. 33, when a multimedia content is reproduced, brief information on the currently reproduced content may be displayed on a screen 330. In this state, if a bending and hold gesture is performed, the flexible display apparatus 100 performs a mute function to remove output of an audio signal. In this case, a message 331 informing that the mute function is performed may be displayed as shown in FIG. 33. In FIG. 33, the bending and hold gesture is performed by grasping opposite edges of the flexible display apparatus 100 with user's both hands and bending the flexible display apparatus 100 in a downward direction (Z−direction), and holding that state. However, the mute function may be matched with a bending and hold gesture of a different location, a different direction, and a different shape.

If the user suddenly has other things to do while listening to music or should turn off the volume for a moment, the user directly performs the mute function by bending the flexible display apparatus 100. The mute function is a function which removes only audio output, while normally reproducing content. Therefore, even if the mute function is performed, the content may be continuously processed.

If the user releases the shape deformation state of the flexible display apparatus 100 and the flexible display apparatus 100 returns to its original flat state, while performing the mute function, the mute function is terminated. Accordingly, the flexible display apparatus 100 returns to the original state.

FIG. 34 is a view to explain an operation performed if shape deformation is performed when a video content is reproduced. Referring to FIG. 34, if a video content is reproduced, a video frame is displayed on a screen 340.

In this state, if a bending and hold gesture is performed, the controller 130 may perform a function of stopping or pausing reproduction of the video content. In FIG. 34, a pause function is performed. If the pause function is performed, an object 341 indicating a pause state may be displayed on the screen 340.

In this state, if the bending and hold gesture is released, the controller 140 reproduces the content again. In this case, the controller 130 reproduces the content from where reproduction is stopped or paused. To achieve this, the controller 130 may store information regarding reproduction of the multimedia content in the storage unit 140 in advance. The information may be stored at a time when the shape deformation is sensed or may be stored at a time when it is determined the shape deformation state is maintained for a predetermined time as described above. The information on the reproduction of the multimedia content may be information on a type of the corresponding content, an address of the storage unit 140 or the external source where the corresponding content is recorded, and a degree of reproduction until that time.

In FIG. 34, the bending gesture to stop or pause reproduction of the content is performed on the right edge in the Z+ direction. However, the characteristic of the bending and hold gesture and a function thereof may be matched with each other variously. For example, the bending and hold gesture of bending the opposite edges with both hands shown in FIG. 33 may be matched with the content reproduction stop or pause function.

Also, the bending and hold gesture may be matched with a function other than the stop or pause function. For instance, if the flexible display apparatus 100 is folded in half while a video content is reproduced, a message input window to share the video content is displayed. Also, if a notification message regarding reproduction of content or an external source is generated while the flexible display apparatus 100 is used, the corresponding message may be displayed on a bent area. Also, if an entire screen on which a content list is displayed is rolled inward in an arc shape, a content located on that bending area may be selected or a highlight image of the content may be reproduced. Also, if a bending and hold gesture is performed on one corer or one edge of the screen while a video content is reproduced, the flexible display apparatus 100 may speed up the video content, or perform fast forward or rewind. Also, if a specific bending and hold gesture is matched with a mute function while a video content is reproduced, only audio output may be removed while the video is reproduced.

In FIGS. 33 and 34, the bending and hold gesture is performed on the content reproduction screen. However, background music, a background image, and a background video may be stored in the flexible display apparatus 100. Therefore, even if a photo, a video file, and a music file is reproduced on a background screen, various functions such as stop, pause, and mute may be performed by the bending and hold gesture.

In addition, if various content such as radio broadcast signals, TV broadcast signals, DMB broadcast signals, and web streaming content are output, different functions may be matched with a bending and hold gesture and gesture release in a specific pattern.

The flexible display apparatus 100 may perform various operations besides content reproduction. A function that is matched with a bending and hold gesture in each operation may be changed variously.

For instance, if shape deformation is sensed while a screen of a first layout is displayed on the display unit 110, and the shape deformation state is maintained for a predetermined time, the layout of the screen may be changed to a second layout.

The first layout refers to a layout which is displayed on an entire display area of the display unit 110. On the other hand, the second layout includes a plurality of screens and displays execution screens of different applications on the screens.

The controller 130 changes the layout to the second layout by moving the screen displayed on the entire area of the display unit 110 to one side when the bending and hold gesture is performed, and opening a new display area. The shape, location, size, and purpose of the new display area may be determined according to various conditions such as location, method, and direction of the shape deformation, and an operation state when the shape deformation is performed.

If the new display area is opened, the controller 130 may display various objects on the new display area. The object may be different according to the operation before the bending and hold gesture is performed, that is, the operation state before the shape deformation is sensed. Specifically, the object may be of various forms such as a message input window, a notification window, a soft keyboard, an image edit tool, a content list, and a clip board.

If the hold state is released, the controller 130 controls the screen to return to the first layout. To achieve this, the controller 130 may store information on the first layout in the storage unit 140 when the bending and hold gesture is performed. Then, the controller 130 changes the layout of the screen to the second layout corresponding to the shape deformation state. After that, if the shape deformation state is released, the controller 130 may change the layout of the screen to the first layout using the information stored in the storage unit 140.

Figure 35:
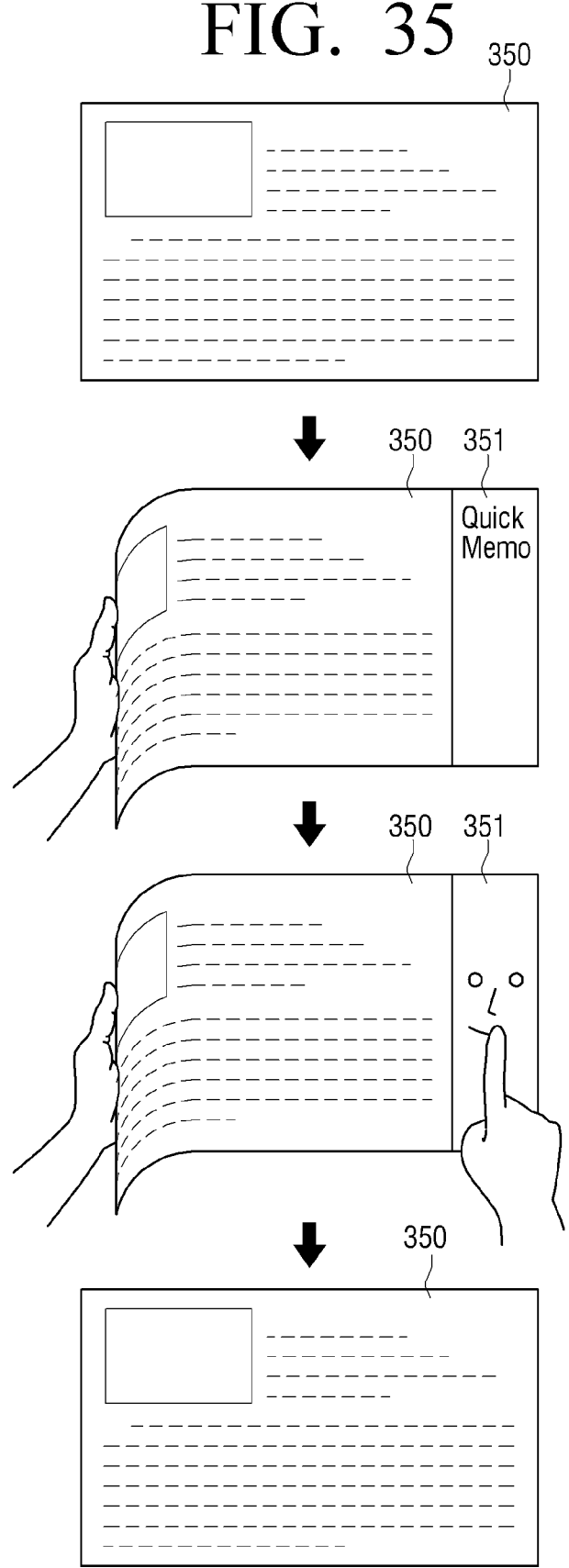
FIGS. 35 to 52 are views to explain examples of various operations performed by shape deformation.

FIG. 35 illustrates an example of an operation in which a layout of a screen which has been changed by a bending and hold gesture returns to an original state. Referring to FIG. 35, if a bending and hold gesture is performed on a certain screen 350, a new area is opened in the screen 350.

Specifically, as shown in FIG. 35, if a user bents a left edge area in the Z− direction while a certain screen 350 is displayed, and maintains the bent state, the screen 350 is moved to the left as if it flows down by gravity. Simultaneously, a new area is opened on the right. On the new area, an execution screen of an application different from the previously displayed execution screen of the application may be displayed.

For instance, if a web browsing screen is displayed on the original screen 350 in FIG. 35, an execution screen 351 of a quick memo application is displayed on the new display area newly opened on the right. That is, by performing the bending and hold gesture, the original first layout on the screen is changed to the second layout in which execution screens of a plurality of different applications are displayed on display areas.

The user may take notes on the quick memo area 351 by drawing a picture or writing characters with a certain object such as a user's finger or a touch pen. That is, according to the exemplary embodiment of FIG. 35, the main CPU 134 of the controller 130 executes the web browser module 145 and accesses a certain web source, and controls the graphic processing unit 170 based on data provided from the web source to generate a web browsing screen. In this state, if the bending and hold gesture is performed, the main CPU 134 grasps a characteristic of the bending and hold gesture, and executes the quick memo application in the service module 146 while changing the layout of the screen. Accordingly, the quick memo area 351 may be additionally displayed on the screen having the changed layout.

If the user releases the shape deformation state and the flexible display apparatus 100 returns to the original flat state, the option area 351 is moved to the right and is removed from the screen, and the original screen 350 is displayed again. In this case, the memo content written on the quick memo area 351 may be automatically stored in the storage unit 140, or may be stored according to user's selection.

The bending and hold gesture may be performed on various areas. Accordingly, the function that is matched with the bending and hold gesture may be implemented differently according to each area.

Also, besides the exemplary embodiment of FIG. 35, according to another exemplary embodiment, diverse manipulation may be performed using a bending and hold gesture and a touch gesture.

More specifically, in a state in which a web page or a content is displayed on the screen, if the user touches an object such as one image, text, or icon and directly performs a bending and hold gesture, a new display area may be opened according to a bending direction as shown in FIG. 35. The new display area may display information on the touched object. For example, if the user touches a photo displayed on the screen when watching a news screen and performs a bending and hold gesture while maintaining the touch state, a new display area is opened and displays diverse information on the touched photo, such as a relevant photo linked with the touched photo, relevant news, a source of the photo, and a photographer.

In addition, various inputs may be performed by combining a bending and hold gesture and a touch gesture.

In the exemplary embodiment of FIG. 35, if the bending and hold gesture is released and the flexible display apparatus 100 returns to its original flat state, the new display area disappears and the original screen is restored. However, the user may wish to use the new display area as it is even if the bending and hold gesture is released.

In this case, the user may continue to use the new display area by performing an additional gesture. For instance, in the state in which the execution screen 351 of the quick memo application is displayed by performing the bending and hold gesture on the edge as shown in FIG. 35, the user may wish to continue to use the quick memo function even by releasing the bending and hold gesture. At this time, a layout maintaining function is matched with a separately defined additional gesture. Therefore, the quick memo screen 351 may be continuously displayed when that additional gesture is performed, even if the bending and hold gesture is released. For instance, if the user touches the quick memo screen 351 in the bending and hold state, and the bending and hold state is released and the flexible display apparatus 100 returns to the original flat state while the touch is maintained, the quick memo screen 351 may be displayed as if it is fixed by the user's touch. Also, if the user makes a bending gesture of lifting up the left edge in the bending and hold state and then unbends or releases the flexible display apparatus 100 so that it becomes flat, the quick memo screen 351 may be maintained. As described above, various functions may be performed using an additional user gesture such as a touch gesture, a bending gesture, motion input, and voice input in addition to the bending and hold gesture.

Figure 36:
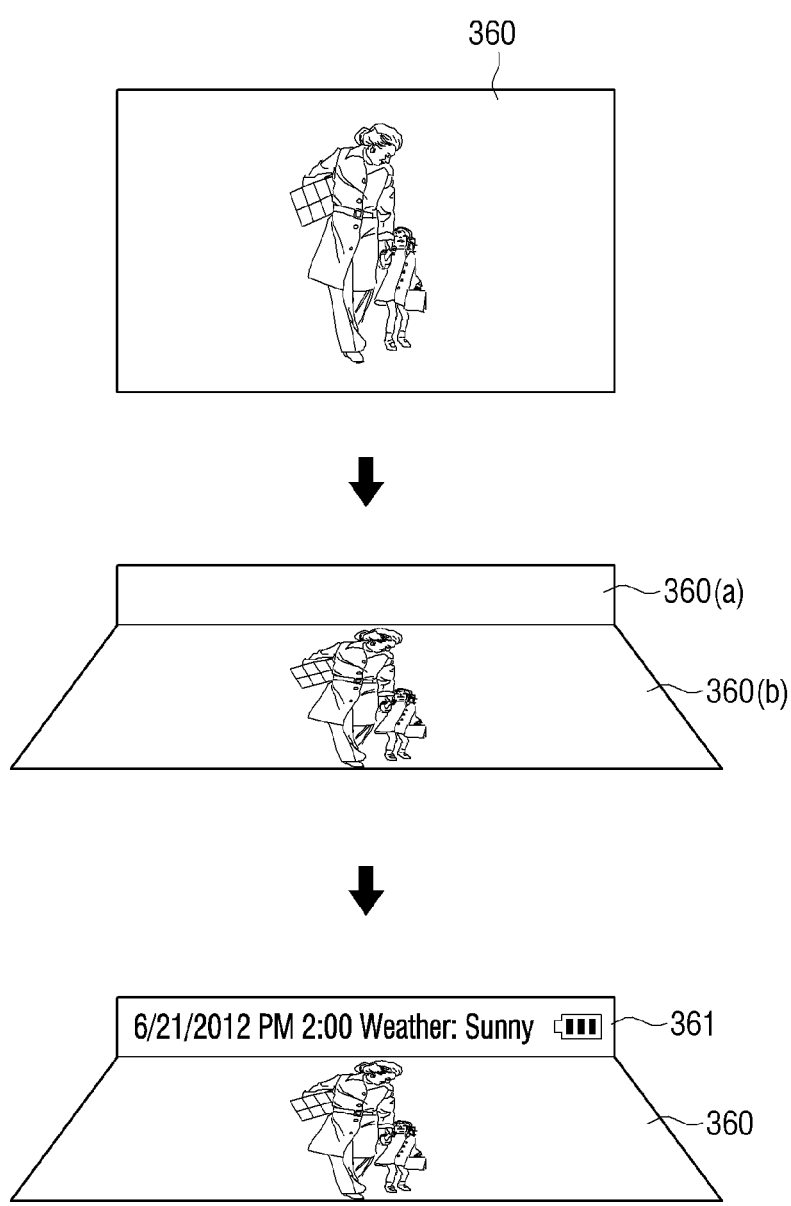

FIG. 36 is a view illustrating an operation performed if a bending and hold gesture is performed on an upper edge. Referring to FIG. 36, if shape deformation is performed on an upper edge of the screen while a certain screen 360 is displayed and that shape deformation is maintained, the entire area of the display unit 110 may be divided into two areas 360 (a) and 360 (b) by the shape deformation.

The first area 361 (a) may display diverse information such as date, time, battery level, and weather. The second area 361 (b) may display the original screen 360.

Since a size of the second area 361 (b) is different from that of the original screen 360, the screen 360 may be resized or an aspect ratio thereof may be adjusted according to the second area 361.

If the shape deformation state is released in the exemplary embodiment of FIG. 36, the original screen 360 is restored.

In FIG. 36, the bending and hold gesture is performed while a certain screen is displayed. However, if a bending and hold gesture is performed in a standby state in which no function is performed, additional information may be displayed as shown in FIG. 36.

Figure 37:
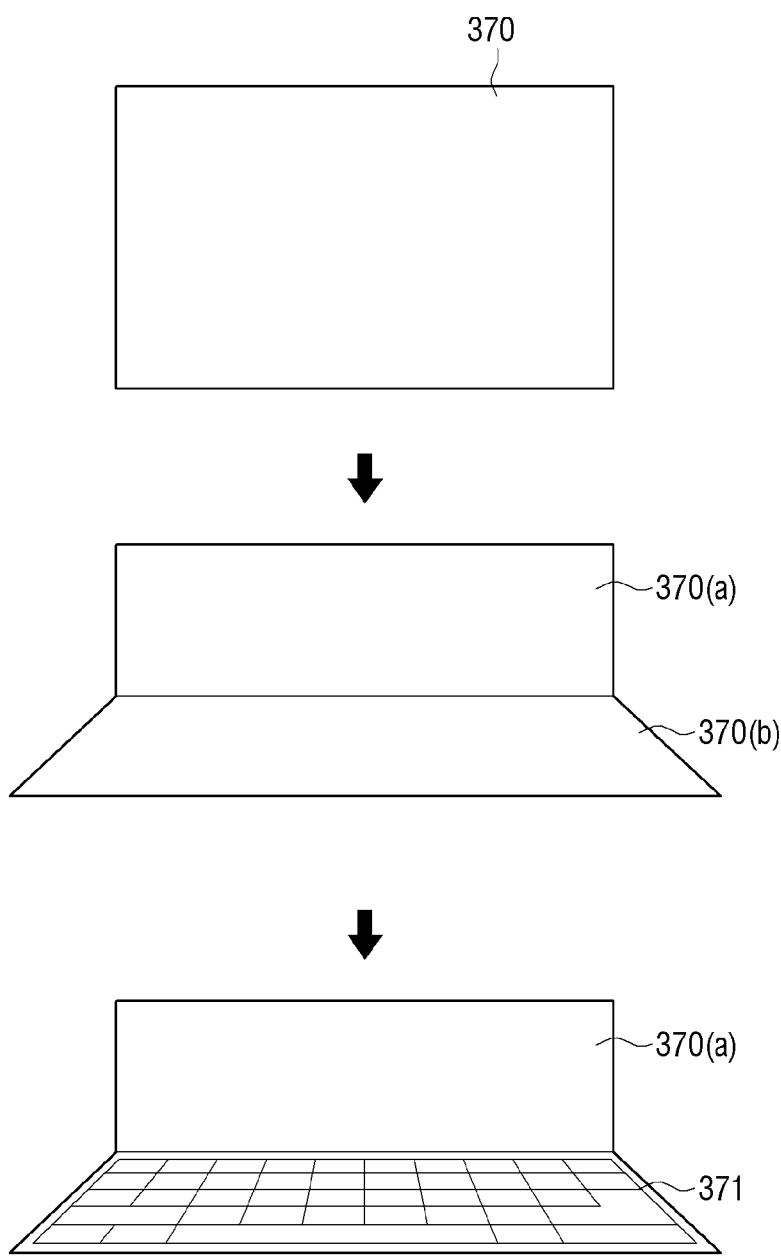

FIG. 37 is a view illustrating another example of the operation performed if the bending and hold gesture is performed. Referring to FIG. 37, in a case in which characters, symbols, or figures are required to be input through a message application or a word program, if a bending and hold gesture is performed, a soft keyboard through which characters, symbols, or figures are input is displayed on one area.

Specifically, if a bending and hold gesture is performed while a certain screen 370 is displayed, the screen 370 is divided into two areas 370 (a) and 370 (b) by that gesture. Accordingly, a soft keyboard 371 is displayed on one area 370 (b) of the two areas. An input window (not shown) which displays characters, symbols, or figures input through the soft keyboard 371 may be displayed on the other area 370 (a).

In FIG. 37, if the bending and hold gesture is performed while a type of program which requires a user to directly input characters, symbols, or figures such as a messenger, a word, a mail, or a message is executed, a layout and a size of the soft keyboard 371 may be adjusted according to the shape deformation area.

A clip board area may also be displayed by using the bending and hold gesture.

Figure 38:
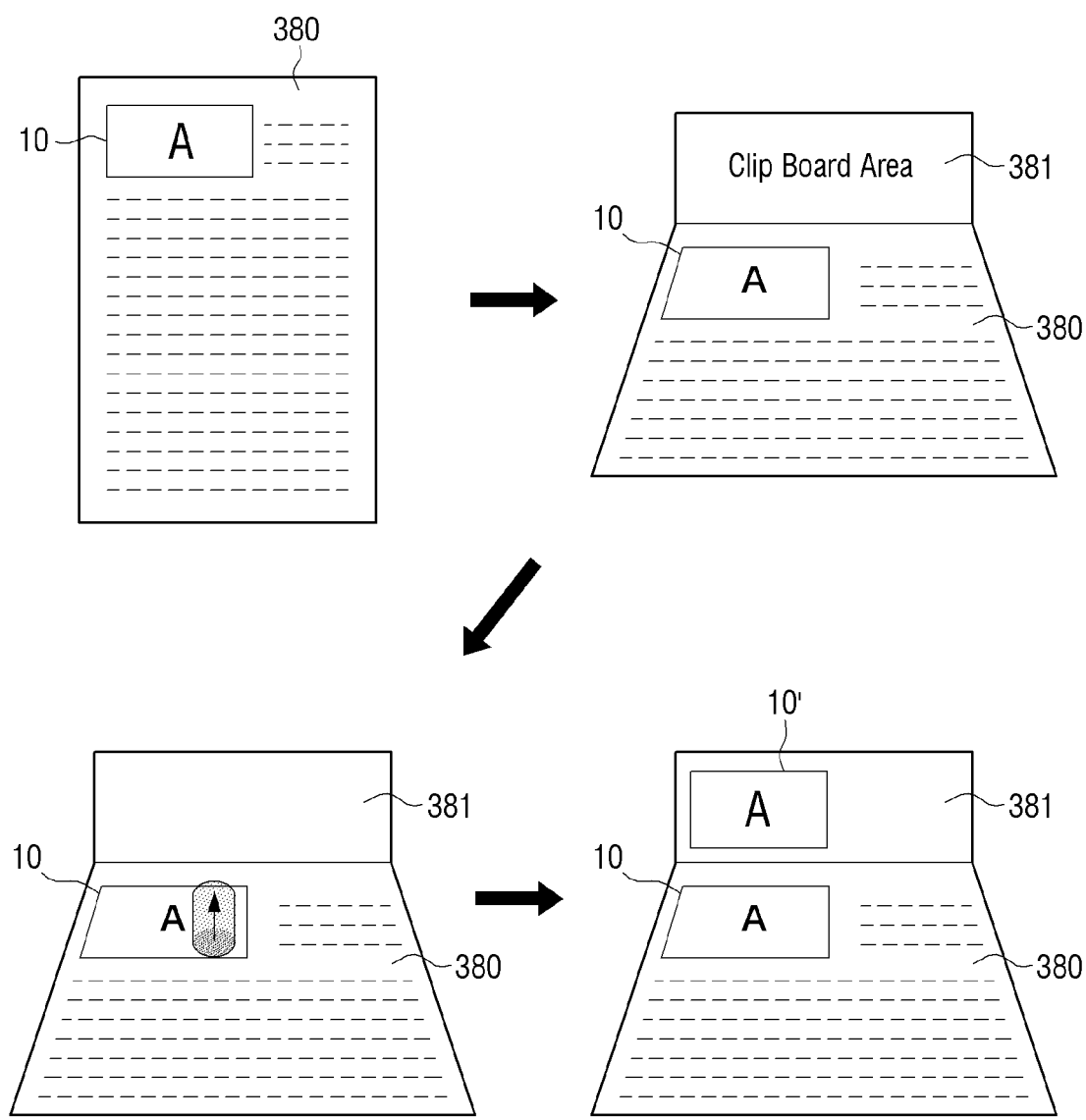

FIG. 38 is a view illustrating still another example of the operation performed if the bending and hold gesture is performed. Referring to FIG. 38, if a part of the flexible display apparatus 100 is bent while a certain screen 380 is displayed, and the bent state is maintained for a predetermined time, a clip board area 381 may be displayed on the bent area. A display location of the original screen 380 may be moved according to a size and a location of the clip board area 381.

The user may select an object on the screen 380 while the clip board area 381 is displayed, and may copy the object into the clip board area 381. FIG. 38 illustrates a process of copying a certain object 10 into the clip board area 381 if the user touches the object 10 on the screen 380 and then flicks the object 10 toward the clip board area 381.

The clip board function may be set to be performed if the user browses the web, reads an e-book, reads a document, or edits a document, or if a bending and hold gesture is performed.

Figure 39:
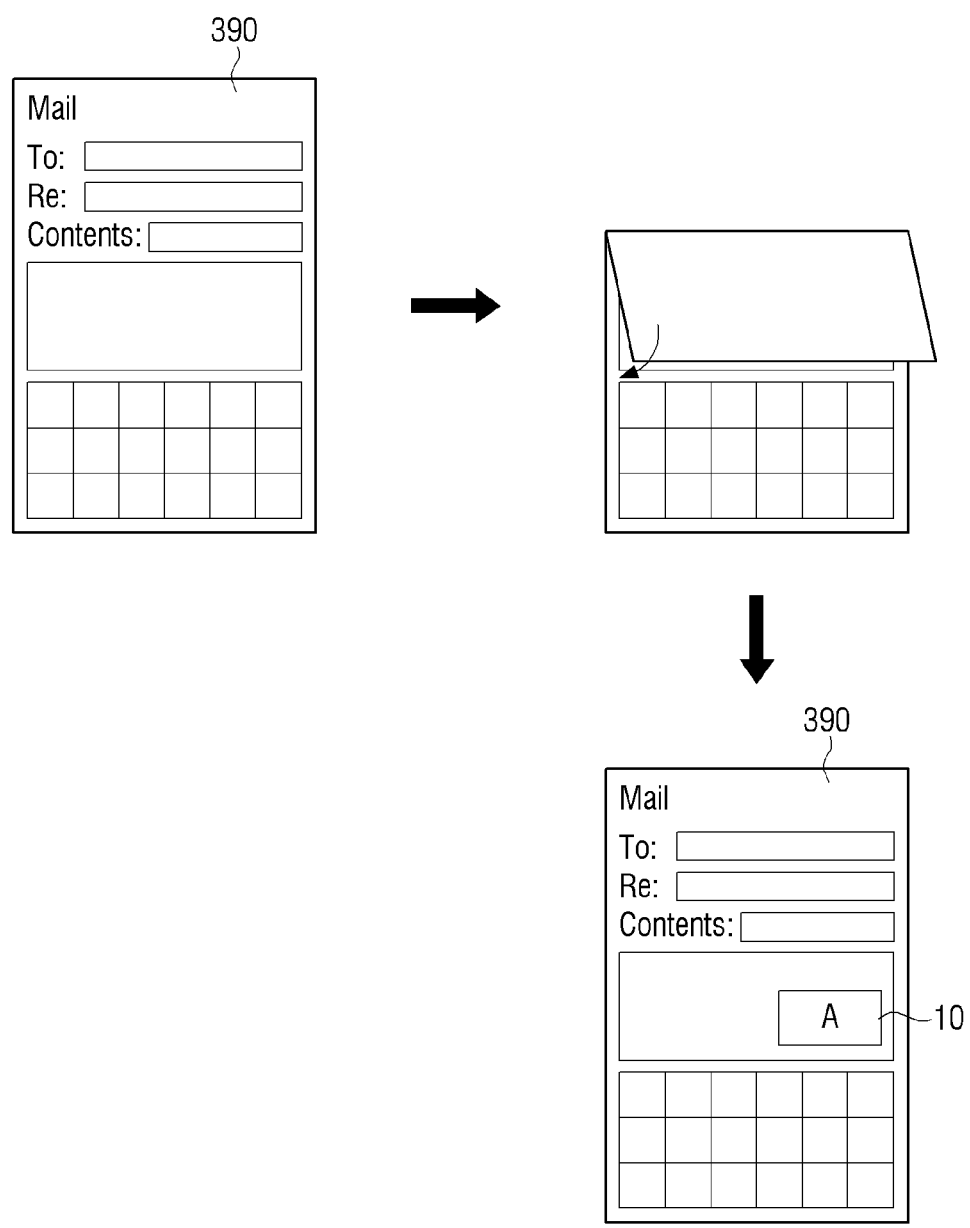

If the user releases the hold state, the clip board area 381 disappears from the screen. However, information on the copied object 10 is stored in the storage unit 140. The copied object 10 may be utilized for a different application or document. FIG. 39 illustrates an example of a method for using the clip board area 381.

Referring to FIG. 39, a mail screen 390 is displayed on the screen if a mail program is executed. In this state, the user may fold the flexible display apparatus 100. At this time, the object 10 copied into the clip board area 381 is copied into a mail text input window.

In FIG. 39, the object stored in the clip board area 381 is copied simply by folding the flexible display apparatus 100 in the state in which the clip board area 381 is not displayed. However, the clip board area 381 may be displayed first by the bending and hold gesture as shown in FIG. 38 and the object may be copied into the screen 390 by further bending the flexible display apparatus 100.

In the above exemplary embodiments, the screen is divided based on a boundary line where the shape deformation is performed. However, this should not be considered as limiting.

Figure 40:
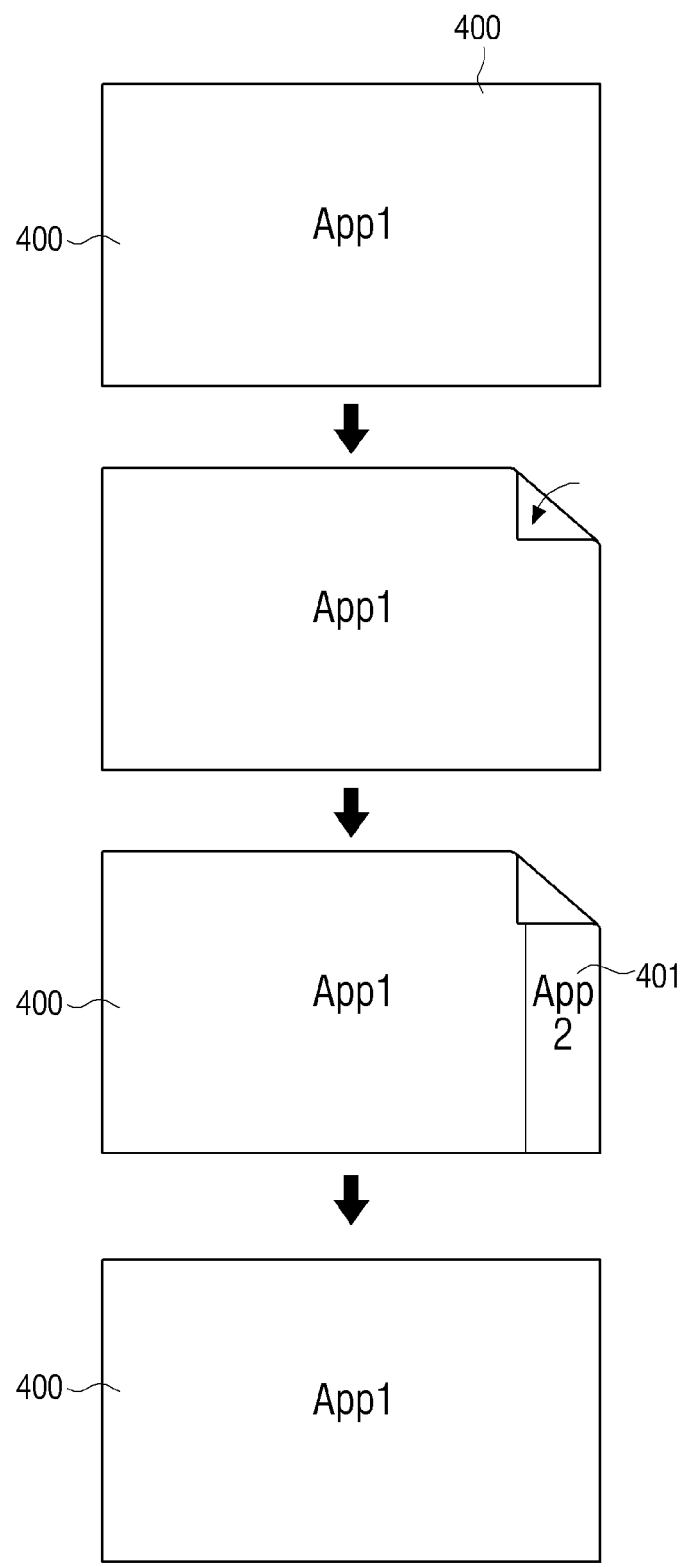

FIG. 40 is a view illustrating still another example of the operation of displaying a screen by dividing the screen based on a location where a bending and hold gesture is performed.

Referring to FIG. 40, in a state in which a first application APP1 is executed and an execution screen 400 is displayed, if a corner is bent and the bent state is maintained, a new area 401 is opened on an edge including the corner. That is, unlike in the above-described exemplary embodiments, the corner is not the only area opening the new area 401. An edge is divided with reference to an end point of the boundary line and the new area 401 is opened on the edge.

The flexible display apparatus 100 displays an execution screen of a second application APP2 which is different from the original screen 400 on the new area 401.

If touch is performed on the two areas in which a plurality of different applications are executed as described above, a background screen or other basic user interfaces may be displayed instead of the application execution screens displayed on the two areas. For instance, if the two areas are touched simultaneously or if a gesture of touching the two areas simultaneously and spreading fingers apart in a horizontal direction is performed, the two areas 400 and 401 are separated from each other horizontally and the screen is converted into the background screen or the basic UI.

Also, if multi-touch is performed on the two areas 400 and 401 and a flick is performed in a manner that touched points are moved in a direction toward a boundary, the execution screens of the applications APP1 and APP2 are changed with each other.

In this state, if the hold state is released, the original screen 400 is restored.

Also, in FIG. 40, the two areas 400 and 401 are clearly divided with reference to one boundary line. However, if general bending which has a radius of curvature greater than a predetermined value is performed rather than bending having a small radius of curvature such as folding, a boundary line between the screens may be softly formed. That is, the application execution screens may be overlapped with each other on the bent area and a transparent gradation effect may be applied so that the two areas can be naturally displayed, or a mosaic effect is applied so that the two areas can be represented as being overlapped with each other.

Figure 41:
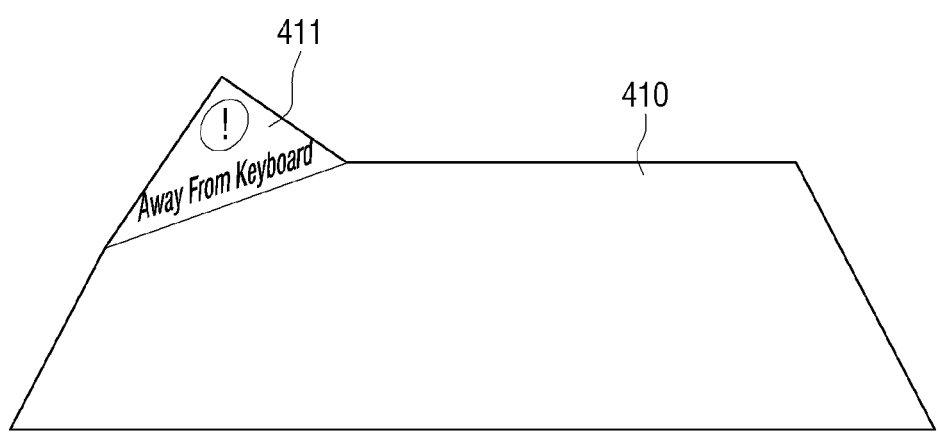
Figure 42:
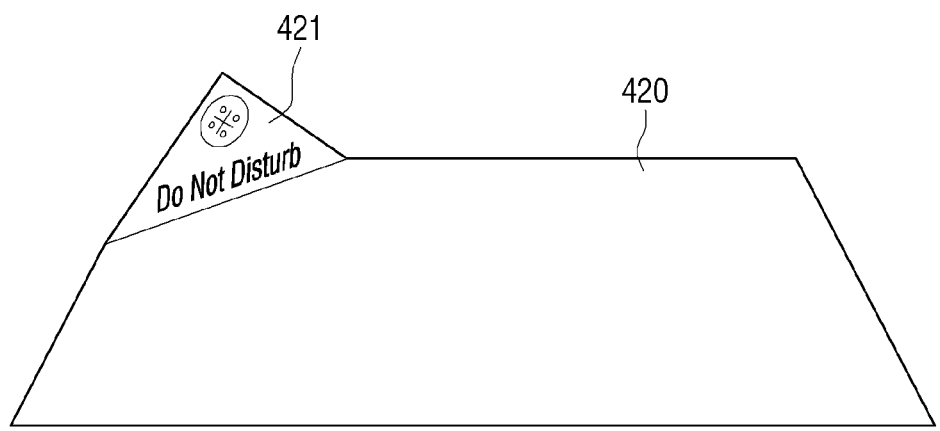
Figure 43:
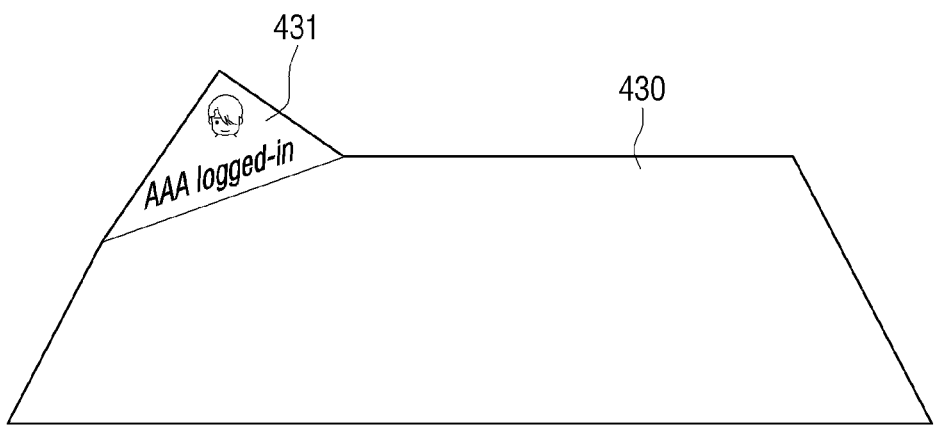

FIGS. 41 to 43 are views illustrating various examples of a function which is performed if a bending and hold gesture is performed on a corner.

Referring to FIG. 41, a notification window displaying diverse state information about a currently executed application may be displayed on a corner. If the flexible display apparatus 100 executes a messenger program, an execution screen of the messenger program is displayed on a screen 410 as show in FIG. 41. In this state, a notification window 411 may display information indicating a current state of a user or a user's interlocutor.

The user may change the state by touching the notification window. Referring to FIG. 42, if a notification window 421 displayed on one side of a screen 420 is touched, the current state of the user is changed to a state 'Do Not Disturb'. Information on this state is displayed on the notification window 421. The user may turn off the state 'Do Not Disturb' by displaying the notification window 421 again.

Also, as shown in FIG. 43, a notification window 431 displayed on one side of a screen 430 may display information on an acquaintance who logs in.

If the notification windows 411, 421, and 431 are not required any longer, the user may spread the corner and may make the notification windows 411, 421, and 431 disappear.

In FIGS. 41 to 43, the bending and hold gesture is performed on the corner in a diagonal direction and the message displayed on the notification window is aligned in parallel with the bending line. However, this should not be considered as limiting. The angle of the aligning direction of the message may be rotated in a clockwise direction so that the message can be aligned in parallel with an upper edge of the screens 410, 420, and 430 rather than the bending line.

According to the above-described exemplary embodiments, the screen may be divided by the bending and hold gesture, or the new display area may be opened and a new object may be displayed by the bending and hold gesture. However, besides the new display area and new display object, an operation mode may be converted by the bending and hold gesture.

That is, if shape deformation is sensed while the flexible display apparatus 100 is operated in a first operation mode, and the shape deformation state is maintained for a predetermined time, the controller 130 converts the operation mode into a second operation mode which corresponds to the shape deformation state. After that, if the shape deformation state is released, the controller returns to the first operation mode. The first operation mode and the second operation mode may perform different functions.

For instance, the first operation mode may be one of a camera mode and a video recording mode, and the second operation mode may be the other one.

Specifically, if the flexible display apparatus 100 is provided with a camera, the user may execute the camera mode using touch manipulation, a bending gesture, a motion gesture, or a voice command. In the camera mode, the flexible display apparatus 100 displays a live view on the screen using light entering through a camera lens. In this state, if the user inputs touch manipulation, a bending gesture, a motion gesture, or a voice input, which is matched with a capturing command, a still image is captured.

If one area on the screen is bent and the bent state is maintained as shown in FIGS. 41 to 44, the controller 130 converts the mode into the video recording mode to capture a video, and captures a video. In this state, if the bent area is spread, the controller 130 stops capturing the video, stores the captured video, and converts the mode into the camera mode.

According to another exemplary embodiment, the controller 130 may display screens corresponding to different operation modes on a plurality of display areas which are divided by a bending and hold gesture. For instance, one display area may display a live view according to a camera mode, whereas the other display area may display a capturing screen according to a moving video recording mode.

Besides the video recording mode or the camera mode, the operation mode may include various modes but illustration and explanation thereof are omitted.

Figure 44:
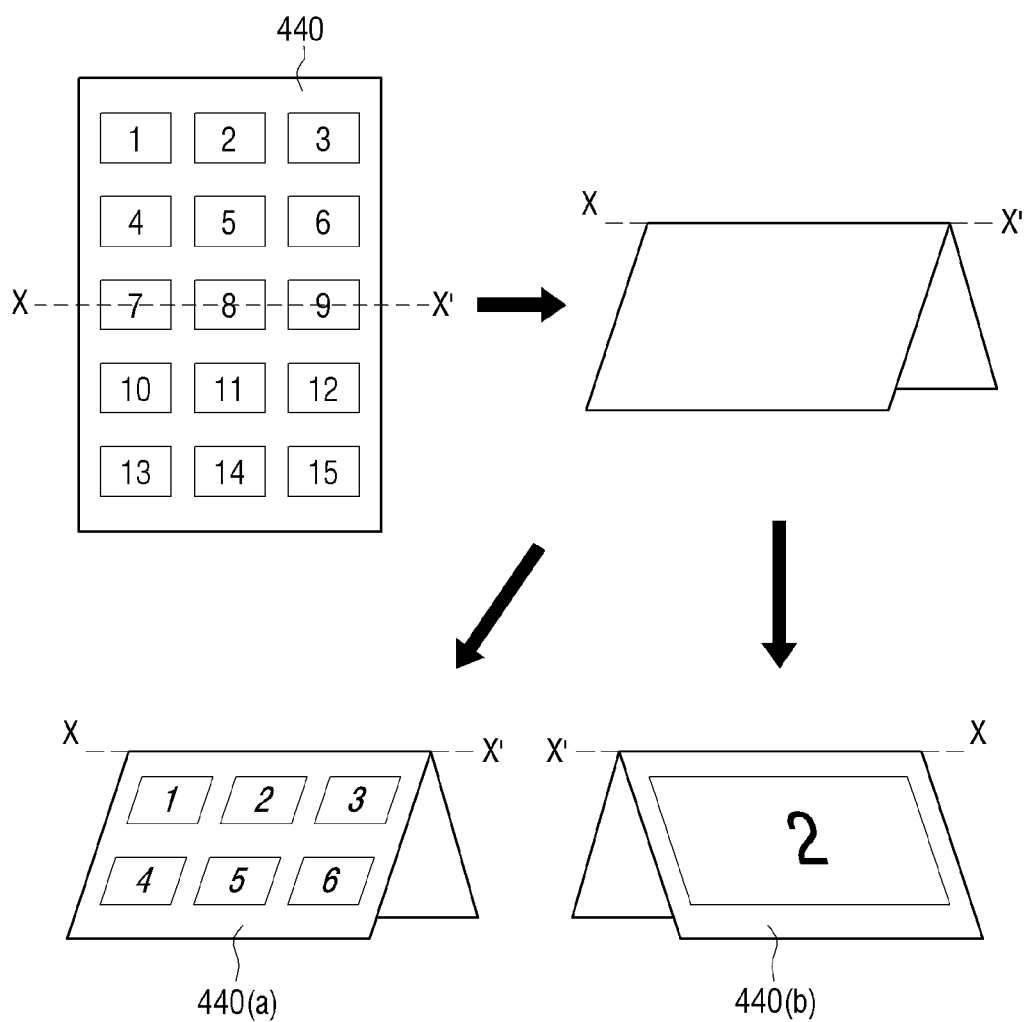

FIG. 44 is a view illustrating still another example of a function which is performed if a bending and hold gesture is performed on a center of the flexible display apparatus 100. Referring to FIG. 44, a screen 440 which includes a plurality of thumbnail images 1 to 15 is displayed and bending is performed with reference to line X-X'. If the bent state is maintained, the screen 440 is divided into two areas 440 (a) and 440 (b).

In this state, the first screen 440 (a) from among the divided screens displays at least some (1 to 6) of the thumbnail images 1 to 15 displayed on the original image 440, and, if one of the thumbnail images 1 to 6 displayed on the first screen 440 (a) is selected, the selected image is enlarged and displayed on the second screen 440 (b) which is disposed opposite to the first screen 440 (a). In FIG. 44, the second thumbnail image 2 is displayed on the second screen 440 (b).

In FIG. 44, the thumbnail images regarding photos are displayed. However, a list of document titles may be displayed on the first screen 440 (a) and a document selected from the list may be displayed on the second screen 440 (b).

If the display screen is divided as shown in FIG. 44, two users may have a conversation for a presentation, an education, or a counsel, facing each other.

Also, if the user draws a picture or writes characters on one of the screens, which are divided as shown in FIG. 44, in a touch method, the same picture or characters are displayed on the other screen as they are on the one screen.

Figure 45:
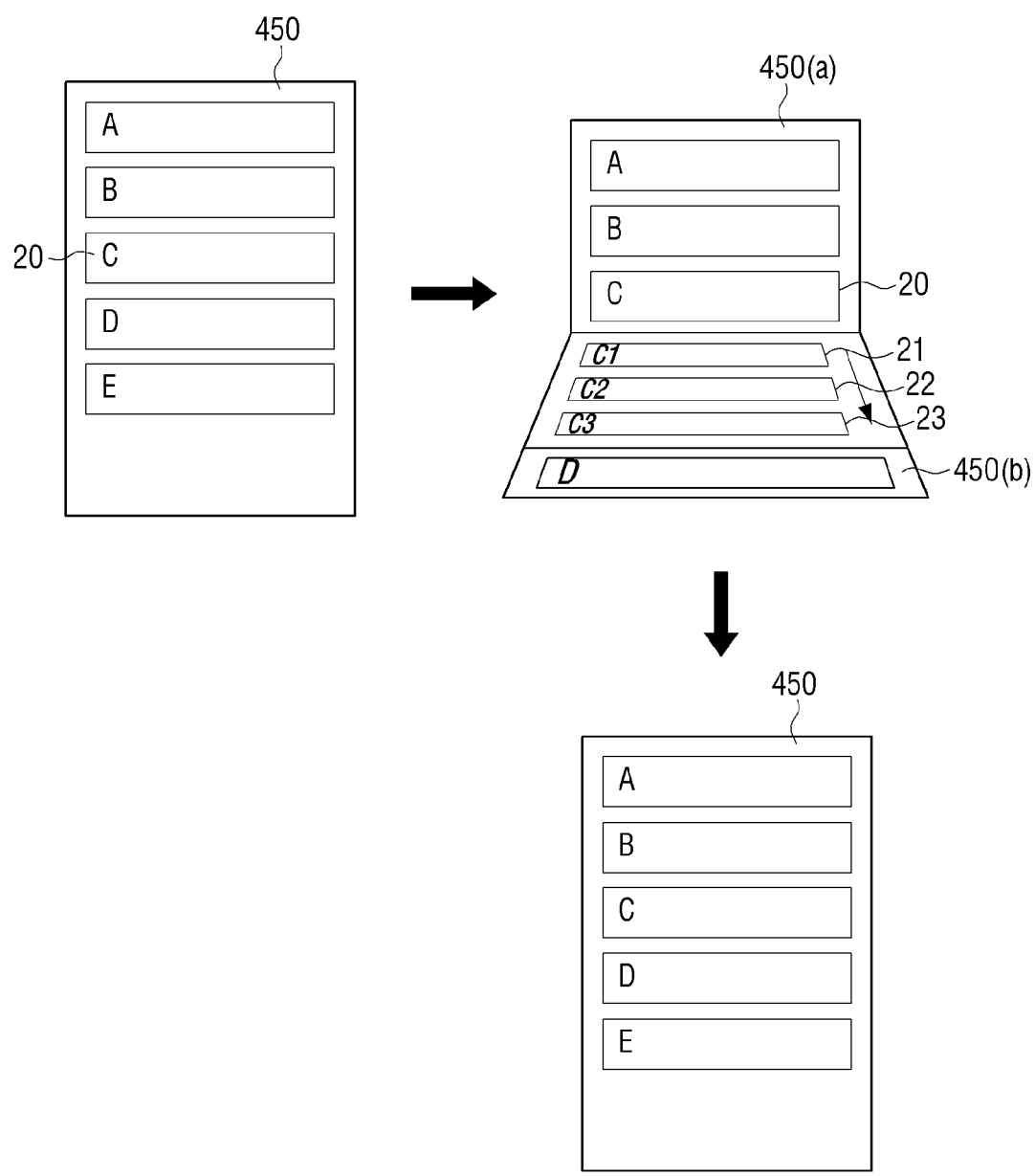

FIG. 45 is a view illustrating still another example of the function which is performed if the bending and hold gesture is performed. Referring to FIG. 45, if a screen 450 which includes a plurality of objects is displayed and a bending and hold gesture is performed in the vicinity of one object 20, the screen is divided into two screens 450 (a) and 450 (b) with respect to a boundary line of the object 20.

The first screen 450 (a) from among the divided screens displays the objects which are displayed on the original screen 450 as they are. On the other hand, the second screen 450 (b) displays sub-objects 21, 22, and 23 corresponding to the object which is overlapped with the boundary line, or located right above or under the boundary line. In FIG. 45, the sub-objects 21, 22, and 23 of the object 20 located right above the boundary line are displayed. The sub-objects may be displayed in a form that they slide out from the boundary line with a graphical effect that makes them look like a real drawer being opened.

The object recited herein may be a menu, a folder, personal information, or a content title. If the object is a menu, the sub-objects are sub-menus belonging to the menu. If the object is a folder name, the sub-objects are names of files included in the folder. If the object is personal information such as a user name or a photo, the sub-objects are detailed information such as a phone number, an address, or an email address of the user. If the object is a content title, the sub-objects are detailed information such as a format, a replay time, or an abstract of the corresponding content.

In this state, if the hold state is released, the original screen 450 is restored as the information on the sub-objects disappears like a real drawer being closed.

In FIG. 45, the sub-objects belonging to the object displayed on the screen 450 are displayed by the bending and hold gesture. However, a different function may be performed by the bending and hold gesture in an exemplary embodiment.

For instance, in FIG. 45, the screen 450 may be a list of addresses and the displayed objects A to E may be name information registered in the list. In this case, if a bending and hold gesture is performed as shown in FIG. 45, a function such as making a voice or video phone call, messaging, or emailing may be performed using the name information.

For instance, if the function of making a video phone call is performed, an interlocutor's face is displayed on the upper screen 450 (a) and a user's face is displayed on the lower screen 450 (b).

According to the various exemplary embodiments described above, a specific object may be selected based on a location of a bending line where a bending and hold gesture is performed and a location of the object displayed on the screen, and sub-object included in the object may be identified or a function matched with the object may be performed.

Also, when the screen is divided by using the bending and hold gesture, some screen may be activated and some screen may be inactivated. Inactivating the screen refers to turning off the power, closing a liquid crystal or turning off a backlight unit, displaying a monochrome screen such as a black or blue screen, or disabling touch or other manipulation.

Figure 46:
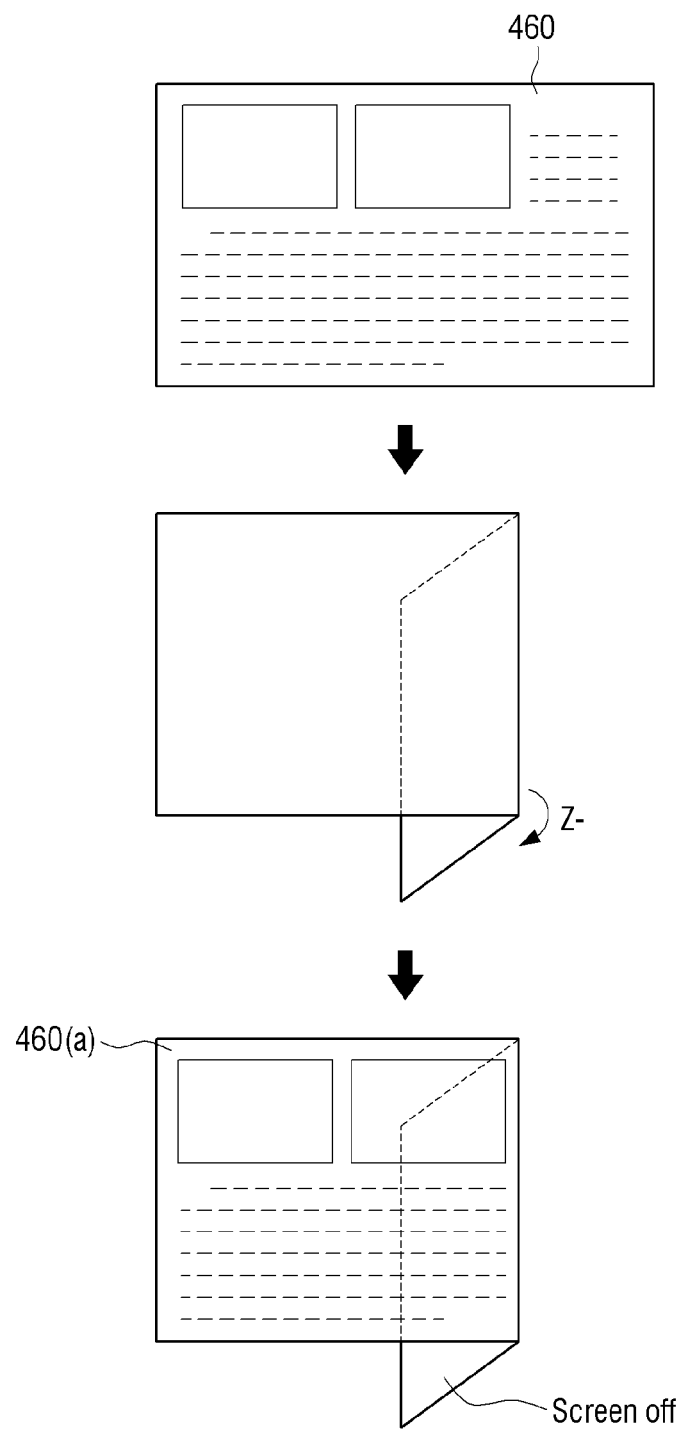

FIG. 46 is a view illustrating still another example of the function which is performed if the bending and hold gesture is performed. Specifically, referring to FIG. 46, if a bending and hold gesture is performed while a certain screen 460 is displayed, the screen is divided into two screens with reference to a boundary line. The original screen 460 is displayed on 460 (a) of the divided screens. In this case, a layout and a size of the original screen 460 may be adjusted according to the new screen 460 (a). On the other hand, the other screen is turned off.

In FIGS. 44 to 46, the flexible display apparatus 100 is bent in a vertical direction or a horizontal direction. However, the same operation may be performed if the flexible display apparatus 100 is bent in a diagonal direction. For instance, in FIG. 44, if the flexible display apparatus 100 is bent in the diagonal direction and the state is held, the screen is divided into two triangular screens. One of the screens displays thumbnail images or a list, and the other screen enlarges an object which is selected from the thumbnail images or the list and displays the object.

In the case of FIG. 46, if the bending and hold gesture is performed in the diagonal direction, one of the two triangular screens is turned off so that power consumption can be reduced.

Also, if the flexible display apparatus 100 is folded inward with reference to the center of the screen as shown in FIG. 46, the two areas divided by the folding line are brought into contact, and the contact state is maintained for a predetermined time, the flexible display apparatus 100 may be turned off or the display unit 110 may be turned off. In this state, if the two areas contacting each other are separated from each other by more than a predetermined gap, the flexible display apparatus 100 may be automatically turned on or the display unit 110 is turned off. The brightness of the screen may be adjusted according to an unfolding angle or time.

Also, if the flexible display apparatus 100 is folded outward and is completely folded in half, one of the two areas divided by the folding line is recognized as an activation area, and the other one may be recognized as an inactivation area. In this case, the controller 130 may determine an area where user's touch is performed as the inactivation area. That is, if the user wishes to reduce the screen in half because of the big size of the flexible display apparatus 100, the user folds the screen in half in the opposite direction of the display unit 110, thereby reducing the screen. In this case, the user grasps a rear portion of the flexible display apparatus 100. Accordingly, touch is not sensed on the screen located in the direction of being viewed by the user, and touch is sensed on the screen located in the direction of being grasped by the user. Considering this, the area where the user's touch is performed may be inactivated. Specifically, the user may fold the flexible display apparatus of a tablet PC size in half and may use it as a mobile phone. In this example, the activation area displays a UI of the mobile phone and the inactivation area is turned off.

If the flexible display apparatus 100 includes a speaker 185 in the exemplary embodiment of FIG. 46, the flexible display apparatus 100 may adjust an audio output state according to a bending and hold gesture. For instance, if the user performs a bending and hold gesture on one area of the flexible display apparatus 100 while the flexible display apparatus 100 reproduces e-book content and displays it on the screen, an audio signal to read out the e-book content in a voice may be output through the speaker 185. In this case, the controller 130 selects an audio file corresponding to a current page from among audio files included in the e-book content, and processes the audio file using the audio processing unit 150. The audio processing unit 150 outputs the processed audio file through the speaker 185. As described above, various operations may be provided by the bending and hold gesture.

Also, although the screen is divided by applying the bending and hold gesture, the new display area is opened by applying the bending and hold gesture, or the layout is adjusted by the bending and hold gesture in the above exemplary embodiments, various graphical effects may be displayed by the bending and hold gesture. Accordingly, the user may have more fun in using the flexible display apparatus 100.

Figure 47:
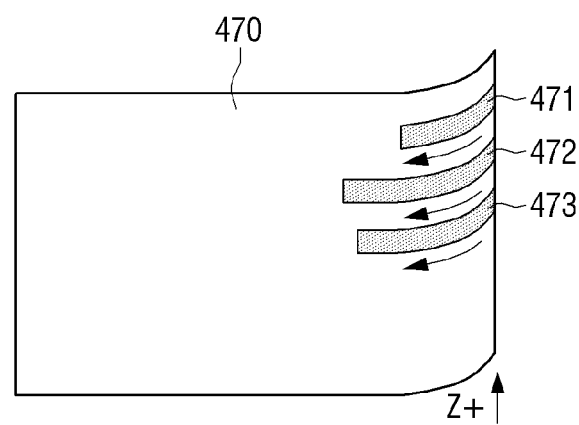

FIG. 47 is a view illustrating an example of a method for changing a screen display state using a bending and hold gesture.

Referring to FIG. 47, if one edge is bent in the Z+ direction while a certain screen 470 is displayed and the bent state is maintained, objects 471, 472, and 473 in the screen 470 are moved in the bending direction.

That is, if shape deformation is sensed while at least one object is displayed on the display unit 110 and the shape deformation state is maintained for a predetermined time, the controller 130 of the flexible display apparatus 100 may represent the object as sliding on the screen in the shape deformation direction. In FIG. 47, the objects 471, 472, and 473 slide to the left side and the portions hidden on the right side are displayed as if they newly enter the screen 470.

Figure 48:
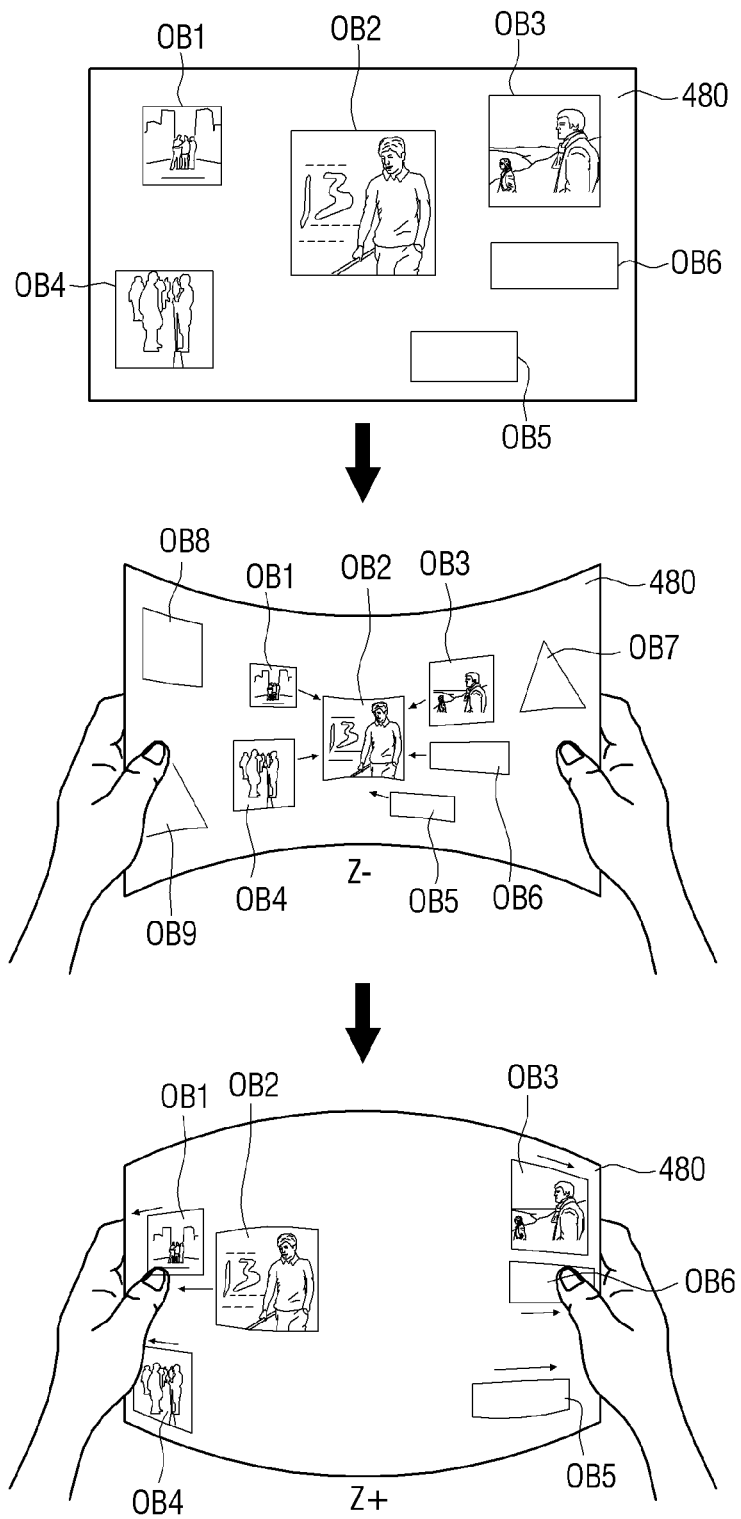

FIG. 48 is a view illustrating an example of an operation of changing a screen of the flexible display apparatus 100 if a user bends the flexible display apparatus 100 with both hands. Specifically, FIG. 48 is a view to explain an example of an operation which is performed if a user grasps the flexible display apparatus 100 with both hands and bends the flexible display apparatus 100.

Referring to FIG. 48, if the bending is performed so that a center area curves downwardly in the Z− direction while a screen 480 including a plurality of objects OB1 to OB6 is displayed, the objects OB1 to OB6 displayed on the screen 480 are moved toward the center and are displayed. Also, objects OB7, OB8, and OB9, which are not displayed in a flat state, are newly displayed and moved toward the center.

On the other hand, if the bending is performed so that center area curves upwardly in the Z+ direction, the objects are moved toward opposite edges with reference to the center area. Accordingly, the objects moved up to the opposite edges disappear from the screen 480.

If the bending of the Z− direction and the Z+ direction are alternately repeated at a high speed, it is determined that the flexible display apparatus 100 swings. In this case, a graphical effect that the objects displayed on the screen 480 are shaken out from the screen 480 and disappear one by one may be provided.

Figure 49:
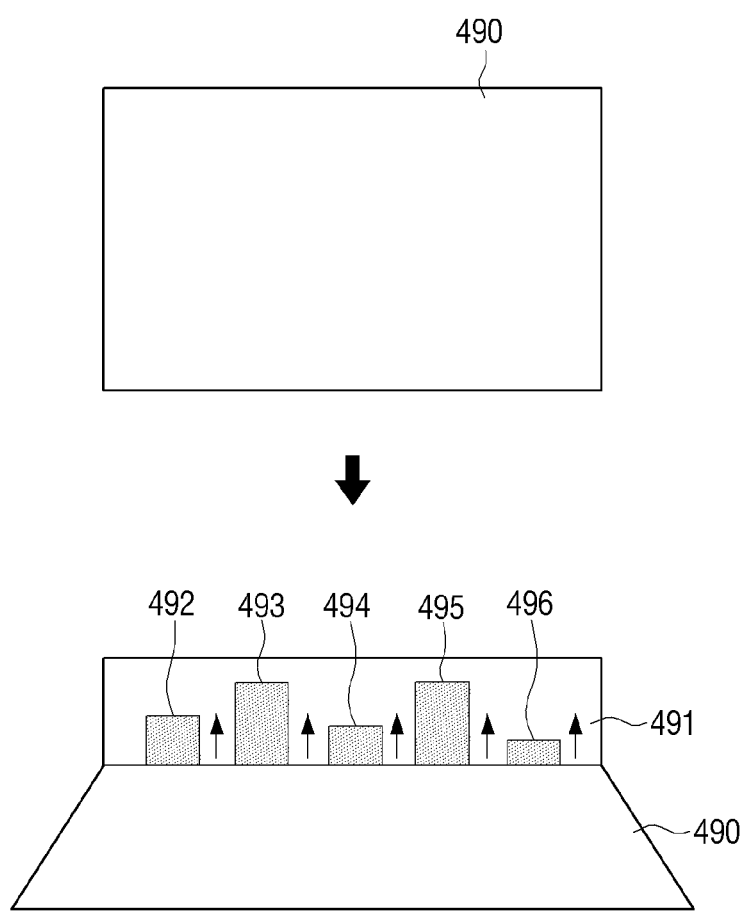

FIG. 49 is a view illustrating another example of the operation of changing the screen of the flexible display apparatus. As shown in FIG. 49, if an edge is bent while a certain screen 490 is displayed and the bent state is maintained, various menus 492 to 496 rise on a bending area 491 in the original screen 490 from a bending line in an arrow direction. Each of the menus may be a control menu for the screen 490. That is, the screen may be divided into a content area 490 and a control area 491 by the bending and hold gesture as shown in FIG. 49.

Figure 50:
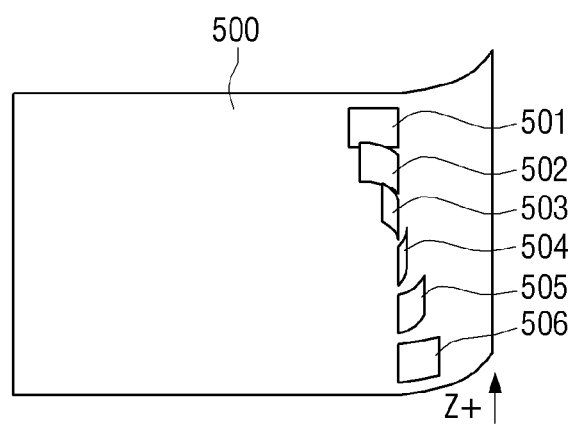

FIG. 50 is a view illustrating still another example of the operation of changing the screen of the flexible display apparatus. Referring to FIG. 50, if a bending and hold gesture is performed by lifting one edge while a screen 500 including a plurality of objects 501 to 506 is displayed, the objects 501 to 506 may be moved as if they roll onto the side where the bending is not performed.

Figure 51:
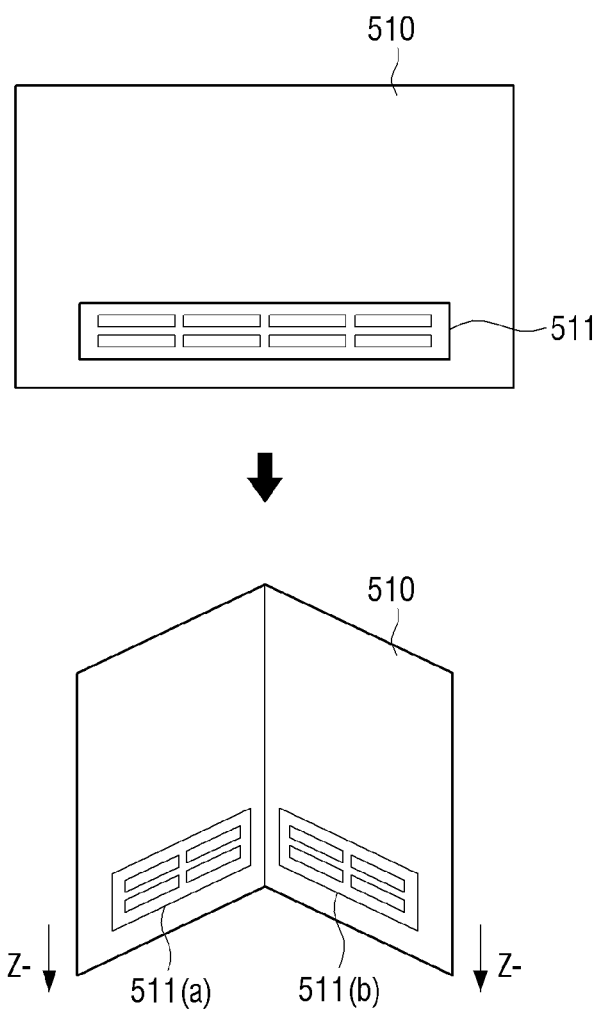

FIG. 51 is a view illustrating still another example of the operation of changing the screen of the flexible display apparatus. Referring to FIG. 51, if a bending and hold gesture is performed across an object 511 while a screen 510 including the object 511 is displayed, the object 511 is divided into two objects 511 (*a*) and 511 (*b*) with reference to a bending line. The divided objects 511 (*a*) and 511 (*b*) may be moved to opposite edges according to a slope of the display unit 110.

The effects illustrated in FIGS. 47 to 51 may be applied not only to various games but also to execution screens of various applications. Accordingly, the user may have more fun and access to more functions to operate the flexible display.

Figure 52:
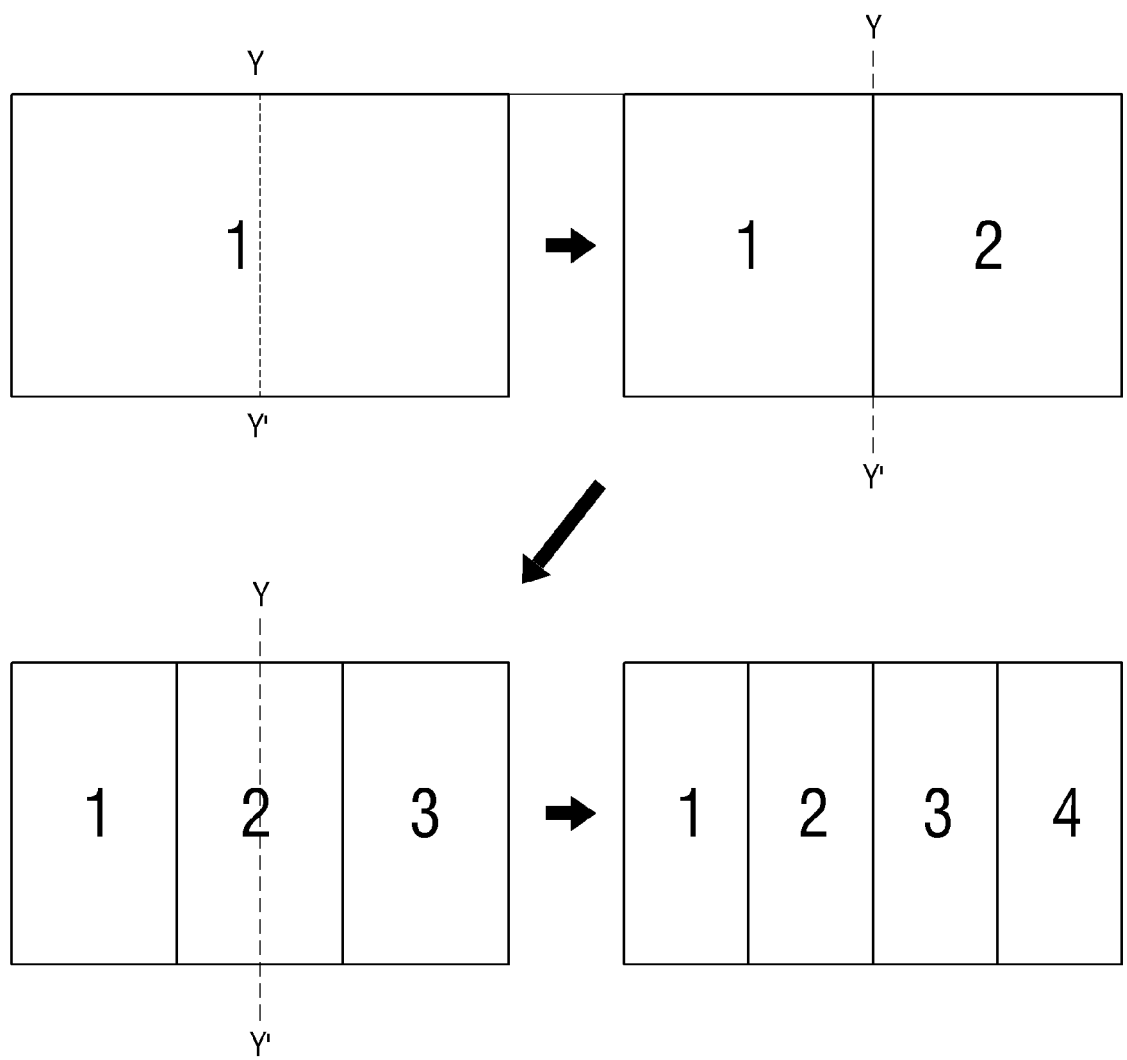

FIG. 52 is a view illustrating still another example of the operation of changing the screen of the flexible display apparatus. Referring to FIG. 52, if the flexible display apparatus 100 is folded with reference to line Y-Y', an original screen 1 is divided into two screens 1 and 2. In this state, if the flexible display apparatus 100 is folded with reference to line Y-Y' again, the screen is divided into three screens 1, 2, and 3, In this state, if the flexible display apparatus 100 is folded with reference to line Y-Y' again, the screen is divided into four screens 1, 2, 3, and 4. As described above, the screen may be divided into a various number of screens according to a number of times that folding is performed.

Also, although the number of screens increases as the screen is resized to have the same width every time that the center is folded in FIG. 52, the screen may be directly divided with reference to the folding line. In this case, the width of each screen may be determined according to a location of the folding line of the user.

Various functions may be matched with the bending and hold gesture. For instance, the bending and hold gesture may be used as a direct key for a continuously operable function. For example, if some area is bent and held when a number of mails, messengers, or messages are sent at a time, the mails, messengers, or messages may be sent in sequence while the hold state is maintained. After that, if the hold state is released, the mails, messengers, or messages that have not been sent until that time are stored in a temporary storage unit.

If some area is bent and held to perform communication by accessing through Bluetooth or Wi-Fi, the Bluetooth or Wi-Fi function is provided only while the hold state is maintained.

Figure 53:
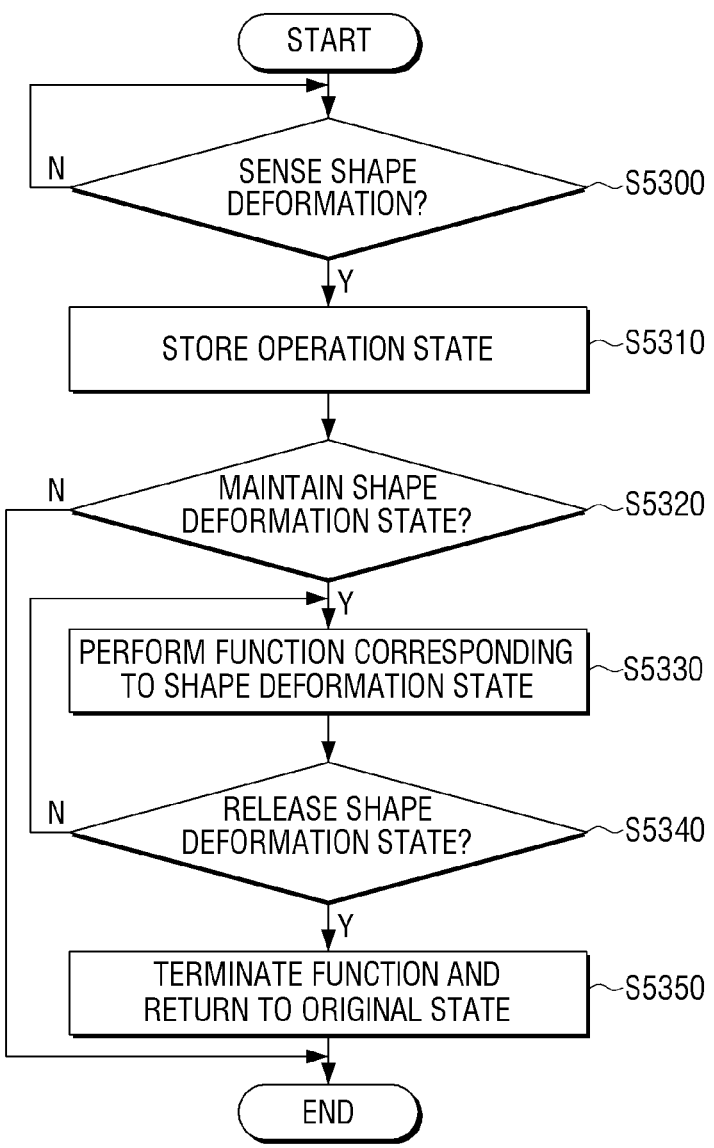
FIG. 53 is a flowchart illustrating an operating method of a flexible display apparatus according to an exemplary embodiments.

FIG. 53 is a flowchart illustrating a method for operating a flexible display apparatus according to the various exemplary embodiments described above. Referring to FIG. 53, if shape deformation is sensed (S5300), the flexible display apparatus stores an operation state at the time that the shape deformation is sensed (S5310).

If the shape deformation state is maintained (S5320), the flexible display apparatus performs a function corresponding to the shape deformation state (S5330). Specifically, the flexible display apparatus selects a function matched with various conditions such as a location, a direction, and a shape of the shape deformation, and an application currently performed in the flexible display apparatus or an operation mode, and performs the selected function. Examples of the function have been described above with reference to FIGS. 33 to 52 and a detailed description is omitted.

The flexible display apparatus performs the function corresponding to the state until the shape deformation state is released. On the other hand, if the shape deformation state is released (S5340), the flexible display apparatus terminates the function and returns to its original state (S5350). That is, the flexible display apparatus performs the operation which has been performed before the shape deformation is performed.

In the above example, the shape deformation state is maintained for a predetermined time. However, if the shape deformation is performed and directly is released without being maintained, that is, if a bending and flat gesture is performed, a function corresponding to the bend and flat gesture may be performed.

In the above-described exemplary embodiments, the flexible display apparatus 100 is a flat type. However, the flexible display apparatus 100 may be implemented by using various types of display apparatus. For instance, the flexible display apparatus 100 may be embedded in a body which is manufactured by an inflexible material.

Figure 54:
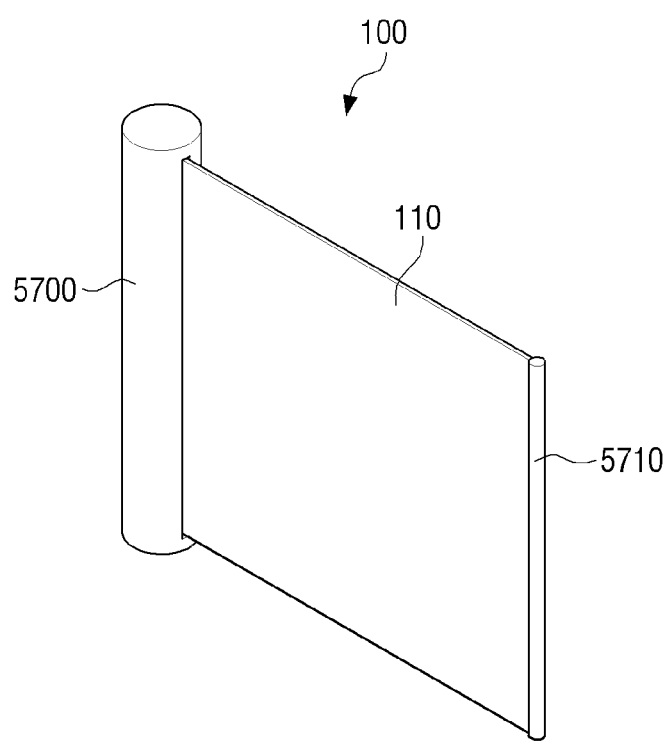
FIG. 54 is a view illustrating another example of an exterior of a flexible display apparatus.

FIG. 54 is a view illustrating an example of a flexible display apparatus which is embedded in a body.

Referring to FIG. 54, the flexible display apparatus 100 includes a body 5700, a display unit 110, and a grip unit 5710.

The body 5700 serves as a kind of a case containing the display unit 110. If the flexible display apparatus 100 includes various elements as show in FIG. 31, the elements except for the display unit 110 and some sensors may be mounted in the body 5700.

The body 5700 includes a rotation roller (not shown) to roll the display unit 110. Accordingly, the display unit 110 is rolled around the rotation roller and is embedded in the body 5700 when it is not in use. If the user grips the grip unit 5710 and pulls the display unit 110, the rotation roller is rotated in a direction opposite to the rolling direction so that the rolling is released, and the display unit 110 comes out from the body 5700. A stopper may be provided on the rotation roller. Accordingly, if the user pulls the grip unit 4710 by more than a predetermined distance, the rotation of the rotation roller is stopped by the stopper and thus the display unit 110 is fixed.

The user may perform various functions using the display unit 110 which is exposed to the outside. If the user presses a button to release the stopper, the stopper is released and the rotation roller is rotated in a reverse direction, so that the display unit 110 is rolled into the body 5700. The stopper may be formed in a switch shape to stop an operation of a gear to rotate the rotation roller. Those that are used in a general rolling structure may be used as the rotation roller and the stopper, and thus detailed illustration and description thereof are omitted.

The body 5700 includes a power supply unit 180. The power supply unit 180 may be embodied in various forms such as a battery connection portion on which a disposable battery is mounted, a secondary cell which is reusable for a number of times by being charged by the user, or a solar cell which generates electricity using solar heat. If the power supply unit 180 is implemented by using the secondary cell, the user may connect the body 5700 to an external power source through a wire and may charge the power supply unit 180.

In FIG. 54, the body 5700 has a cylindrical shape. However, the body 5700 may have a quadrangular shape or other polygonal shapes. Also, the display unit 110 may be embodied in other forms such as enclosing the body 5700, rather than being exposed to the outside from the body 5700 by being pulled.

Figure 55:
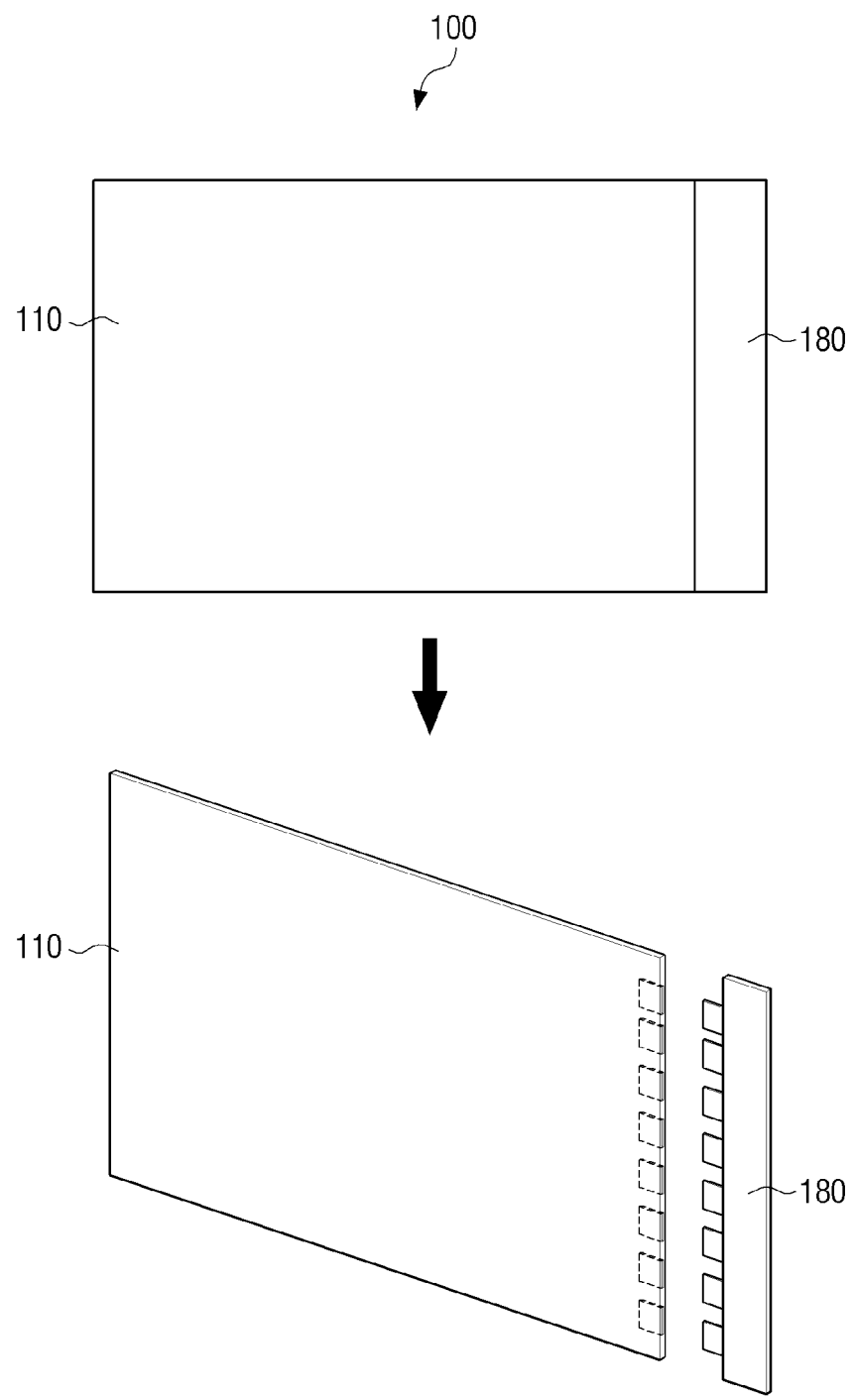
FIG. 55 is a view illustrating a shape of a flexible display apparatus in which a power supply unit is attachable or detachable.

FIG. 55 is a view illustrating a flexible display apparatus in which a power supply unit 180 is attached or detached. Referring to FIG. 55, the power supply unit 180 is provided on one edge of the flexible display apparatus to be attached to or detached from the flexible display apparatus.

The power supply unit 180 is made of a flexible material and thus is bendable along with the display unit 110. Specifically, the power supply unit 180 may include a cathode collector, a cathode electrode, an electrolyte unit, an anode electrode, an anode collector, and a coating unit enclosing the aforementioned elements.

For example, the collector may be implemented by using an alloy such as TiNi having good elasticity, metal such as copper and aluminum, a conductive material such as metal coated with carbon, carbon, and a carbon fiber, or a conducting polymer such as polypyrrole.

The cathode electrode may be manufactured by a negative electrode material such as metal such as lithium, natrium, zinc, magnesium, cadmium, hydrogen storage alloy, and lead, nonmetal such as carbon, and a high molecular electrode material such as organosulfur.

The anode electrode may be manufactured by a positive electrode material such as sulfur and metal sulfide, lithium transition metal oxide such as $LiCoO_2$, and a high molecular electrode material such as $SOCl_2$, $MnO_2$, $Ag_2O$, $Cl_2$, $NiCl_2$, and NiOOH. The electrolyte unit may be implemented in a gel form using PEO, PVdF, PMMA, and PVAC.

The coating unit may use a general polymer resin. For example, PVC, HDPE, or epoxy may be used. Besides these, any material that can prevent damage of a thread-type cell and is freely flexible or bendable may be used for the coating unit.

Each of the anode electrode and the cathode electrode in the power supply unit 180 may include a connector to be electrically connected to an external source.

Referring to FIG. 55, the connector protrudes from the power supply unit 180 and a recess corresponding to a location, a size, and a shape of the connector is formed on the display unit 110. Accordingly, the power supply unit 180 is connected with the display unit 110 as the connector and the recess are connected to each other. The connector of the power supply unit 180 is connected to a power connection pad of the flexible display apparatus 100 to supply power to the flexible display apparatus 100.

Although the power supply unit 180 is attached to or detached from one edge of the flexible display apparatus 100 in FIG. 55, this is merely an example. A location and a shape of the power supply unit 180 may be changed according to a product characteristic. For example, if the flexible display apparatus 100 has a predetermined thickness, the power supply unit 180 may be mounted on a rear surface of the flexible display apparatus 100.

Figure 56:
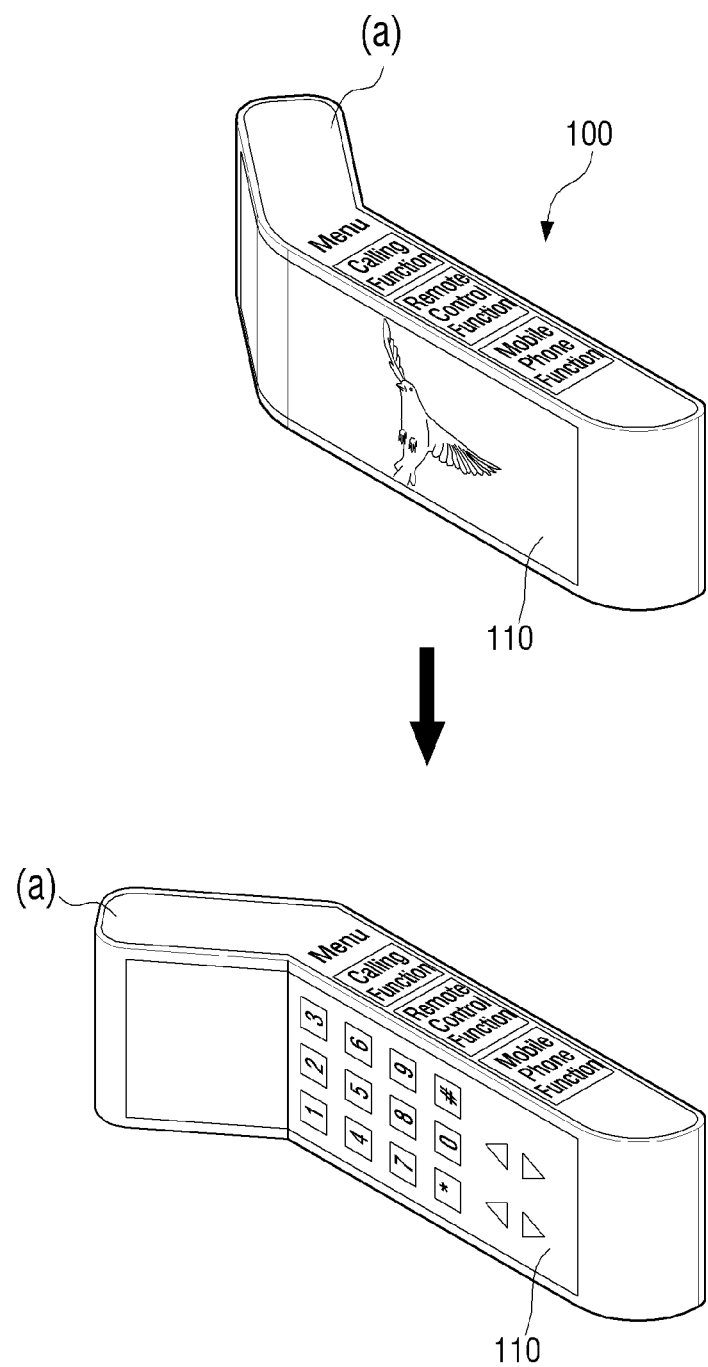
FIGS. 56 and 57 are views illustrating examples of various exteriors of a flexible display apparatus.

FIG. 56 is a view illustrating a flexible display apparatus 100 of a 3-dimensional structure rather than a flat panel structure. Referring to FIG. 56, a display unit 110 is disposed on one side of the flexible display apparatus 100, and various hardware such as a button, a speaker, a microphone, and an IR lamp are provided on another side.

A whole outer case or a part of the outer case of the flexible display apparatus 100 shown in FIG. 56 is made of rubber or other polymer resins, and is flexibly bendable. Accordingly, the whole flexible display apparatus 100 or a part of the flexible display apparatus 100 may be bent and the bent state may be maintained. The flexible display apparatus 100 may perform a new operation which is different from a previous operation if a bending and hold gesture is performed.

Referring to FIG. 56, a part (a) of the flexible display apparatus 100 is bent in a rightward direction. In this state, the flexible display apparatus 100 performs a display function. In this state, if the part (a) is bent in an opposite direction, a function of making a call is performed. Accordingly, the display unit 110 may display a dial pad to make a call.

Unlike in FIG. 56, a remote control function to control an external apparatus may be usually performed. In this state, if a bending and hold gesture is performed on the part (a), the calling function may be performed. If the remote control function is performed, a remote control button may be displayed on the display unit 110, and, if the calling function is performed, a dial pad may be displayed on the display unit 110.

The flexible display apparatus 100 of FIG. 56 may be implemented by using a universal remote controller. Accordingly, the flexible display apparatus 10 may control operations of various external apparatuses according to a characteristic of the bending and hold gesture. For instance, if a bending and hold gesture is performed in a first form, various menus to control a television may be displayed on the display unit 110, and, if a bending and hold gesture is performed in a second form, various menus to control a sound may be displayed on the display unit 110.

Figure 57:
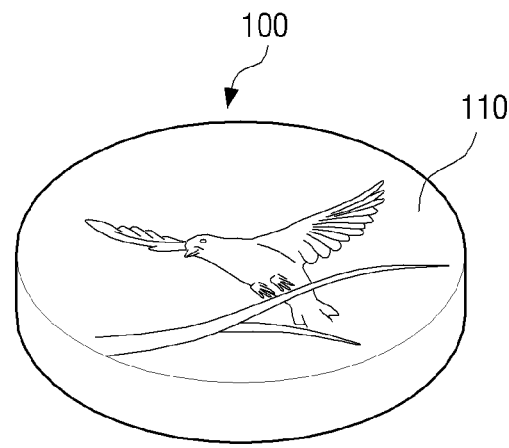
Figure 57:
Figure 57:
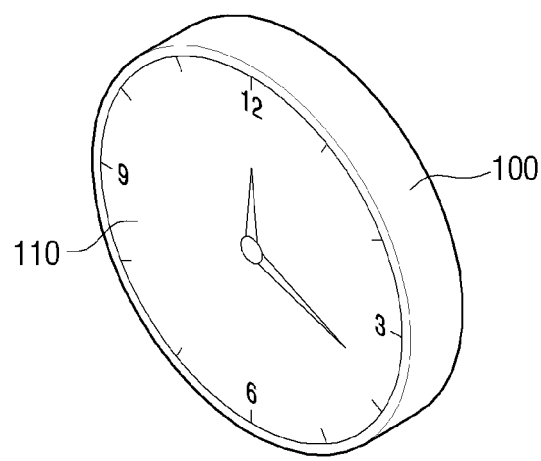
Figure 57:
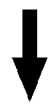
Figure 57:
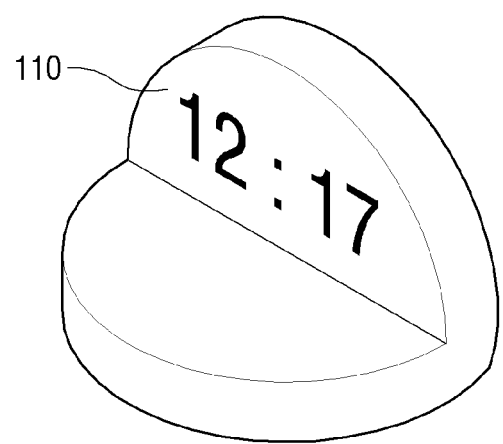

FIG. 57 illustrates a circular type flexible display apparatus. Accordingly, a visually or functionally different operation may be performed according to a shape in which the flexible display apparatus is placed or folded. For instance, if the flexible display apparatus is placed on a bottom horizontally, photos or other content are displayed, and, if the flexible display apparatus stands on the bottom in an upright position, a clock function is performed.

In this state, if a center of the flexible display apparatus 100 is bent by 90° and the bent state is maintained, a function corresponding to the bent state may be performed. Referring to FIG. 57, if the flexible display apparatus stands on the bottom in the upright position, an analogue clock is displayed on the display unit 110, and, if the center is folded, a digital clock is displayed on the display unit 110. However, the function to be performed is not limited to this. For example, a laptop PC function may be performed. In this case, one of the folded areas displays a soft keyboard and the other area displays a display window.

Besides these, the flexible display apparatus may be embodied in various forms. Although the flexible display apparatus has been described in the above exemplary embodiments, a flexible apparatus from which a display unit is removed may be implemented. Specifically, a flexible apparatus which further includes a signal transmitting unit to transmit a remote control signal instead of a display unit may be implemented as a remote controller. In this case, if a user bends the flexible apparatus, the flexible apparatus may transmit a remote control signal corresponding to the bent state to an external apparatus and control the external apparatus to perform the above-described various functions.

According to the above-described various exemplary embodiments, the flexible apparatus matches functions with a bending and hold gesture as well as a bending and flat gesture or various bending gestures such as rolling, shaking, swing, or twist. Accordingly, a plurality of functions can be performed selectively or simultaneously according to user's selection.

The method for sensing a bending and hold gesture, the method for performing a function according to the gesture, and the function to be performed according to the above-described various exemplary embodiments may be embodied as a program and may be provided to the flexible display apparatus.

For example, a non-transitory computer readable medium, which stores a program performing the steps of sensing shape deformation of the display unit, if the shape deformation is sensed, storing information on an operation state of the flexible display apparatus, if the shape deformation state is maintained for a predetermined time, performing a function corresponding to the shape deformation state, terminating the function if the shape deformation state is released, and returning to an original operation state using the stored information, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
   a display;
   a sensor configured to detect a bending of the flexible display apparatus; and
   a controller configured to:
      control the display to present a first screen on an entire portion of the display while the flexible display apparatus is flat, wherein the first screen comprises at least one object,
      identify a location of a bending line based on detection of a bending of the flexible display apparatus while one of the at least one object is touched,
      divide the entire portion of the display into a first area and a second area at the location of the bending line based on the location of the bending,
      control the display to present the first screen resized on the first area of the display and present a second screen associated with the touched object on the second area of the display while the flexible display apparatus is bent, and
      based on detection of an unbending of the flexible display apparatus while the first screen and the second screen are presented on the display, control the display to present the first screen on the entire portion of the display while the flexible display apparatus is flat.

2. The flexible display apparatus as claimed in claim 1, wherein the controller is further configured to resize the first screen by reducing a size of the first screen while maintaining a ratio of the first screen on the first area.

3. The flexible display apparatus as claimed in claim 1, wherein the controller is further configured to resize the first screen by reducing a size of the first screen by adjusting a ratio of the first screen on the first area.

4. The flexible display apparatus as claimed in claim 1, wherein the controller is further configured to, in response to the sensor detecting bending of the flexible display apparatus while an execution screen of an application is displayed, control the display to present a user interface (UI) element to control the application on the first area and reduce a size of and present the execution screen of the application on the second area.

5. The flexible display apparatus as claimed in claim 1, wherein the controller is further configured to, in response to the sensor detecting bending of the flexible display apparatus while an execution screen of an application is displayed, control the display to present a user interface (UI) element representing at least one of time information, weather information and battery information on the first area and reduce a size of and present the execution screen of the application on the second area.

6. The flexible display apparatus as claimed in claim 1, wherein the controller is further configured to:
   identify a first width and a second width based on the location of the bending line; and
   divide the display into the first area and the second area at the location of the bending line so the first area has the first width and the second area has the second width.

7. A method for operating a flexible display apparatus which comprises a display, the method comprising:
   presenting a first screen on an entire portion of the display while the flexible display apparatus is flat, wherein the first screen comprises at least one object,
   detecting a bending of the flexible display apparatus with a sensor and a touching of one of the at least one object;
   identifying a location of a bending line based on the bending of the flexible display apparatus while the touched object is touched;
   dividing the entire portion of the display into a first area and a second area at the location of the bending line based on the location of the bending line;
   controlling the display with a controller to present the first screen resized on the first area of the display and present a second screen associated with the touched object on the second area of the display while the flexible display apparatus is bent; and based on detection of an unbending of the flexible display apparatus while the first screen and the second screen are presented on the display, controlling the display with the controller to present the first screen on the entire portion of the display while the flexible display apparatus is flat.

8. The method as claimed in claim 7, wherein the controlling of the display comprises reducing a size of and presenting the first screen while maintaining a ratio of the first screen on the first area.

9. The method as claimed in claim 7, wherein the controlling of the display comprises reducing a size of and presenting the first screen by adjusting a ratio of the first screen on the first area.

10. The method as claimed in claim 7, wherein the controlling of the display comprises, in response to the sensor detecting bending of the flexible display apparatus while an execution screen of an application is displayed, controlling the display to present a user interface (UI) element to control the application on the first area and reducing a size of and presenting the execution screen of the application on the second area.

11. The method as claimed in claim 7, wherein the controlling of the display comprises, in response to the sensor detecting bending of the flexible display apparatus while an execution screen of an application is displayed, controlling the display to present a user interface (UI) element representing at least one of time information, weather information and battery information on the first area and reducing a size of and presenting the execution screen of the application on the second area.

12. The method as claimed in claim 7, further comprising identifying a first width and a second width based on the location of the bending line,
wherein the dividing the display into the first area and the second area is performed at the location of the bending line so the first area has the first width and the second area has the second width.

13. A flexible display apparatus comprising:
a display;
a sensor configured to detect a bending of the display; and
a controller configured to:
control the display to present a first screen associated with a first application on an entire portion of the display while the flexible display apparatus is flat, wherein the first screen comprises at least one object,
determine a location of a bending line in response to detecting a bending of the display while one of the at least one object is touched,
divide the entire portion of the display into a first area and a second area at the location of the bending line in response to detecting the bending of the display while the first screen is presented,
control the display to present the first screen resized on the first area of the display and present a second screen associated with a second application on the second area of the display, and
control the display to present the first screen on the entire portion of the display based on an unbending of the display.

14. The flexible display apparatus as claimed in claim 13, wherein the controller is further configured to determine a bend and hold gesture in response to a corner of the flexible display apparatus being bent and held within a threshold angle for a first predetermined time, and perform a bend and hold operation in response to the bend and hold gesture.

15. The flexible display apparatus as claimed in claim 14, wherein the controller is further configured to determine a bend and flat gesture in response to a corner of the flexible display apparatus being bent from a flat state and returned to the flat state within a second predetermined time, and perform and a bend and flat operation in response to the bend and flat gesture.

16. The flexible display apparatus as claimed in claim 13, wherein the sensor comprises a plurality of bend sensors disposed on a rear surface of the flexible display apparatus, each of the plurality of bend sensors being configured to change a resistance value according to tension.

17. The flexible display apparatus as claimed in claim 16, wherein the plurality of bend sensors comprises a first plurality of bend sensors arranged in a first direction and a second plurality of bend sensors arranged in a second direction while the flexible display apparatus is in a flat state.

18. The flexible display apparatus as claimed in claim 17, wherein the first direction is perpendicular to the second direction while the flexible display apparatus is in the flat state.

19. The flexible display apparatus as claimed in claim 13, wherein the controller is further configured to:
identify a first width and a second width based on the location of the bending line; and
divide the display into the first area and the second area at the location of the bending line so the first area has the first width and the second area has the second width.

\* \* \* \* \*